US012777174B2

(12) United States Patent
Cho et al.

(10) Patent No.: US 12,777,174 B2
(45) Date of Patent: Oct. 27, 2026

(54) POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

(71) Applicant: LG ELECTRONICS INC., Seoul (KR)

(72) Inventors: Yongwoo Cho, Seoul (KR); Younghun Song, Seoul (KR); Kyuwoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/715,667

(22) PCT Filed: Dec. 2, 2022

(86) PCT No.: PCT/KR2022/019503
§ 371 (c)(1),
(2) Date: May 31, 2024

(87) PCT Pub. No.: WO2023/101510
PCT Pub. Date: Jun. 8, 2023

(65) Prior Publication Data

US 2025/0030878 A1 Jan. 23, 2025

(30) Foreign Application Priority Data

Dec. 2, 2021 (KR) ........................ 10-2021-0171124

(51) Int. Cl.
*H04N 19/20* (2014.01)
*H04N 19/136* (2014.01)
*H04N 19/167* (2014.01)
*H04N 19/17* (2014.01)
(Continued)

(52) U.S. Cl.
CPC ........... *H04N 19/20* (2014.11); *H04N 19/136* (2014.11); *H04N 19/167* (2014.11); *H04N 19/17* (2014.11); *H04N 19/80* (2014.11); *H04N 19/85* (2014.11)

(58) Field of Classification Search
CPC .... H04N 19/20; H04N 19/136; H04N 19/167; H04N 19/17; H04N 19/80; H04N 19/85; H04N 19/124; H04N 19/597; G06T 7/11; G06T 7/70; G06T 9/00; G06T 19/00; G06T 1/20; G06V 20/64; G06V 10/764
See application file for complete search history.

(56) References Cited

U.S. PATENT DOCUMENTS

2020/0382764 A1* 12/2020 Oyman ............. H04N 21/4728
2021/0042557 A1 2/2021 Roy
2021/0049828 A1 2/2021 Park et al.
(Continued)

FOREIGN PATENT DOCUMENTS

KR 10-2021-0111052 A 9/2021
WO 2021067501 A1 4/2021

*Primary Examiner* — Tat C Chio
(74) *Attorney, Agent, or Firm* — Bryan Cave Leighton Paisner LLP

(57) ABSTRACT

A point cloud data transmission method and device are disclosed according to embodiments. The point cloud data transmission method comprises the steps of: pre-processing point cloud data including points; encoding the pre-processed point cloud data; and transmitting the encoded point cloud data and signaling data.

5 Claims, 30 Drawing Sheets

(51) Int. Cl.
*H04N 19/80* (2014.01)
*H04N 19/85* (2014.01)

(56) References Cited

U.S. PATENT DOCUMENTS

2021/0304495 A1 9/2021 Tamir et al.
2023/0007277 A1 * 1/2023 Salahieh .............. H04N 19/132
2023/0057118 A1 * 2/2023 Bankiti ................... G01S 17/58

* cited by examiner

FIG. 5
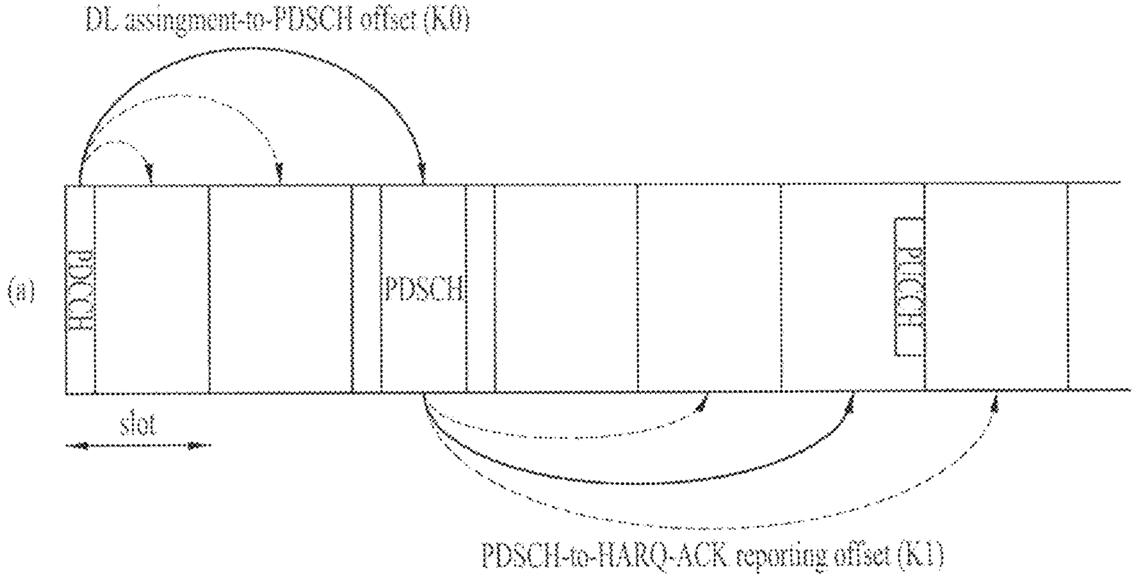
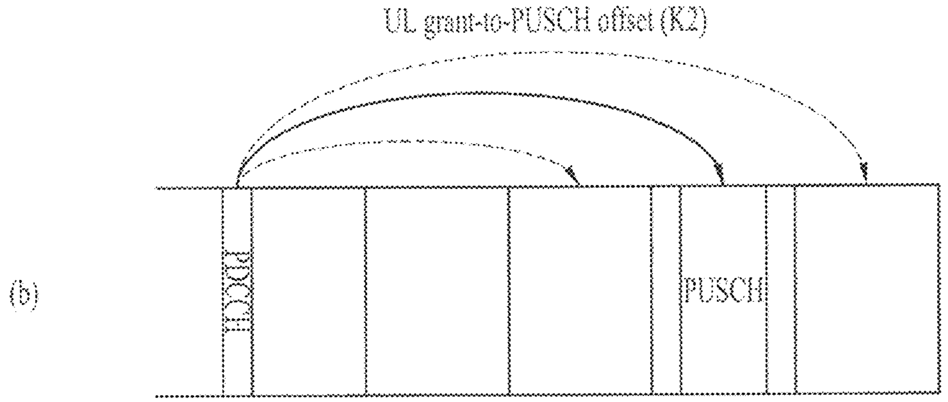

FIG. 21
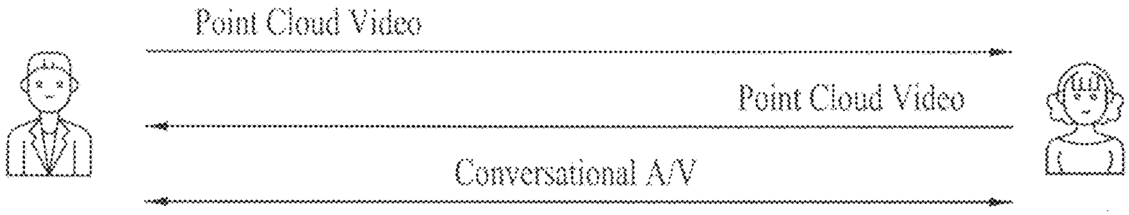
(a)
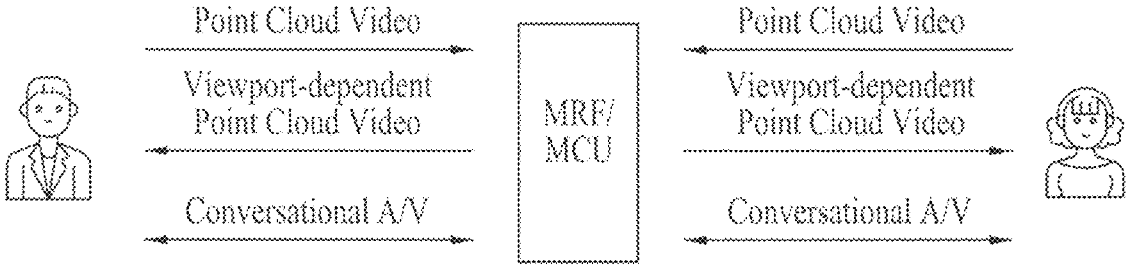
(b)

FIG. 26

<table>
<tr><th>Syntax (ex: json format)</th><th>Semantics</th><th>Type</th></tr>
<tr><td rowspan="6">{<br>BBWidth: w<br>BBHeight: h<br>[{BBId: 1,<br>Obj: [{cor: x<sub>0</sub>, y<sub>0</sub>, w, h,<br>level: L<sub>0</sub>},<br>{cor: x<sub>1</sub>, y<sub>1</sub>, w, h,<br>level: L<sub>1</sub>},<br>}<br>{BBId: 2,<br>Obj: [{cor: x<sub>0</sub>, y<sub>0</sub>, w, h,<br>level: L<sub>0</sub>},<br>{cor: x<sub>1</sub>, y<sub>1</sub>, w, h,<br>level: L<sub>1</sub>},<br>}]<br>}</td><td>BBWidth: the width size of the bounding box</td><td>Integer (Pixel)</td></tr>
<tr><td>BBHeight: the height size of the bounding box</td><td>Integer (Pixel)</td></tr>
<tr><td>BBId: Bounding box id</td><td>Integer</td></tr>
<tr><td>Obj: recognized object</td><td></td></tr>
<tr><td>Cor: Cordinate information of object</td><td>Float</td></tr>
<tr><td>Level: value of the priority level</td><td>Integer or Float</td></tr>
</table>

POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

CROSS-REFERENCE TO RELATED APPLICATIONS

This application is a National Phase application under 35 U.S.C. 371 of International Application No. PCT/KR2022/019503, filed on Dec. 2, 2022, which claims the benefit of Korean Application No. 10-2021-0171124, filed on Dec. 2, 2021, the contents of which are incorporated by reference herein in their entirety.

TECHNICAL FIELD

Embodiments relate to a method and device for processing point cloud content.

BACKGROUND ART

Point cloud content is represented by a point cloud, which is a set of points belonging to a coordinate system representing a three-dimensional space. The point cloud content may represent three-dimensional media, and may be used to provide various services such as virtual reality (VR), augmented reality (AR), mixed reality (MR), and autonomous driving services. The VR technology is a computer graphic technology that provides an object, a background, or the like of a real world only using a CG image, the AR technology provides a CG image that is virtually made on an actual object image, and the MR technology is a computer graphic technology that mixes and combines virtual objects and provides the same to the real world. The above-described VR, AR, MR, and the like may be simply referred to as extended reality (XR) technology. However, to express the point cloud content, tens of thousands to hundreds of thousands of point data are required. Therefore, there is a need for a method for efficiently processing a huge amount of point data.

DISCLOSURE

Technical Problem

Embodiments provide devices and methods for efficiently processing point cloud data.

Embodiments provide point cloud data processing methods and devices for addressing latency and encoding/decoding complexity.

Embodiments provide devices and methods for achieving ultra-low latency in implementing an immersive interactive system based on point cloud technology.

Embodiments provide devices and methods for controlling the density of objects based on the priority of the objects to effectively reduce the high amount of information while minimizing the degradation of the quality experienced by a user.

The scope of the embodiments is not limited to the aforementioned technical objects, and may be extended to other technical objects that may be inferred by those skilled in the art based on the entirety of the disclosure.

Technical Solution

According to embodiments, a method of transmitting point cloud data may include pre-processing point cloud data containing points, encoding the pre-processed point cloud data, and transmitting the encoded point cloud data and signaling data.

The pre-processing may include classifying the point cloud data into a plurality of objects, mapping a priority level to each of the classified objects, and controlling a density of at least one of the objects based on position information and the priority level about each of the classified objects.

The pre-processing may include controlling the density of the at least one object by adjusting a number of points included in the at least one object.

The pre-processing may include controlling the density of the at least one object by applying a filter to a frame containing the objects based on the position information and the priority level about each of the classified objects.

The pre-processing may include controlling the density of the at least one object by applying a filter to a bounding box containing the objects based on the position information and the priority level about each of the classified objects.

The pre-processing may include generating one or more patches based on points in a bounding box containing the at least one object with the controlled density, packing the one or more patches into a 2D plane, and generating an occupancy map, geometry information, and attribute information based on the one or more patches packed into the 2D plane and the signaling data.

The signaling data may include at least the position information or information of the priority level about each of the classified objects.

The priority level of each of the classified objects may be pre-stored in a table form.

The pre-processing may further include recognizing the plurality of objects from the point cloud data.

According to embodiments, a device for transmitting point cloud data may include a pre-processor configured to pre-process point cloud data containing points, an encoder configured to encode the pre-processed point cloud data, and a transmitter configured to transmit the encoded point cloud data and signaling data.

The pre-processor may be configured to classify the point cloud data into a plurality of objects, map a priority level to each of the classified objects, and control a density of at least one of the objects based on position information and the priority level about each of the classified objects.

The pre-processor may control the density of the at least one object by adjusting a number of points included in the at least one object.

The pre-processor may control the density of the at least one object by applying a filter to a frame containing the objects based on the position information and the priority level about each of the classified objects.

The pre-processor may control the density of the at least one object by applying a filter to a bounding box containing the objects based on the position information and the priority level about each of the classified objects.

The pre-processor may include a patch generator configured to generate one or more patches based on points in the bounding box containing the at least one object with the controlled density, a patch packer configured to pack the one or more patches into a 2D plane, and a generator configured to generate an occupancy map, geometry information, and attribute information based on the one or more patches packed into the 2D plane and the signaling data.

The signaling data may include at least the position information or information of the priority level about each of the classified objects.

The priority level of each of the classified objects may be pre-stored in a table form.

Advantageous Effects

Devices and methods according to embodiments may process point cloud data with high efficiency.

The devices and methods according to the embodiments may provide a high-quality point cloud service.

The devices and methods according to the embodiments may provide point cloud content for providing general-purpose services such as a XR service and a self-driving service.

The devices and methods according to the embodiments may maximize the quality perceived by a user while minimizing the cost of service in an immersive interactive and multi-party conferencing system that enable real-time interaction based on three-dimensionally acquired video.

The devices and methods according to the embodiments may handle very high information volumes for practical implementations of an immersive interactive system and may respond at a near real-time speed to changes in user movement or viewpoint that occur in the form of interactions.

In implementing an immersive interactive system based on point cloud technology, the devices and methods according to embodiments may control the density of point cloud data based on user interest, thereby achieving ultra-low latency while minimizing the degradation of user perceived quality, and effectively reducing high information volume.

In a real-time immersive interactive service, the devices and methods according to embodiments may recognize objects, classify regions of interest suitable for the interactive service, and control the density of point data at different levels for each region, thereby configuring an optimal point cloud set with minimal degradation in quality perceived by the user receiving the service.

DESCRIPTION OF DRAWINGS

The accompanying drawings, which are included to provide a further understanding of the disclosure and are incorporated in and constitute a part of this application, illustrate embodiment(s) of the disclosure and together with the description serve to explain the principle of the disclosure. For a better understanding of various embodiments described below, reference should be made to the description of the following embodiments in connection with the accompanying drawings. The same reference numbers will be used throughout the drawings to refer to the same or like parts.

FIG. 5 is a diagram illustrating an example of an ACK/NACK transmission process and a PUSCH transmission process according to embodiments.

FIG. 21 illustrates a point to point XR teleconference according to embodiments.

FIG. 26 shows an example syntax and semantics of signaling information showing a relationship between a bounding box and an object according to embodiments.

BEST MODE

Preferred embodiments of the embodiments are described in detail, examples of which are shown in the accompanying drawings. The following detailed description with reference to the accompanying drawings is intended to illustrate a preferred embodiment of the embodiments rather than only showing embodiments that may be implemented in accordance with embodiments of the embodiments. The following detailed description includes details to provide a thorough understanding of the embodiments. However, it will be apparent to those skilled in the art that the embodiments may be practiced without these details.

Most terms used in embodiments are selected in general ones that are widely used in the art, but some terms are arbitrarily selected by the applicant and their meaning is described in detail in the following description as needed. Accordingly, embodiments should be understood based on the intended meaning of terms rather than a simple name or meaning of the term.

Figure 1:
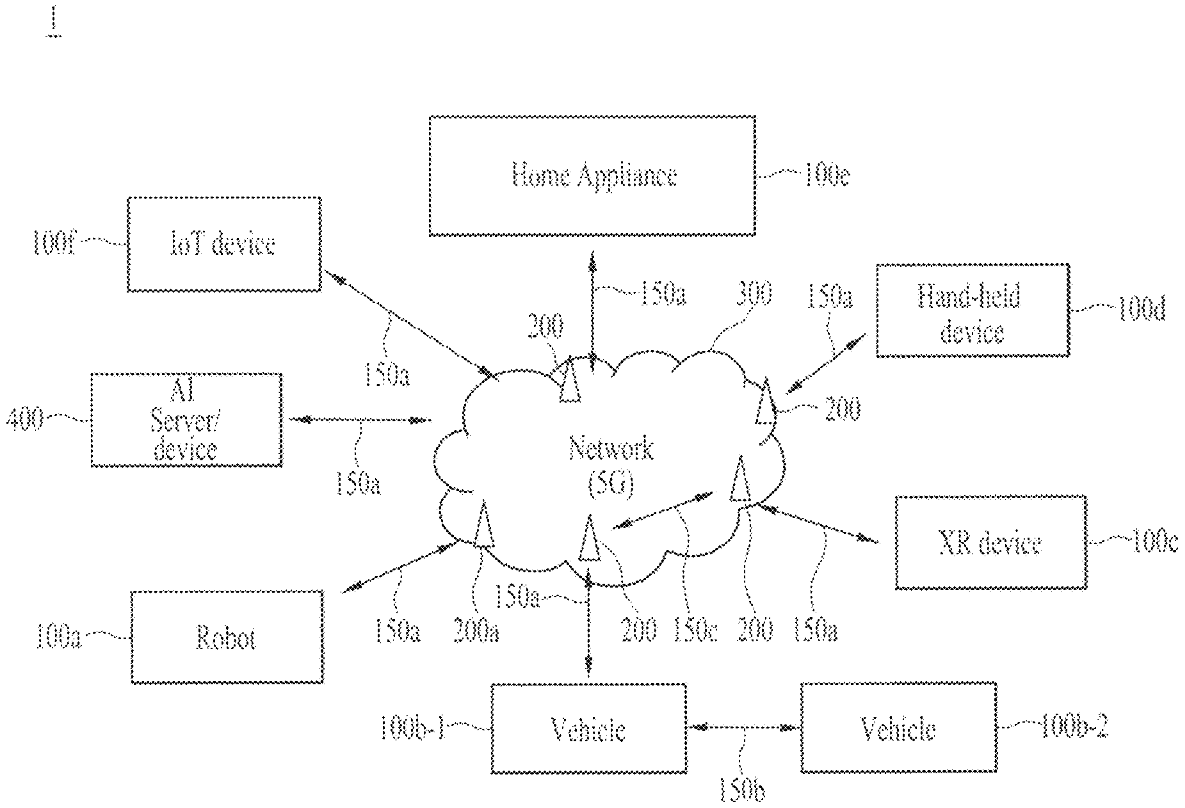
FIG. 1 is a block diagram illustrating an example of a communication system 1 according to embodiments.

FIG. 1 is a block diagram illustrating an example of a communication system 1 according to embodiments.

Referring to FIG. 1, the communication system 1 includes wireless devices 100*a* to 100*f*, a base station (BS) 200, and a network 300. The BS 200 may be referred to as a fixed station, a Node B, an evolved-NodeB (eNB), a Next Generation NodeB (gNB), a base transceiver system (BTS), an access point (AP), a network or 5th generation (5G) network node, an artificial intelligence (AI) system, a road side unit (RSU), a robot, an augmented reality (AR)/virtual reality (VR) system, a server, or the like. According to embodiments, a wireless device refers to a device that performs communication with a BS and/or another wireless device using a wireless access technology (e.g., 5G New RAT (NR) or Long Term Evolution (LTE)), and may be referred to as a communication/wireless/5G device or a user equipment (UE). The wireless devices are not limited to the above embodiments, and may include a robot 100*a*, vehicles 100*b*-1 and 100*b*-2, an extended reality (XR) device 100*c*, a hand-held device 100*d*, a home appliance 100*e*, an Internet of Thing (IoT) device 100*f*, and an AI device/server 400. The XR device 100*c* represents devices that provide XR content (e.g., augmented reality (AR)/virtual reality (VR)/mixed reality (MR) content, etc.). According to embodiments, the XR device may be referred to as an AR/VR/MR device. The XR device 100*c* may be implemented in the form of a head-mounted device (HMD), a head-up display (HUD) provided in a vehicle, a television, a smartphone, a computer, a wearable device, a home appliance, a digital signage, a vehicle, a robot, and the like, according to embodiments. For example, the vehicles 100*b*-1 and 100*b*-2 may include a vehicle having a wireless communication function, an autonomous vehicle, a vehicle capable of performing vehicle-to-vehicle communication, and an unmanned aerial vehicle (UAV) (e.g., a drone). The hand-held device 100*d* may include a smartphone, a smart pad, a wearable device (e.g., a smart watch, a smart glass), and a computer (e.g., a laptop computer). The home appliance 100*e* may include a TV, a refrigerator, and a washing machine. The IoT device 100*f* may include a sensor and a smart meter. The wireless devices 100*a* to 100*f* may be connected to the network 300 via the BS 200. The wireless devices 100*a* to 100*f* may be connected to the AI server 400 over the network 300. The network 300 may be configured using a 3G network, a 4G network (e.g., an LTE network), a 5G network (e.g., an NR network), a 6G network, or the like. The wireless devices 100*a* to 100*f* may communicate with each other over the BS 200/the network 300. Alternatively, the wireless devices 100*a* to 100*f* may perform direct communication (e.g., sidelink communication) without using the BS/network.

Wireless signals may be transmitted and received between the wireless devices 100*a* to 100*f* and the BS 200 or between the BSs 200 through wireless communications/connections 150*a*, 150*b*, and 150*c*. The wireless communications/connections according to the embodiments may include various radio access technologies (e.g., 5G, NR, etc.) such as an uplink/downlink communication 150*a*, which is a communication between a wireless device and a BS, a sidelink communication 150*b* (or D2D communication), which is a communication between wireless devices, and a communication 150*c* (e.g., a relay and an integrated access backhaul (IAB) between BSs. The wireless devices 100*a* to 100*f* and the BS 200 may transmit/receive signals on various physical channels for the wireless communications/connections 150*a*, 150*b*, and 150*c*. For the wireless communications/connections 150*a*, 150*b*, and 150*c*, at least one of various configuration information setting procedures for transmitting/receiving wireless signals, various signal processing procedures (e.g., channel encoding/decoding, modulation/demodulation, resource mapping/demapping, etc.), and a resource allocation procedure, and the like may be performed.

According to embodiments, a UE (e.g., an XR device (e.g., the XR device 100*c* of FIG. 1)) may transmit specific information including XR data (or AR/VR data) necessary for providing XR content such as audio/video data, voice data, and surrounding information data to a BS or another UE through a network. According to embodiments, the UE may perform an initial access operation to the network. In the initial access procedure, the UE may acquire cell search and system information to acquire downlink (DL) synchronization. The DL according to the embodiments refers to communication from a base station (e.g., a BS) or a transmitter, which is a part of the BS, to a UE or a receiver included in the UE. According to embodiments, a UE may perform a random access operation for accessing a network. In the random access operation, the UE may transmit a preamble to acquire uplink (UL) synchronization or transmit UL data, and may perform a random access response reception operation. The UL according to the embodiments represents communication from a UE or a transmitter, which is part of the UE, to a BS or a receiver, which is part of the BS. In addition, the UE may perform a UL grant reception operation to transmit specific information to the BS. In embodiments, the UL grant is configured to receive time/frequency resource scheduling information for UL data transmission. The UE may transmit the specific information to the BS through the 5G network based on the UL grant. According to embodiment, the BS may perform XR content processing. The UE may perform a DL grant reception operation to receive a response to the specific information through the 5G network. The DL grant represents receiving time/frequency resource scheduling information to receive DL data. The UE may receive a response to the specific information through the network based on the DL grant.

Figure 2:
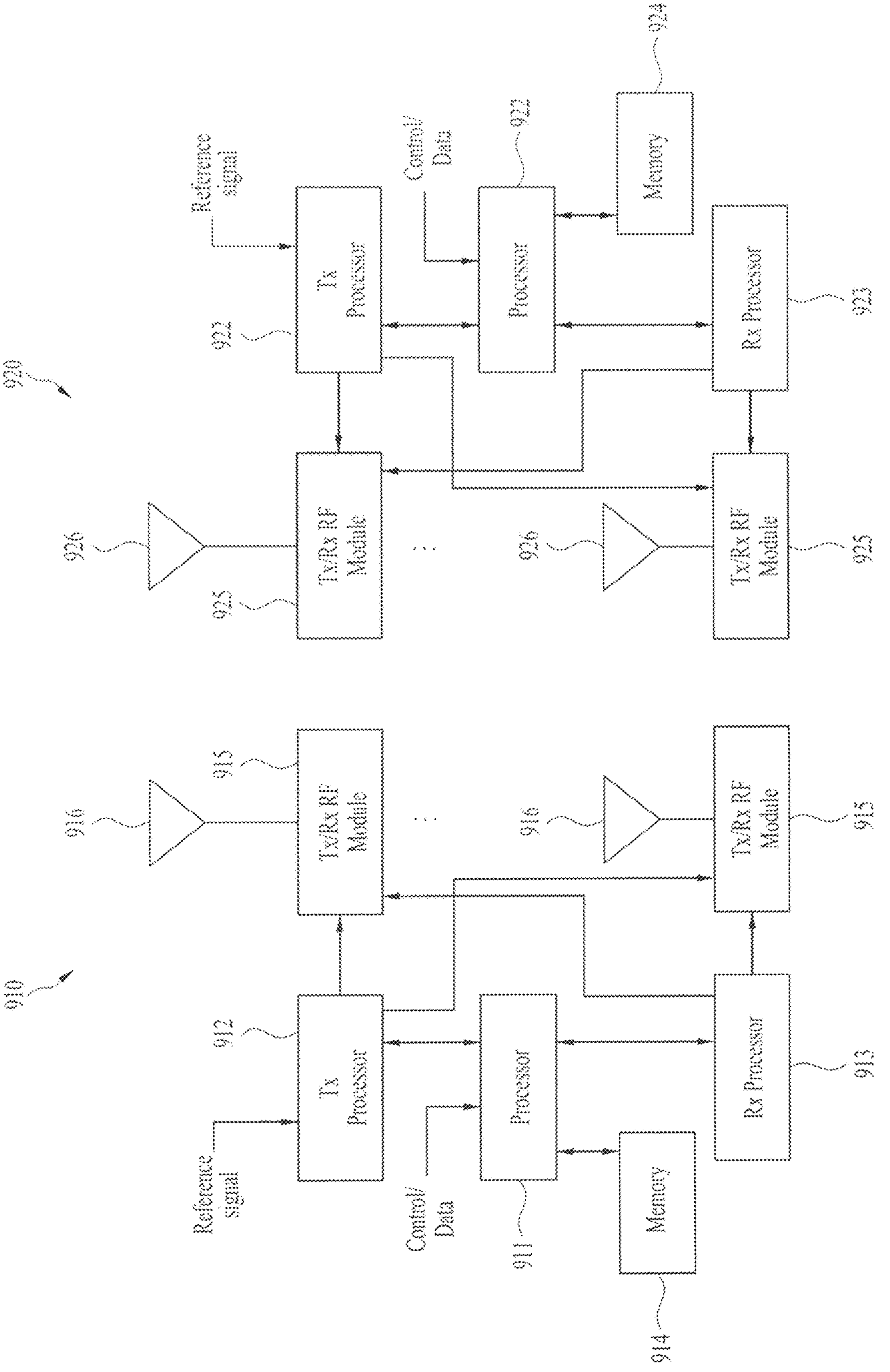
FIG. 2 is an example block diagram of a wireless communication system to which methods according to embodiments are applicable.

FIG. 2 is a block diagram illustrating a wireless communication system to which methods according to embodiments are applicable.

The wireless communication system includes a first communication device 910 and/or a second communication device 920. In the present disclosure, "A and/or B" may be interpreted as having the same meaning as "at least one of A or B." The first communication device may represent the BS, and the second communication device may represent the UE (or the first communication device may represent the UE and the second communication device may represent the BS).

The first communication device and the second communication device include a processor 911, 921, a memory 914, 924, one or more TX/RX RF modules 915, 925, a TX processor 912, 922, an RX processor 913, 923, and an antenna 916, 926. The Tx/Rx module are also referred to as a transceiver. The processor 911 may perform a signal processing function of a layer (e.g., layer 2 (L2)) of a physical layer or higher. For example, in downlink or DL (communication from the first communication device to the second communication device), an upper layer packet from the core network is provided to the processor 911. In the DL, the processor 911 provides multiplexing between a logical channel and a transport channel and radio resource allocation to the second communication device 920, and is responsible for signaling to the second communication device. The first communication device 910 and the second communication device 920 may further include a processor (e.g., an audio/video encoder, an audio/video decoder, etc.) configured to process data from a layer higher than the upper layer packet processed by the processors 911 and 921. The processor according to the embodiments may process video data processed according to various video standards (e.g., MPEG2, AVC, HEVC, VVC, etc.) and audio data processed by various audio standards (e.g., MPEG 1 Layer 2 Audio, AC3, HE-AAC, E-AC-3, HE-AAC, NGA, etc.). Also, according to embodiments, the processor may process XR data or XR media data processed by a Video-Based Point Cloud Compression (V-PCC) or Geometry-Based Point Cloud Compression (G-PCC) scheme. The XR data or the XR media data may be referred to as point cloud data. The processor configured to process higher layer data may be coupled to the processors 911 and 921 to be implemented as one processor or one chip. Alternatively, the processor configured to process higher layer data may be implemented as a separate chip or a separate processor from the processors 911 and 921. The TX processor 912 implements various signal processing functions for layer L1 (i.e., the physical layer). The signal processing function of the physical layer may facilitate forward error correction (FEC) in the second communication device. The signal processing function of the physical layer includes coding and interleaving. Signals that have undergone encoding and interleaving are modulated into complex valued modulation symbols through scrambling and modulation. In the modulation, BPSK, QPSK, 16 QAM, 64 QAM, 246 QAM, etc. may be used according to a channel. The complex valued modulation symbols (hereinafter, modulation symbols) are divided into parallel streams. Each stream is mapped to an OFDM (Orthogonal Frequency Division Multiplexing) subcarrier, multiplexed with a reference signal in the time and/or frequency domain, and combined together using IFFT to generate a physical channel for carrying a time-domain OFDM symbol stream. The OFDM symbol stream is spatially precoded to generate a multi-spatial stream. Each spatial stream may be provided to a different antenna 916 via an individual Tx/Rx module (or transceiver) 915. Each Tx/Rx module may frequency up-convert each spatial stream to an RF subcarrier for transmission. In the second communication device, each Tx/Rx module (or transceiver) 925 receives a signal of the RF subcarrier through each antenna 926 of each Tx/Rx module. Each Tx/Rx module reconstructs a baseband signal from the signal of the RF subcarrier and provides the same to the RX processor 923. The RX processor implements various signal processing functions of L1 (i.e., the physical layer). The RX processor may perform spatial processing on the information to recover any spatial stream directed to the second communication device. If multiple spatial streams are directed to the second communication device, they may be combined into a single OFDMA symbol stream by multiple RX processors. An RX processor converts an OFDM symbol stream, which is a time-domain signal, into a frequency-domain signal using a Fast Fourier Transform (FFT). The frequency-domain signal includes an individual OFDM symbol stream for each subcarrier of the OFDM signal. The modulation symbols on each subcarrier and the reference signal are recovered and demodulated by determining the most likely constellation points transmitted by the first communication device. These soft decisions may be based on channel estimation values. The soft decisions are decoded and deinterleaved to recover the data and control signal originally transmitted by the first communication device on the physical channel. The data and control signal are provided to the processor 921.

The UL (communication from the second communication device to the first communication device) is processed by the first communication device 910 in a manner similar to that described in connection with the receiver function of the second communication device 920. Each TX RX/RX module 925 receives a signal through each antenna 926. Each Tx/Rx module provides RF subcarrier and information to the RX processor 923. The processor 921 may be related to the memory 924 that stores program code and data. The memory may be referred to as a computer-readable medium.

Figure 3:
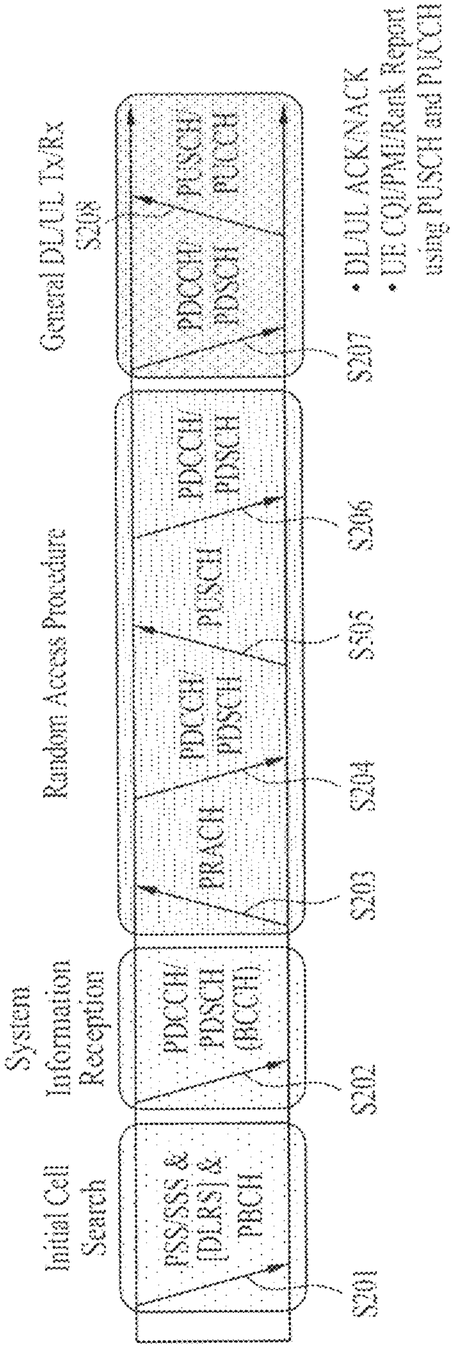
FIG. 3 is a diagram illustrating an example of a 3GPP signal transmission/reception method.
Figure 4:
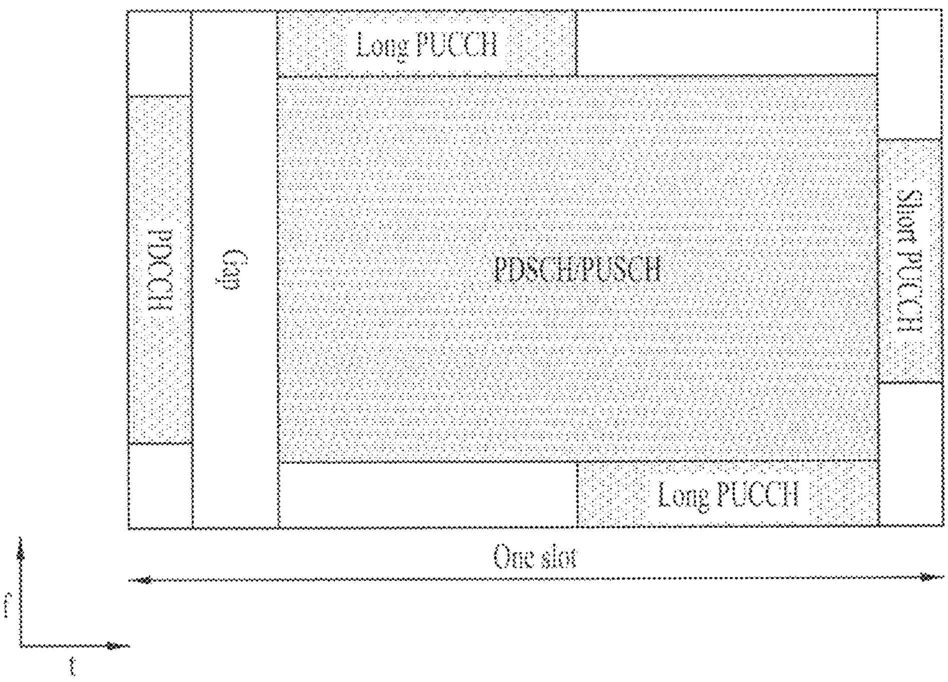
FIG. 4 is a diagram illustrating an example mapping of physical channels within self-contained slots according to embodiments.

FIGS. 3 to 5 illustrate examples of one or more signal processing methods and/or operations for layer L1 (i.e., the physical layer). The examples disclosed in FIGS. 3 to 5 may be the same as or similar to the example of a signal processing method and/or operations performed by the TX processor 912 and/or the TX processor 922 described with reference to FIG. 2.

FIG. 3 illustrates an example of a 3GPP signal transmission/reception method.

According to embodiments, when a UE is turned on or enters a new cell, the UE may perform an initial cell search such as synchronization with a BS (S201). The UE may receive a primary synchronization channel (P-SCH) and a secondary synchronization channel (S-SCH) from the BS to synchronize with the BS and acquire information such as cell ID. In the LTE system and the NR system, the P-SCH and the S-SCH may be referred to as a primary synchronization signal (PSS) and a secondary synchronization signal (SSS), respectively. After the initial cell search, the UE may receive a physical broadcast channel (PBCH) from the BS to acquire broadcast information in the cell. In the initial cell search operation, the UE may receive a DL reference signal (DL-RS) and check the state of the DL channel.

After the initial cell search, the UE may acquire more detailed system information by receiving a PDSCH (Physical Downlink Shared Channel) according to the information carried on the PDCCH (Physical Downlink Control Channel) and the PDCCH (S202).

When the UE initially accesses the BS or does not have radio resources for signal transmission, the UE may perform a random access procedure for the BS (operations S203 to S206). To this end, the UE may transmit a specific sequence as a preamble through the PRACH (Physical Random Access Channel) (S203 and S205), and receive a random access response (RAR) message for the preamble through the PDCCH and the corresponding PDSCH (S204 and S206). In the case of a contention-based random access procedure, a contention resolution procedure may be additionally performed.

After performing the above-described procedure, the UE may perform PDCCH/PDSCH reception (S207) and PUSCH (Physical Uplink Shared Channel)/PUCCH (Physical Uplink Control Channel) transmission (S208) as a general UL/DL signal transmission procedure. In particular, the UE receives DCI through a PDCCH. The UE monitors a set of PDCCH candidates on monitoring occasions configured in one or more control element sets (CORESETs) on a serving cell according to corresponding search space configurations. The set of PDCCH candidates to be monitored by the UE may be defined in terms of search space sets. The search space set according to the embodiments may be a common search space set or a UE-specific search space set. A CORESET consists of a set of (physical) resource blocks having a time duration of 1 to 3 OFDM symbols. The network may configure the UE to have a plurality of CORESETs. The UE monitors PDCCH candidates in one or more search space sets. Here, the monitoring means attempting to decode the PDCCH candidate(s) in the search space. When the UE succeeds in decoding one of the PDCCH candidates in the search space, the UE may determine that the PDCCH has been detected from the corresponding PDCCH candidate, and perform PDSCH reception or PUSCH transmission based on the DCI within the detected PDCCH. The PDCCH according to the embodiments may be used to schedule DL transmissions on the PDSCH and UL transmissions on the PUSCH. The DCI on the PDCCH may include a DL assignment (i.e., a DL grant) including at least a modulation and coding format and resource allocation information related to a DL shared channel, or a UL grant including a modulation and coding format and resource allocation information related to a UL shared channel.

The UE may acquire DL synchronization by detecting an SSB. The UE may identify the structure of the SSB burst set based on the detected SSB (time) index (SSBI), thereby detecting the symbol/slot/half-frame boundary. The number assigned to the frame/half-frame to which the detected SSB belongs may be identified based on the system frame number (SFN) information and half-frame indication information. The UE may acquire, from the PBCH, a 10-bit SFN for a frame to which the PBCH belongs. The UE may acquire 1-bit half-frame indication information and determine whether the PBCH belongs to a first half-frame or a second half-frame of the frame. For example, the half-frame indication equal to 0 indicates that the SSB to which the PBCH belongs to the first half-frame in the frame. The half-frame indication bit equal to 1 indicates that the SSB to which the PBCH belongs to the second half-frame in the frame. The UE may acquire the SSBI of the SSB to which the PBCH belongs, based on the DMRS sequence and the PBCH payload carried by the PBCH.

Table 1 below represents the random access procedure of the UE.

TABLE 1

Signal type Acquired operation/information
Step 1 PRACH preamble on UL *Initial beam acquisition
*Random selection of random access preamble ID
Step 2 Random access response on PDSCH *Timing advance information
*Random access preamble ID
*Initial UL grant, Temporary C-RNTI
Step 3 UL transmission on PUSCH *RRC Connection request
*UE identifier
Step 4 Contention resolution on DL Temporary C-RNTI for initial access
*C-RNTI on PDCCH for the UE that is in RRC_CONNECTED The random access procedure is used for various purposes. For example, the random access procedure may be used for network initial access, handover, and UE-triggered UL data transmission. The UE may acquire UL synchronization and UL transmission resources through the random access procedure. The random access procedure is divided into a contention-based random access procedure and a contention free random access procedure.

FIG. 4 illustrates an example of mapping a physical channel in a self-contained slot according to embodiments.

A PDCCH may be transmitted in the DL control region, and a PDSCH may be transmitted in the DL data region. A PUCCH may be transmitted in the UL control region, and a PUSCH may be transmitted in the UL data region. The GP provides a time gap in a process in which the BS and the UE switch from a transmission mode to a reception mode or from the reception mode to the transmission mode. Some symbols at the time of switching from DL to UL in a subframe may be set to the GP.

The PDCCH according to the embodiments carries downlink control information (DCI). For example, the PCCCH (i.e., DCI) carries a transmission format and resource allocation of a downlink shared channel (DL-SCH), resource allocation information about an uplink shared channel (UL-SCH), paging information about a paging channel (PCH), system information on the DL-SCH, resource allocation information about a higher layer control message such as a random access response transmitted on a PDSCH, a transmit power control command, and activation/release of configured scheduling (CS). The DCI includes a cyclic redundancy check (CRC). The CRC is masked/scrambled with various identifiers (e.g., radio network temporary identifier (RNTI)) according to the owner or usage purpose of the PDCCH. For example, when the PDCCH is for a specific UE, the CRC is masked with a UE identifier (e.g., a cell-RNTI (C-RNTI)). When the PDCCH is for paging, the CRC is masked with a paging-RNTI (P-RNTI). When the PDCCH is related to system information (e.g., a system information block (SIB)), the CRC is masked with a system information RNTI (SI-RNTI). When the PDCCH is for a random access response, the CRC is masked with a random access-RNTI (RA-RNTI).

The PDCCH is composed of 1, 2, 4, 8, or 16 control channel elements (CCEs) according to an aggregation level (AL). A CCE is a logical allocation unit used to provide a PDCCH having a predetermined code rate according to a radio channel state. The CCE consists of 6 resource element groups (REGs). An REG is defined as one OFDM symbol and one (P) RB. The PDCCH is transmitted through a control resource set (CORESET). The CORESET is defined as an REG set with a given numerology (e.g., SCS CP length, etc.). Multiple CORESETs for one UE may overlap each other in the time/frequency domain. The CORESET may be configured through system information (e.g., master information block (MIB)) or UE-specific higher layer (e.g., radio resource control (RRC) layer) signaling. Specifically, the number of RBs and the number of OFDM symbols (up to 3 symbols) that constitute a CORESET may be configured by higher layer signaling.

For PDCCH reception/detection, the UE monitors PDCCH candidates. The PDCCH candidates represent the CCE(s) to be monitored by the UE for PDCCH detection. Each PDCCH candidate is defined as 1, 2, 4, 8, and 16 CCEs according to the AL. The monitoring includes (blind) decoding PDCCH candidates. A set of PDCCH candidates monitored by the UE is defined as a PDCCH search space (SS). The SS includes a common search space (CSS) or a UE-specific search space (USS). The UE may acquire the DCI by monitoring PDCCH candidates in one or more SSs configured by the MIB or higher layer signaling. Each CORESET is associated with one or more SSs, and each SS is associated with one CORESET. The SS may be defined based on the following parameters.

controlResourceSetId: Indicates the CORESET related to the SS.

monitoringSlotPeriodicity AndOffset: Indicates the PDCCH monitoring periodicity (in slots) and PDCCH monitoring interval offset (in slots)

monitoringSymbolsWithinSlot: Indicates the PDCCH monitoring symbols within the slot (e.g., first symbol(s) of CORESET)

nrofCandidates: Indicates the number of PDCCH candidates (one of 0, 1, 2, 3, 4, 5, 6, and 8) for AL={1, 2, 4, 8, 16}.

*An occasion (e.g., time/frequency resource) on which PDCCH candidates should be monitored is defined as a PDCCH (monitoring) occasion. One or more PDCCH (monitoring) occasions may be configured within the slot.

The PUCCH carries uplink control information (UCI). The UCI includes the following.

Scheduling request (SR): Information used to request UL-SCH resources.

Hybrid automatic repeat request (HARQ)-acknowledgement (ACK): A response to a DL data packet (e.g., a codeword) on a PDSCH. It indicates whether a DL data packet has been successfully received. In response to a single codeword, 1 bit of HARQ-ACK may be transmitted. In response to two codewords, two bits of HARQ-ACK may be transmitted. The HARQ-ACK response includes a positive ACK (simply, ACK), a negative ACK (NACK), DTX or NACK/DTX. The HARQ-ACK, HARQ ACK/NACK and the ACK/NACK may be used interchangeably.

Channel state information (CSI): Feedback information about a DL channel. Multiple Input Multiple Output (MIMO)-related feedback information includes a rank indicator (RI) and a precoding matrix indicator (PMI).

The PUSCH carries UL data (e.g., UL-SCH transport block (UL-SCH TB)) and/or uplink control information (UCI), and is transmitted based on a cyclic prefix-orthogonal frequency division multiplexing (CP-OFDM) waveform or a discrete Fourier transform-spread-orthogonal frequency division multiplexing (DFT-s-OFDM) waveform. When the PUSCH is transmitted based on the DFT-s-OFDM waveform, the UE transmits the PUSCH by applying transform precoding. For example, when the transform precoding is not available (e.g., the transform precoding is disabled), the UE transmits a PUSCH based on the CP-OFDM waveform. When the transform precoding is available (e.g., the transform precoding is enabled), the UE may transmit the PUSCH based on the CP-OFDM waveform or the DFT-s-OFDM waveform. The PUSCH transmission may be dynamically scheduled by a UL grant in the DCI, or may be semi-statically scheduled based on higher layer (e.g., RRC) signaling (and/or Layer 1 (L1) signaling (e.g., PDCCH)). The PUSCH transmission may be performed on a codebook basis or a non-codebook basis.

FIG. 5-(*a*) and FIG. 5-(*b*) illustrate an example of an ACK/NACK transmission procedure and a PUSCH transmission procedure.

FIG. 5-(*a*) illustrates an example of an ACK/NACK transmission procedure.

The UE may detect the PDCCH in slot #n. Here, the PDCCH contains DL scheduling information (e.g., DCI formats 1_0 and 1_1), and the PDCCH indicates DL assignment-to-PDSCH offset (K0) and PDSCH-HARQ-ACK reporting offset (K1). For example, DCI formats 1_0 and 1_1 may include the following information.

Frequency domain resource assignment: Indicates an RB set allocated to the PDSCH Time domain resource assignment: K0, indicates a start position (e.g., an OFDM symbol index) and length (e.g., the number of OFDM symbols) of a PDSCH in a slot PDSCH-to-HARQ_feedback timing indicator: Indicates K1.

HARQ process number (4 bits): Indicates a HARQ process identity (ID) for data (e.g., PDSCH, TB)

Thereafter, the UE may receive the PDSCH in slot #(n+K0) according to the scheduling information of slot #n, and then transmit the UCI through the PUCCH in slot #(n+K1). Here, the UCI includes a HARQ-ACK response for the PDSCH. When the PDSCH is configured to transmit up to 1 TB, the HARQ-ACK response may be configured in 1 bit. In the case where the PDSCH is configured to transmit up to two TBs, the HARQ-ACK response may be configured in 2 bits when spatial bundling is not configured, and may be configured in 1 bit when spatial bundling is configured. When the HARQ-ACK transmission time for a plurality of PDSCHs is designated as slot #(n+K1), the UCI transmitted in slot #(n+K1) includes a HARQ-ACK response for the plurality of PDSCHs. The BS/UE has a plurality of parallel DL HARQ processes for DL transmission. The plurality of parallel HARQ processes allows DL transmissions to be continuously performed while waiting for HARQ feedback for successful or unsuccessful reception for a previous DL transmission. Each HARQ process is associated with a HARQ buffer of a medium access control (MAC) layer. Each DL HARQ process manages state variables related to the number of transmissions of a MAC Physical Data Block (PDU) in a buffer, HARQ feedback for the MAC PDU in the buffer, a current redundancy version, and the like. Each HARQ process is distinguished by a HARQ process ID.

FIG. 5-(*b*) illustrates an example of a PUSCH transmission procedure.

The UE may detect the PDCCH in slot #n. Here, the PDCCH includes UL scheduling information (e.g., DCI formats 0_0 and 0_1). DCI formats 0_0 and 0_1 may include the following information.

Frequency domain resource assignment: Indicates an RB set allocated to a PUSCH

Time domain resource assignment: slot offset K2, indicates a start position (e.g., a symbol index) and length (e.g., the number of OFDM symbols) of a PUSCH in a slot. The start symbol and the length may be indicated through a Start and Length Indicator Value (SLIV), or may be indicated individually. The UE may transmit the PUSCH in slot #(n+K2) according to the scheduling information of slot #n. Here, the PUSCH includes a UL-SCH TB.

Embodiments may be applied to 5G-based media streaming (5GMS) systems. The 5GMS structure is a system that supports a mobile network operator (MNO) and a media DL streaming service of a third party. The 5GMS structure supports a related network or a UE function and API, and provides backward compatibility regardless of supportability of the MBMS and/or the 5G standard and EUTRAN installation. Streaming used in media using 5G is defined by the generation and transfer of temporally continuous media, and the definition of a streaming point indicates that a transmitter and a receiver directly transmit and consume media. The 5GMS structure basically operates in DL and UL environments and has bi-directionality. It is a method for streaming according to a desired scenario and a device capability between the UE and the server, and the functional blocks are technically configured and operated differently. When media is delivered on the DL, the network is an entity that produces the media and the UE is defined as a consumer device that consumes the media. The 5GMS service may use a network such as a 3G, 4G, or 6G network, as well as the 5G network, and is not limited to the above-described embodiment. Embodiments may also provide a network slicing function according to a service type.

Figure 6:
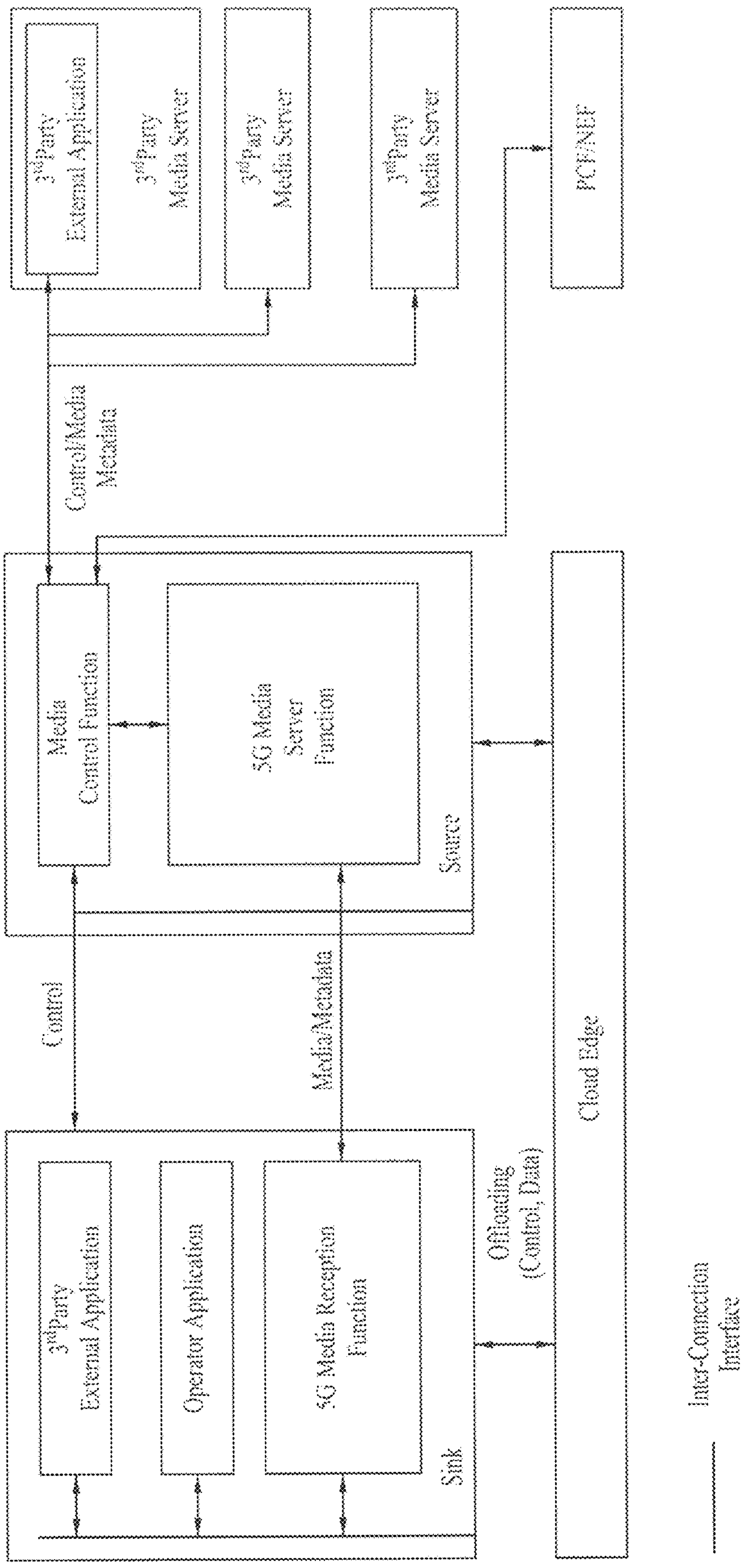
FIG. 6 is a diagram illustrating a downlink structure for media transmission of a 5GMS service according to embodiments.

FIG. 6 illustrates a DL structure for media transmission of a 5GMS service according to embodiments.

FIG. 6 illustrates a media transmission hierarchy for at least one of 4G, 5G, and 6G networks, and a method for operating a device in a unidirectional DL media streaming environment. Since the system is a DL system, media is produced from the network and the Trusted Media Function. The media is delivered to the UE. Each block diagram is conceptually configured as a set of functions necessary for media transmission and reception. The inter-connection interface represents a link for sharing or adjusting a specific part of functions for each media block and is used when not all necessary element technologies are utilized. For example, the 3rd party external application and the operator application may perform independent application operations. However, they may be communicatively connected through the inter-connection interface when a function such as information share (user data, a media track, etc.) is required. According to embodiments, the media may include both information such as time-continuous, time-discontinuous, image, picture, video, audio, and text, and a medium, and may additionally include a format for transmitting the media, and a size of the format.

In FIG. 6, the sink represents a UE, a processor (e.g., the processor 911 for signal processing of the higher layer described with reference to FIG. 2, etc.) included in the UE, or hardware constituting the UE. According to embodiments, the sink may perform a reception operation of receiving a streaming service in a unicast manner from a source providing media to the sink. The sink may receive control information from the source and perform signal processing based on the control information. The sink may receive media/metadata (e.g., XR data or extended media data) from the source. The sink may include a 3rd Party External Application block, an Operator Application block, and/or a 5G Media Reception Function block. According to embodiments, the 3rd Party External Application block and the Operator Application block of the sink represent UE applications operating at the sink stage. The 3rd Party External Application block is an application operated by a third party present outside the 4G, 5G, and 6G networks, and may drive an API connection of the sink. The 3rd Party External Application block may receive information through the 4G, 5G, or 6G network, or through direct point-to-point communication. Therefore, the UE of the sink may receive an additional service through a native or downloaded installed application. The Operator Application block may manage an application (5G Media Player) associated with a media streaming driving environment including a media application. When the application is installed, the UE of the sink may start accessing the media service through the API using an application socket and transmit and receive related data information. The API allows data to be delivered to a particular end-system by configuring a session using the socket. The socket connection method may be delivered through a general TCP-based Internet connection. The sink may receive control/data information from a cloud edge, and may perform offloading for transmitting control/data information and the like to the cloud edge. Although not shown in the drawings, the sink may include an Offloading Management block. The offloading management according to the embodiments may control operations of the Operator Application block and/or the 3rd Party Application block to control the offloading of the sink.

According to embodiments, the 5G Media Reception block may receive operations related to offloading from the Offloading Management block, acquire media that may be received through the 4G, 5G, or 6G network, and process the media. According to embodiments, the 5G Media Reception Function block may include a general Media Access Client block, a DRM Client block, a media decoder, a Media Rendering Presentation block, an XR Rendering block, and an XR Media Processing block. These blocks are merely an example, and the names and/or operations thereof are not limited to the embodiments.

According to embodiments, the Media Access Client block may receive data, for example, a media segment, through at least one of the 4G, 5G, and 6G networks. According to embodiments, the Media Access Client block may de-format (or decapsulate) various media transmission formats such as DASH, CMAF, and HLS. The data output from the Media Access Client block may be processed and displayed according to each decoding characteristic. The DRM Client block may determine whether the received data is used. For example, the DRM Client block may perform a control operation to allow an authorized user to use the media information within the access range. The Media Decoding block is a general audio/video decoder and may decode audio/video data processed according to various standards (including video standards such as MPEG2, AVC, HEVC, and VVC, and audio standards such as MPEG 1 Layer 2 Audio, AC3, HE-AAC, E-AC-3, HE-AAC, and NGA) among the de-formatted data. The Media Rendering Presentation block may render media so as to be suitable for the reception device. The Media Rendering Presentation block may be included in the Media Decoding block. The XR Media Processing block and the XR Rendering block are configured to process XR data among the de-formatted data (or decapsulated data). The XR Media Processing block (e.g., the processor 911 described with reference to FIG. 2 or a processor for processing higher layer data) may use XR data received from the source or information (e.g., object information, position information, etc.) received from the Offloading Management block to process XR media. The XR rendering block may render and display XR media data among the received media data. The XR Media Processing block and the XR Rendering block may process and render point cloud data processed according to a Video-Based Point Cloud Compression (V-PCC) or Geometry-Based Point Cloud Compression (G-PCC) scheme. The V-PCC scheme will be described in detail below with reference to FIGS. 8 to 13. The XR Media Processing block and the XR Rendering block according to the embodiments may be configured as a single XR decoder.

The source represents a media server or a UE capable of providing media using at least one of the 4G, 5G, or 6G network and may perform the functions of Control Function and Server Function. The Server Function initiates and hosts 4G, 5G, and 6G media services. The 3rd Party Media Server represents various media servers operated by third parties present outside the 4G, 5G, and 6G networks, and may be a Network External Media Application Server. In general, the External Server operated by a third-party service may perform media production, encoding, formatting, and the like in places other than the 4G, 5G, and 6G networks in the same manner. The Control Function represents a network-based application function, and may include a sink and other media servers, as well a control-oriented information delivery function when performing media authentication. Thus, the Source may initiate a connection through API connection of an internal application using the Control Function and may establish a media session or request additional information. The Source may also exchange PCF information with other network functions through the Control Function. Through the Control Function, the Source may identify external network capabilities using the NEF and perform general monitoring and provisioning through the exposure process. Accordingly, the NEF may receive other network information and store the received information as structured data using a specific standardized interface. The stored information may be exposed/re-exposed to other networks and applications by the NEF, and the information exposed in various network environments may be collected and used for analysis. As shown in FIG. 6, when the service configuration connection is established, the API Control Plane is formed. When the session connection is established, tasks such as security (authentication, authorization, etc.) may be included and an environment allowing media to be transmitted is formed. If there are multiple 4G, 5G, and 6G media functions in the source, multiple APIs may be created or one API may be used to create a control plane. Similarly, an API may be created from a third-party media server, and the Media Control Function and the API of the UE may form a media user plane API. The source may generate and deliver media using various methods to perform the Downlink Media Service function, and may include all functions, from simply storing media to playing a media relaying role, to deliver media to the UE corresponding to the sink, which is the final destination. Modules or blocks within the sink and source according to embodiments may deliver and share information via the inter-connection link and inter-connection interface that are bidirectional.

The embodiments describe a UL structure and method for transmitting media content produced in real time in a 5GMS system to social media, users, servers, etc. Uplink is basically defined as creating media and delivering the same to the media server from the UE perspective, rather than as delivering media to the user in the form of distribution. Unlike the downlink system, the uplink system is configured in the form of direct content provision by individual users, and accordingly the system configuration method handled by the UE, use cases to utilize, and the system structure may be different from those for the downlink. The FLUS system consists of a source entity that produces media and a sink entity that consumes media, and delivers services such as voice, video, and text through 1:1 communication. Accordingly, techniques such as signaling, transport protocol, packet-loss handling, and adaptation may be applied, and the FLUS system may provide expectable media quality and flexibility. The FLUS source may be a single UE or multiple distributed UEs, a capture device, or the like. Since the network is assumed to be a 5G network, 3GPP IMS/MTSI services may be supported, and IMS services may be supported through the IMS control plane. Also, services may be supported in compliance with the MTSI service policy. If IMS/MTSI services are not supported, uplink services may be supported by various user plane instantiations through the Network Assistance function.

Figure 7:
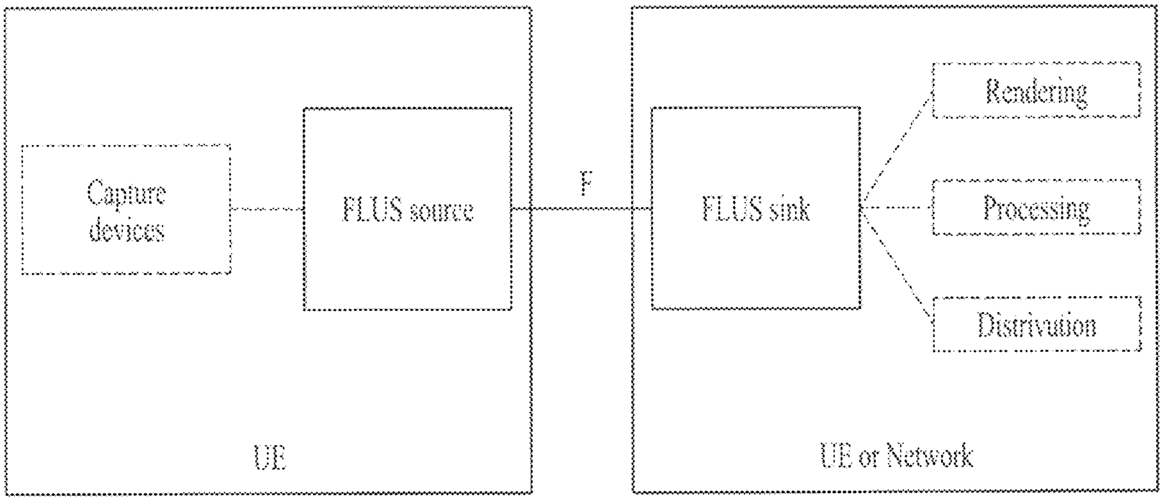
FIG. 7 is a diagram illustrating an example FLUS structure for an uplink service according to embodiments.

FIG. 7 illustrates an example of a FLUS structure for an uplink service.

The FLUS structure may include a source and a sink as described with reference to FIG. 6. The source may correspond to a UE. The sink may correspond to a UE or a network. An Uplink may include a source and a sink according to the goal of generating and delivering media, where the source may be a UE that is a terminal device and the sink may be another UE or a network. The source may receive media content from one or more capture devices. The capture devices may or may not be connected to a part of the UE. If the sink to receive the media is present in the UE and not in the network, the Decoding and Rendering Functions are included in the UE and the received media shall be delivered to those functions. Conversely, if the sink corresponds to the network, the received media may be delivered to the Processing or Distribution Sub-Function. If the sink is positioned in the network, it may include the role of the Media Gateway Function or Application Function, depending on its role. The F link, shown in FIG. 7, serves to connect the source and the sink, and specifically enables the control and establishment of FLUS sessions through this link. Authentication/authorization between the source and the sink through the F link may also be included. More specifically, the F link may be divided into Media Source and Sink (F-U end-points), Control Source and Sink (F-C end-points), Remote Controller and Remote Control Target (F-RC end-points), and Assistance Sender and Receiver (F-A end-points). The source and the sink are distinguished by the Logical Functions. Therefore, the functions may be present in the same physical device, or may be separated and not present in the same device. Each function may also be separated into multiple physical devices and connected by different interfaces. A single FLUS source may have multiple F-A and F-RC points. Each point is independent of the FLUS sink and may be generated according to the offered service. As described earlier, the F link point may assume all F point-specifically present sub-functions and the security function of the link and may include the corresponding authentication process.

As described above, the processor of the transmission device may process point cloud data, such as XR data or XR media data, in a video-based point cloud compression (V-PCC) method. Then, the XR media processing block and the XR rendering block of the reception device may process and render the point cloud data processed according to the V-PCC method.

Figure 8:
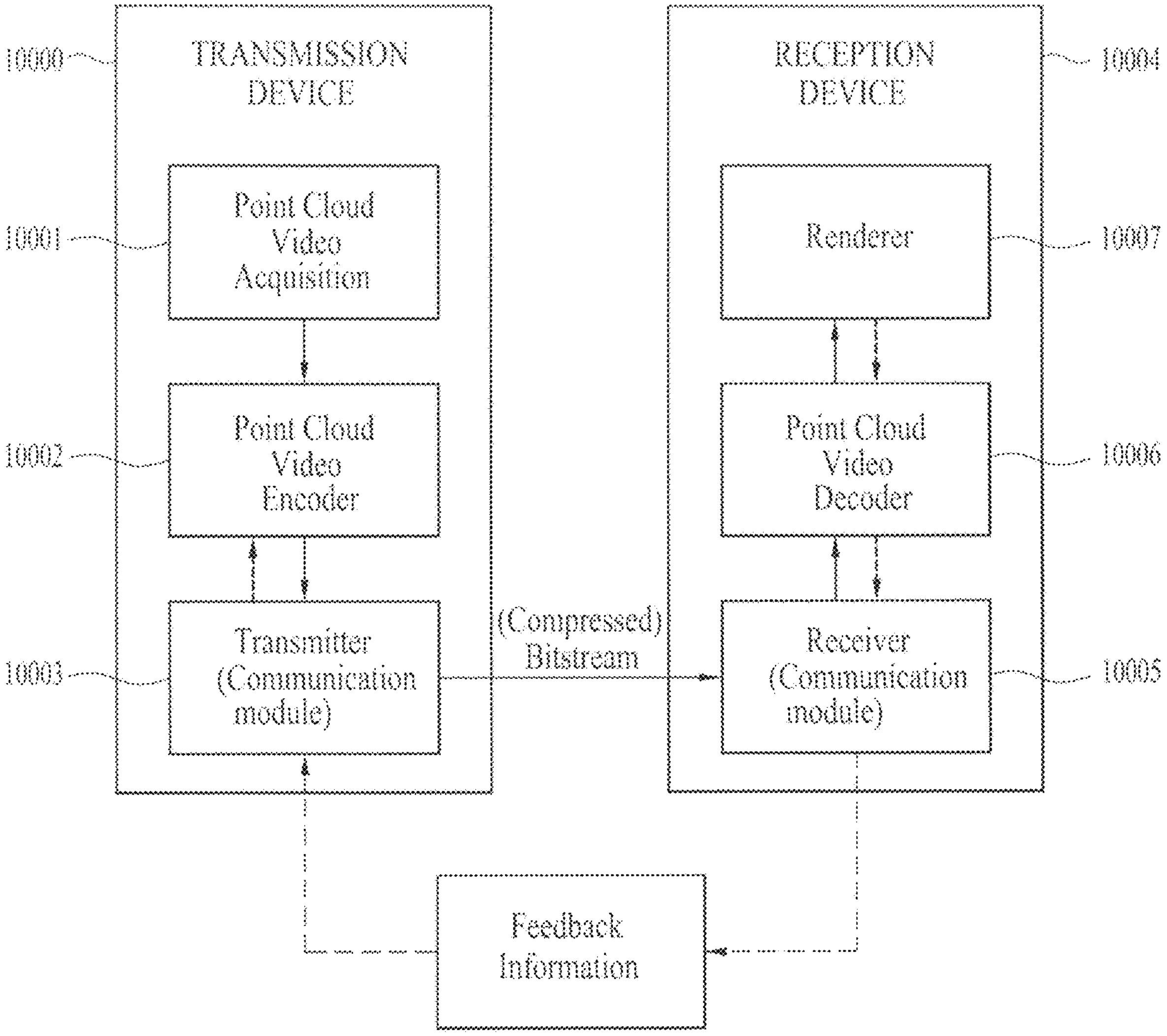
FIG. 8 is a diagram illustrating an example point cloud data processing system according to embodiments.

FIG. 8 is a diagram illustrating an example point cloud data processing system according to embodiments.

The present disclosure provides a method of providing point cloud content to provide a user with various services such as virtual reality (VR), augmented reality (AR), mixed reality (MR), and autonomous driving. The point cloud content according to the embodiments represent data representing objects as points, and may be referred to as a point cloud, point cloud data, point cloud video data, point cloud image data, or the like.

A point cloud data transmission device 10000 according to embodiment may include a point cloud video acquisition unit 10001, a point cloud video encoder 10002, a file/segment encapsulation module (or file/segment encapsulator) 10003, and/or a transmitter (or communication module) 10004. The transmission device according to the embodiments may secure and process point cloud video (or point cloud content) and transmit the same. According to embodiments, the transmission device may include a fixed station, BS, UE, a base transceiver system (BTS), a network, an artificial intelligence (AI) device and/or system, a robot, and an AR/VR/XR device and/or a server, as described in FIGS. 1 to 7. According to embodiments, the transmission device 10000 may include a device robot, a vehicle, AR/VR/XR devices, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The point cloud video acquisition unit 10001 according to the embodiments acquires a point cloud video through a process of capturing, synthesizing, or generating a point cloud video.

The point cloud video encoder 10002 according to the embodiments encodes the point cloud video data acquired from the point cloud video acquisition unit 10001. According to embodiments, the point cloud video encoder 10002 may be referred to as a point cloud encoder, a point cloud data encoder, an encoder, or the like. The point cloud compression coding (encoding) according to the embodiments is not limited to the above-described embodiment. The point cloud video encoder 10002 may output a bitstream including the encoded point cloud video data. The bitstream may include not only the encoded point cloud video data, but also signaling information related to encoding of the point cloud video data.

The point cloud video encoder 10002 according to the embodiments may support the video-based point cloud compression (V-PCC) encoding scheme. In addition, the point cloud video encoder 10002 may encode a point cloud (referring to either point cloud data or points) and/or signaling data related to the point cloud.

The point cloud video encoder 10002 according to the embodiments may perform a series of operations such as prediction, transformation, quantization, entropy coding, etc. for compression and coding efficiency. The encoded data (encoded video/image information) may be output in the form of a bitstream. Based on the V-PCC procedure, the point cloud video encoder 10002 may encode the point cloud video by dividing the point cloud video into geometry video, attribute video, occupancy map video, and auxiliary information, as described later. The geometry video may contain geometry images, the attribute video may contain attribute images, and the occupancy map video may contain occupancy map images. The auxiliary information (also referred to as auxiliary data) may include auxiliary patch information. The attribute video/image may include a texture video/image.

The file/segment encapsulation module 10003 according to the embodiments may encapsulate encoded point cloud video data and/or point cloud video related metadata (or signaling data) in the form of a file or the like. Here, the point cloud video related metadata may be received from a metadata processor or the like. The metadata processor may be included in the point cloud video encoder 10002, or may be configured as a separate component/module. The encapsulation module 10003 may encapsulate the data into a file format such as ISOBMFF or process the data into other DASH segments or the like. The encapsulation module 10003 may include the point cloud video related metadata in the file format according to embodiments. For example, the point cloud video related metadata may be included in boxes at various levels in the ISOBMFF file format or as data within a separate track in the file. According to embodiments, the encapsulation module 10003 may encapsulate the point cloud video related metadata into a file.

In addition to the point cloud video data, the transmission processor may also receive point cloud video related metadata from the metadata processor and process the metadata for transmission according to embodiments.

The transmitter (or communication module) 10004 may transmit the encoded point cloud video data and/or point cloud video related metadata in the form of a bitstream according to embodiments. In embodiments, the file or segment may be transmitted to the reception device over a network or stored on a digital storage medium (e.g., USB, SD, CD, DVD, Blu-ray, HDD, SSD, etc.). The transmitter according to the embodiments is capable of wired or wireless communication with the reception device (or receiver) over a network such as 4G, 5G, 6G, etc. The transmitter 10004 may also perform necessary data processing operations depending on the network system (e.g., a communication network system such as 4G, 5G, 6G, etc.). The transmission device may transmit the encapsulated data in an on-demand manner.

A point cloud data receiving device 10005 according to embodiments includes a receiver 10006, a file/segment decapsulation module 10007, a point cloud video decoder 10008, and/or a renderer 10009. According to embodiments, the reception device may include a device, robot, vehicle, AR/VR/XR device, mobile device, home appliance, Internet of Things (IoT) device, and AI device/server that communicate with a base station and/or other wireless devices using a wireless access technology (e.g., 5G New RAT (NR), Long Term Evolution (LTE)) described with reference to FIGS. 1 to 7.

According to embodiments, the receiver 10006 receives a bitstream containing the point cloud video data. According to embodiments, the receiver 10006 may receive the point cloud video data over a broadcast network, broadband, or a digital storage medium, depending on the channel on which the point cloud video data is transmitted. In some embodiments, the receiver 10006 may transmit feedback information to the point cloud data transmission device 10000.

In embodiments, the receiver 10006 may deliver the received point cloud video data to the file/segment decapsulation module 10007 and the point cloud video related metadata to the metadata processor (not shown). The point cloud video related metadata may be in the form of a signaling table.

The file/segment decapsulation module 10007 according to embodiments decapsulates files and/or segments containing point cloud data.

In embodiments, the file/segment decapsulation processing module 10007 may decapsulate files in accordance with ISOBMFF or the like to acquire a point cloud video bitstream or point cloud video related metadata (metadata bitstream). The acquired point cloud video bitstream may be delivered to a point cloud video decoder 10008, and the acquired point cloud video-related metadata (metadata bitstream) may be delivered to the metadata processor (not shown). The point cloud video bitstream may include metadata (metadata bitstream). The metadata processor may be included in the point cloud video decoder 10008, or may be configured as a separate component/module. The point cloud video related metadata acquired by the file/segment decapsulation processing module 10007 may be in the form of boxes or tracks within the file format. The file/segment decapsulation processing module 10007 may also receive metadata necessary for decapsulation from the metadata processing module, when necessary. The point cloud video related metadata may be delivered to the point cloud video decoder 10008 and used in the point cloud video decoding procedure, or it may be delivered to the renderer 10009 and used in the point cloud video rendering procedure.

The point cloud video decoder 10008 may receive a bitstream as input and perform operations corresponding to the operations of the point cloud video encoder to decode the video/image. In this case, the point cloud video decoder 10008 may divide the point cloud video into geometry video, attribute video, occupancy map video, and auxiliary information to decode the point cloud video, as described later. The geometry video can include geometry images, the attribute video can include attribute images, and the occupancy map video can include occupancy map images. The auxiliary information may include auxiliary patch information. The attribute video/image may include a texture video/image.

3D geometry may be reconstructed based on the decoded geometry image, occupancy map, and auxiliary patch information, and may then be subjected to a smoothing operation. By assigning color values to the smoothed 3D geometry using a texture image, a color point cloud video/picture may be reconstructed.

The renderer 10009 may render the reconstructed geometry, and color point cloud video/picture. The rendered video/picture may be displayed through a display (not shown). The user may view all or a portion of the rendered results on a VR/AR display, a typical display, or the like.

In some embodiments, the renderer 10009 may transmit feedback information acquired at the receiving side to the point cloud video decoder 10008. According to embodiments, the point cloud video data may deliver the feedback information to the receiver 10006. In embodiments, feedback information received by the point cloud transmission device may be provided to the point cloud video encoder 10002.

The dashed arrows shown in the figures indicate a transmission path for the feedback information acquired by the receiver 10005. The feedback information is information intended to reflect interactivity with a user consuming the point cloud content, and includes information about the user (e.g., head orientation information, viewport information, etc.). In particular, when the point cloud content is for a service that requires interaction with a user (e.g., an autonomous driving service, etc.), the feedback information may be delivered to the content transmitting side (e.g., the transmission device 10000) and/or the service provider. In some embodiments, the feedback information may be used by the reception device 10005 as well as the transmission device 10000, or it may not be provided.

The head orientation information according to embodiments is information about the user's head position, orientation, angle, motion, and the like. The reception device 10005 according to the embodiments may calculate the viewport information based on the head orientation information. The viewport information may be information about a region of a point cloud video that the user is viewing. A viewpoint or orientation is a point at which the user is viewing the point cloud video, and may refer to a center point of the viewport region. That is, the viewport is a region centered on the viewpoint, and the size and shape of the region may be determined by a field of view (FOV). In other words, the viewport is determined according to the position and viewpoint or orientation of the virtual camera or the user, and the point cloud data is rendered in the viewport based on the viewport information. Accordingly, the reception device 10005 may extract the viewport information based on a vertical or horizontal FOV supported by the device in addition to the head orientation information. Also, the reception device 10005 performs gaze analysis or the like to check the way the user consumes a point cloud, a region that the user gazes at in the point cloud video, a gaze time, and the like. According to embodiments, the reception device 10005 may transmit feedback information including the result of the gaze analysis to the transmission device 10000. The feedback information according to the embodiments may be acquired in the rendering and/or display process. The feedback information according to the embodiments may be secured by one or more sensors included in the reception device 10005. According to embodiments, the feedback information may be secured by the renderer 10009 or a separate external element (or device, component, or the like). The dotted lines in FIG. 8 represent a process of transmitting the feedback information secured by the renderer 10009. The point cloud content providing system may process (encode/decode) point cloud data based on the feedback information. Accordingly, the point cloud video data decoder 10008 may perform a decoding operation based on the feedback information. The reception device 10005 may transmit the feedback information to the transmission device 10000. The transmission device 10000 (or the point cloud video data encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmitting device, a transmitter, or the like, and the reception device 10004 may be called a decoder, a receiving device, a receiver, or the like.

The point cloud data processed by the point cloud processing system of FIG. 8 according to embodiments a of (through series of processes acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud processing system illustrated in FIG. 8 may be implemented in hardware, software, a processor, and/or a combination thereof.

Embodiments may provide point cloud content to provide various services to a user, such as virtual reality (VR), augmented reality (AR), mixed reality (MR), and autonomous driving services.

Methods/devices according to embodiments represent a point cloud data transmission device and/or a point cloud data reception device.

Figure 9:
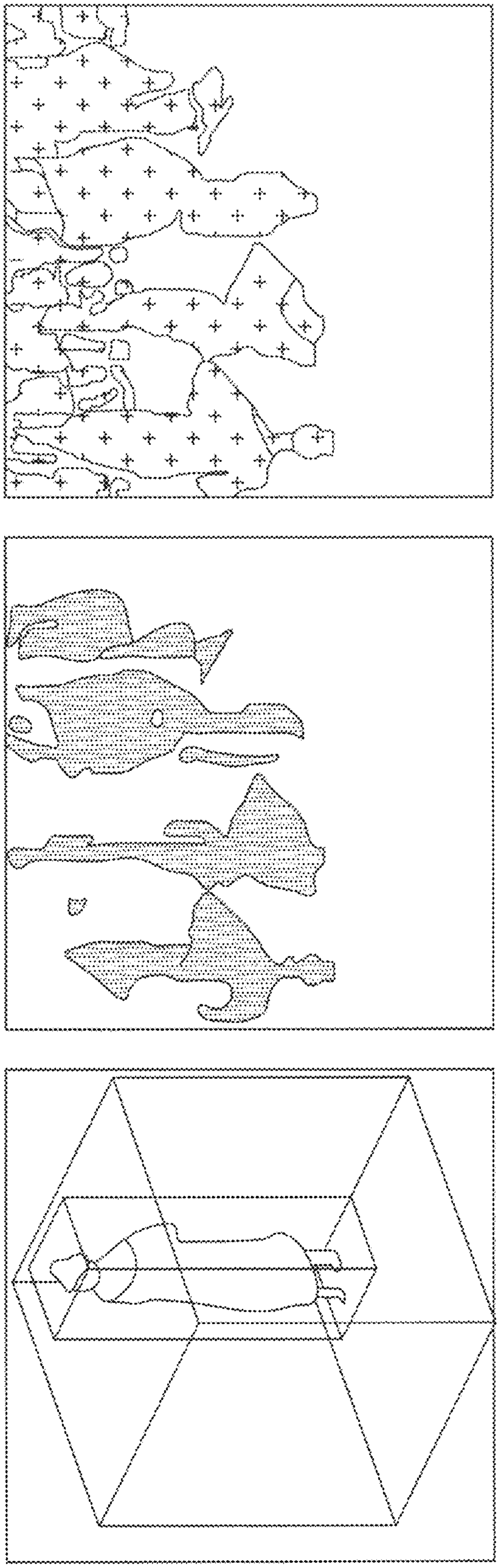
FIG. 9 is a diagram illustrating an example point cloud, geometry, and texture image according to embodiments.

FIG. 9 illustrates an example of a point cloud, a geometry image, and a texture image according to embodiments.

A point cloud according to the embodiments may be input to the V-PCC encoding process of FIG. 10, which will be described later, to generate a geometric image and a texture image. According to embodiments, a point cloud may have the same meaning as point cloud data.

As shown in the FIG. 9, the left part shows a point cloud, in which a point cloud object is positioned in a 3D space and may be represented by a bounding box or the like. The middle part in FIG. 9 shows a geometry image, and the right part in FIG. 9 shows a texture image (non-padded image). In the present disclosure, a geometry image may be called a geometry patch frame/picture or a geometry frame/picture and a texture image may be called an attribute patch frame/picture or an attribute frame/picture.

A video-based point cloud compression (V-PCC) according to embodiments is a method of compressing 3D point cloud data based on a 2D video codec such as High Efficiency Video Coding (HEVC) or Versatile Video Coding (VVC). Data and information that may be generated in the V-PCC compression process are as follows:

Occupancy map: this is a binary map indicating whether there is data at a corresponding position in a 2D plane, using a value of 0 or 1 in dividing the points constituting a point cloud into patches and mapping the same to the 2D plane. The occupancy map may represent a 2D array corresponding to atlas, and the values of the occupancy map may indicate whether each sample position in the atlas corresponds to a 3D point. Atlas means an object including information about 2D patches for each point cloud frame. For example, atlas may include 2D arrangement and size of patches, the position of a corresponding 3D region within a 3D point, a projection plan, and a level of detail (LoD) parameters.

Patch: A set of points constituting a point cloud, which indicates that points belonging to the same patch are adjacent to each other in 3D space and are mapped in the same direction among 6-face bounding box planes in the process of mapping to a 2D image.

Geometry image: this is an image in the form of a depth map that presents position information (geometry) about each point constituting a point cloud on a patch-by-patch basis. The geometry image may be composed of pixel values of one channel. Geometry represents a set of coordinates associated with a point cloud frame.

Texture image: this is an image representing the color information about each point constituting a point cloud on a patch-by-patch basis. A texture image may be composed of pixel values of a plurality of channels (e.g., three channels of R, G, and B). The texture is included in an attribute. According to embodiments, a texture and/or attribute may be interpreted as the same object and/or having an inclusive relationship.

Auxiliary patch info: this indicates metadata needed to reconstruct a point cloud with individual patches. Auxiliary patch information may include information about the position, size, and the like of a patch in a 2D/3D space.

Point cloud data according to the embodiments, for example, V-PCC components may include an atlas, an occupancy map, geometry, and attributes.

Atlas represents a collection of 2D bounding boxes. It may be a group of patches, for example, patches projected into a rectangular frame that correspond to a 3-dimensional bounding box in 3D space, which may represent a subset of a point cloud. In this case, a patch may represent a rectangular region in the atlas corresponding to a rectangular region in a planar projection. In addition, patch data may represent data in which transformation of patches included in the atlas needs to be performed from 2D to 3D. Additionally, a patch data group is also referred to as an atlas.

An attribute may represent a scalar or vector associated with each point in the point cloud. For example, the attributes may include color, reflectance, surface normal, time stamps, material ID.

Figure 10:
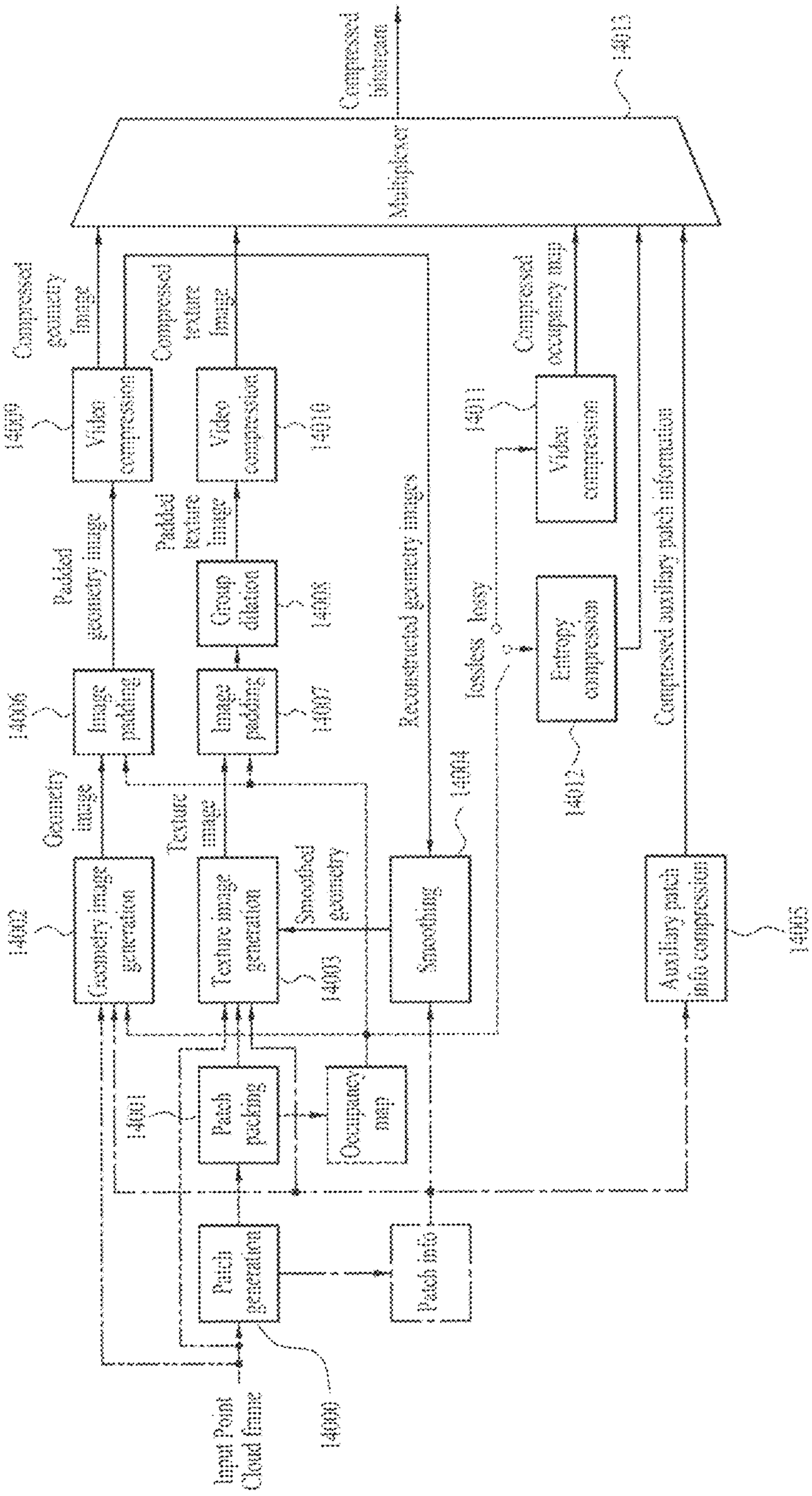
FIG. 10 is a diagram illustrating an example point cloud video encoder according to embodiments.

FIG. 10 is a diagram illustrating an example point cloud video encoder according to embodiments.

FIG. 10 illustrates a V-PCC encoding process for generating and compressing an occupancy map, a geometry image, a texture image, and auxiliary patch information. The V-PCC encoding process of FIG. 10 may be processed by the point cloud video encoder 10002 of FIG. 8. Each element of FIG. 10 may be performed by software, hardware, processor and/or a combination thereof.

The patch generation (or patch generator) 14000 generates one or more patches from the input point cloud data. In addition, patch information including information about patch generation is generated.

In embodiments, the patch generator 14000 may use bounding boxes in the process of generating patches from the point cloud data.

Figure 11:
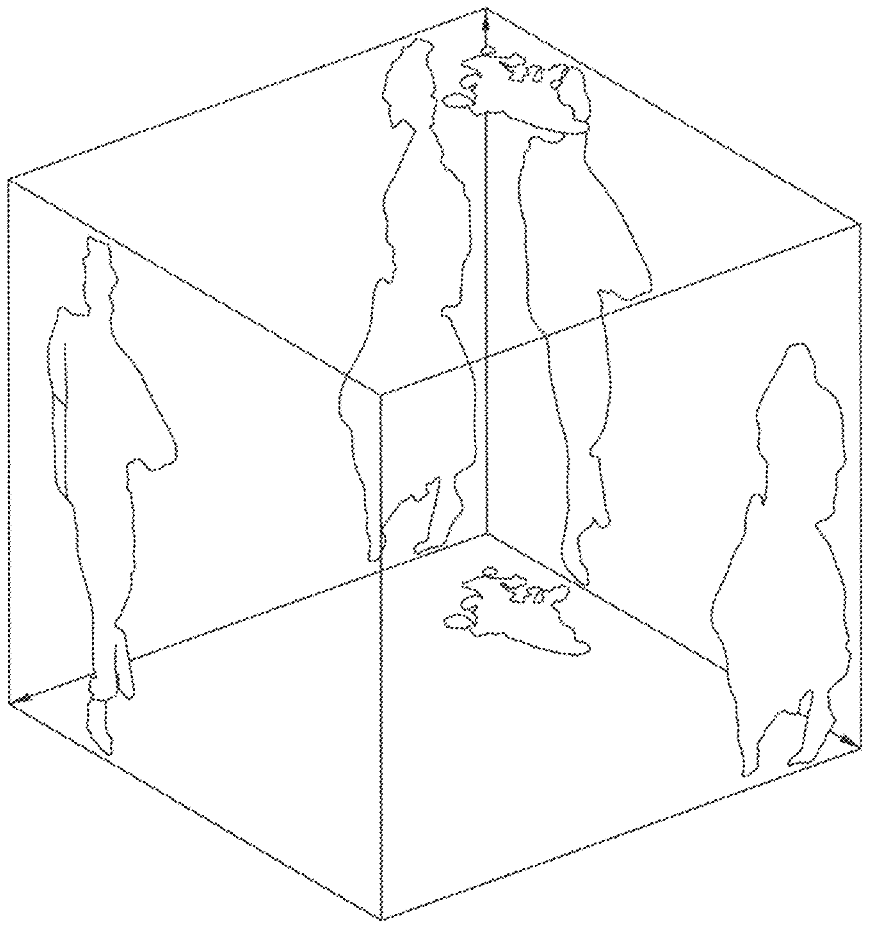
FIG. 11 is a diagram illustrating an example bounding box of a point cloud according to embodiments.

FIG. 11 is a diagram illustrating an example bounding box of a point cloud according to embodiments.

The bounding box according to the embodiments is a box of unit size that partitions the point cloud data based on a hexahedron in 3D space.

The bounding box may be used in the process of projecting a target object of the point cloud data onto a plane of each planar face of a hexahedron in a 3D space. The bounding box may be generated and processed by the point cloud video acquisition unit 10001 and the point cloud video encoder 10002 of FIG. 1. Further, based on the bounding box, the patch generation 14000, patch packing 14001, geometry image generation 14002, and texture image generation 14003 of the V-PCC encoding process of FIG. 10 may be performed.

The process of patch generation according to the embodiments refers to the process of segmenting a point cloud (i.e., point cloud data) into patches, which are the units for performing the mapping, in order to map the point cloud onto a 2D image. The patch generation process may be divided into three steps: calculation of normal vector values, segmentation, and patch segmentation.

In other words, each point of a point cloud has its own direction, which is represented by a 3D vector called a normal vector. Using the neighbors of each point obtained using a K-D tree or the like, a tangent plane and a normal vector of each point constituting the surface of the point cloud may be obtained.

Regarding to patch generation, segmentation consists of two processes: initial segmentation and refine segmentation.

In other words, each point constituting a point cloud is projected onto one of the six faces of a bounding box surrounding the point cloud as shown in FIG. 6. Refine segmentation is the process of improving the projection plane of each point in the point cloud determined in the initial segmentation process, considering the projection planes of neighbor points.

In addition, regarding patch generation, Patch segmentation is a process of dividing the entire point cloud into patches, which are sets of neighboring points, based on the projection plane information about each point constituting the point cloud obtained in the initial/refine segmentation process. The patch segmentation may include the following operations:

1) Calculate neighboring points of each point constituting the point cloud, using the K-D tree or the like. The maximum number of neighbors may be defined by the user;
2) When the neighboring points are projected onto the same plane as the current point (when they have the same cluster index), extract the current point and the neighboring points as one patch;
3) Calculate geometry values of the extracted patch.
4) Repeat operations 2) and 3) until there is no unextracted point.

The occupancy map, geometry image and texture image for each patch as well as the size of each patch are determined through the patch segmentation process.

The patch packing (or patch packer) 14001 packs the one or more patches generated by the patch generator 14000 into a 2D plane (or 2D frame). It also generates an occupancy map that contains information about the patch packing.

The patch packing is a process of determining the positions of individual patches in a 2D image to map the patches segmented by the patch generator 14000 onto the 2D image. The occupancy map, which is a kind of 2D image, is a binary map that indicates whether there is data at a corresponding position, using a value of 0 or 1. The occupancy map is composed of blocks and the resolution thereof may be determined by the size of the block. For example, when the block is 1*1 block, a pixel-level resolution is obtained. The occupancy packing block size may be determined by the user.

The geometry image generation or geometry image generator 14002 generates a geometry image based on the point cloud data, patch information (or auxiliary information), and/or occupancy map information. The geometry image means data (i.e., 3D coordinate values of points) containing geometry related to the point cloud data and refers as to a geometry frame.

The texture image generation or texture image generator 14003 generates a texture image based on the point cloud data, patches, packed patches, patch information (or auxiliary information) and/or the smoothed geometry. The texture image refers as to an attribute frame. That is, the texture image may be generated further based on smoothed geometry generated by smoothing processing of smoothing based on the patch information.

The smoothing or smoother 14004 may mitigate or eliminate errors contained in the image data. For example, the reconstructed geometry images are smothered based on the patch information. That is, portions that may cause errors between data may be smoothly filtered out to generate smoothed geometry.

The auxiliary patch information compression or auxiliary patch information compressor 14005 may compress auxiliary patch information related to the patch information generated in the patch generation. In addition, the compressed auxiliary patch information in the auxiliary patch information compressor 14005 may be transmitted to the multiplexer 14013. The geometry image generator 14002 may use the auxiliary patch information when generating the geometry image.

Specifically, the auxiliary patch information compressor 14005 compresses the auxiliary patch information generated in the patch generation, patch packing, and geometry generation processes described above. The auxiliary patch information may include the following parameters Index (cluster index) for identifying the projection plane (normal plane);

3D spatial position of a patch, i.e., the minimum tangent value of the patch (on the patch 3d shift tangent axis), the minimum bitangent value of the patch (on the patch 3d shift bitangent axis), and the minimum normal value of the patch (on the patch 3d shift normal axis);

2D spatial position and size of the patch, i.e., the horizontal size (patch 2d size u), the vertical size (patch 2d ize v), the minimum horizontal value (patch 2d shift u), and the minimum vertical value (patch 2d shift u); and Mapping information about each block and patch, i.e., a candidate index (when patches are disposed in order based on the 2D spatial position and size information about the patches, multiple patches may be mapped to one block in an overlapping manner. In this case, the mapped patches constitute a candidate list, and the candidate index indicates the position in sequential order of a patch whose data is present in the block), and a local patch index (which is an index indicating one of the patches present in the frame). Table 1 shows pseudo code representing the process of matching between blocks and patches based on the candidate list and the local patch indexes.

The image padding (or image padders) 14006 and 14007 may pad the geometry image and the texture image, respectively. The padding data may be padded to the geometry image and the texture image.

The group dilation (or group dilator) 14008 may add data to the texture image in a similar manner to image padding. The auxiliary patch information may be inserted into the texture image.

The video compression or video compressors 14009, 14010, and 14011 may compress the padded geometry image, the padded texture image, and/or the occupancy map image, respectively, using a 2D video codec such as HEVC, VVC, or the like. In other words, the video compressors 14009, 14010, and 14011 may compress the input geometry frame, attribute frame, and/or occupancy map frame, respectively, to output a video bitstream of the geometry image, a video bitstream of the texture image, a video bitstream of the occupancy map. The video compression may encode geometry information, texture information, and occupancy information.

The entropy compression or entropy compressor 14012 may compress the occupancy map based on an entropy scheme.

According to embodiments, the entropy compression 14012 and/or video compression 14011 may be performed on an occupancy map frame depending on whether the point cloud data is lossless and/or lossy.

The multiplexer 14013 multiplexes the video bitstream of the compressed geometry, the video bitstream of the compressed texture image, the video bitstream of the compressed occupancy map, and the bitstream of compressed auxiliary patch information from the respective compressors into one bitstream.

The blocks described above may be omitted or may be replaced by blocks having similar or identical functions. In addition, each of the blocks shown in FIG. 10 may operate as at least one of a processor, software, and hardware.

Figure 12:
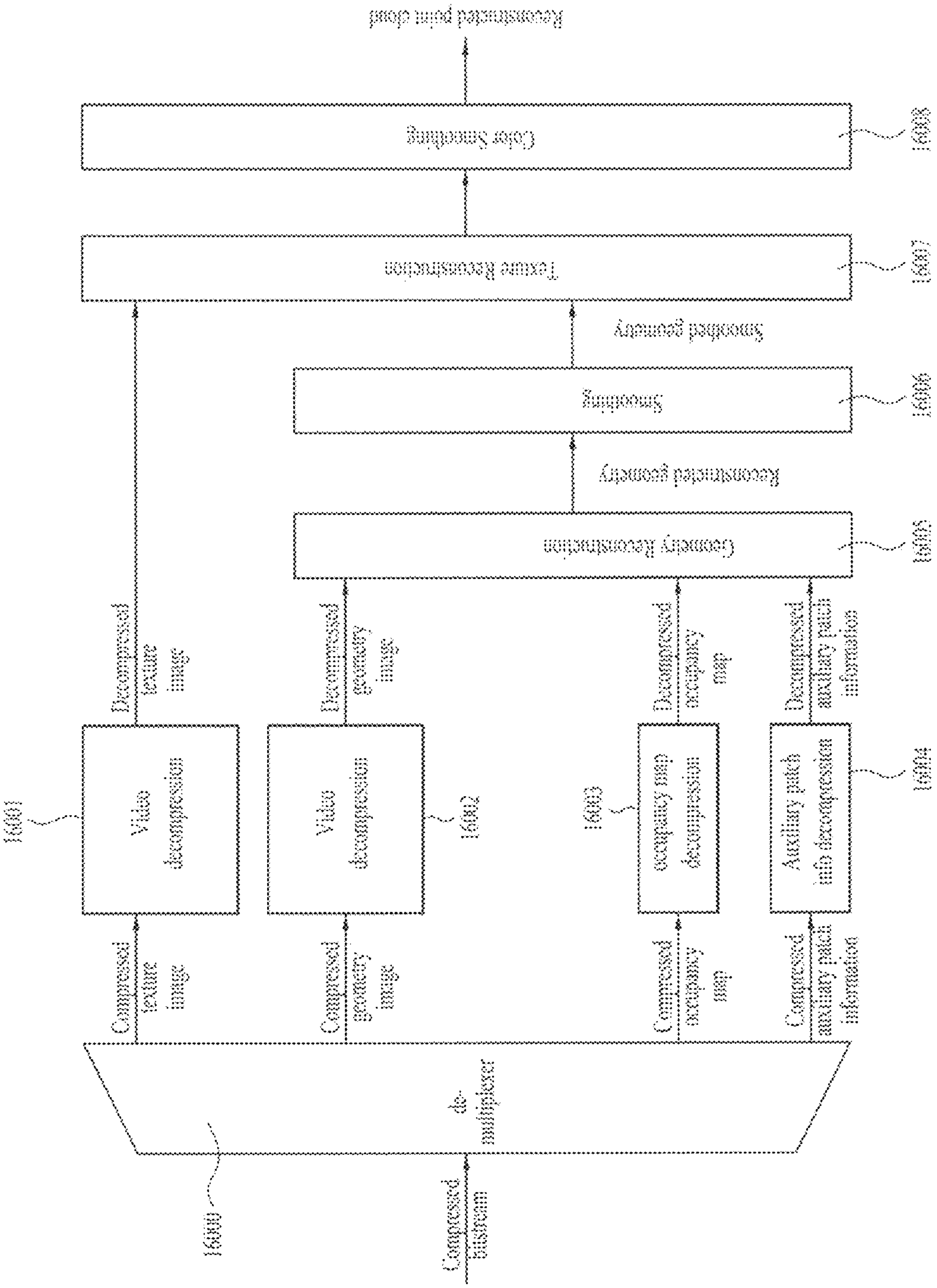
FIG. 12 is a diagram illustrating an example point cloud video decoder according to embodiments.

FIG. 12 is a diagram illustrating an example point cloud video decoder according to embodiments.

FIG. 12 shows the decoding process of V-PCC for reconstructing a point cloud by decompressing (or decoding) the compressed occupancy map, geometry image, texture image, and auxiliary path information. The V-PCC decoding process of FIG. 12 may be processed by the point cloud video decoder 10008 of FIG. 8. The V-PCC decoding process or V-PCC decoder of FIG. 12 may follow the reverse process to the V-PCC encoding process (or encoder) of FIG. 10.

Figure 15:
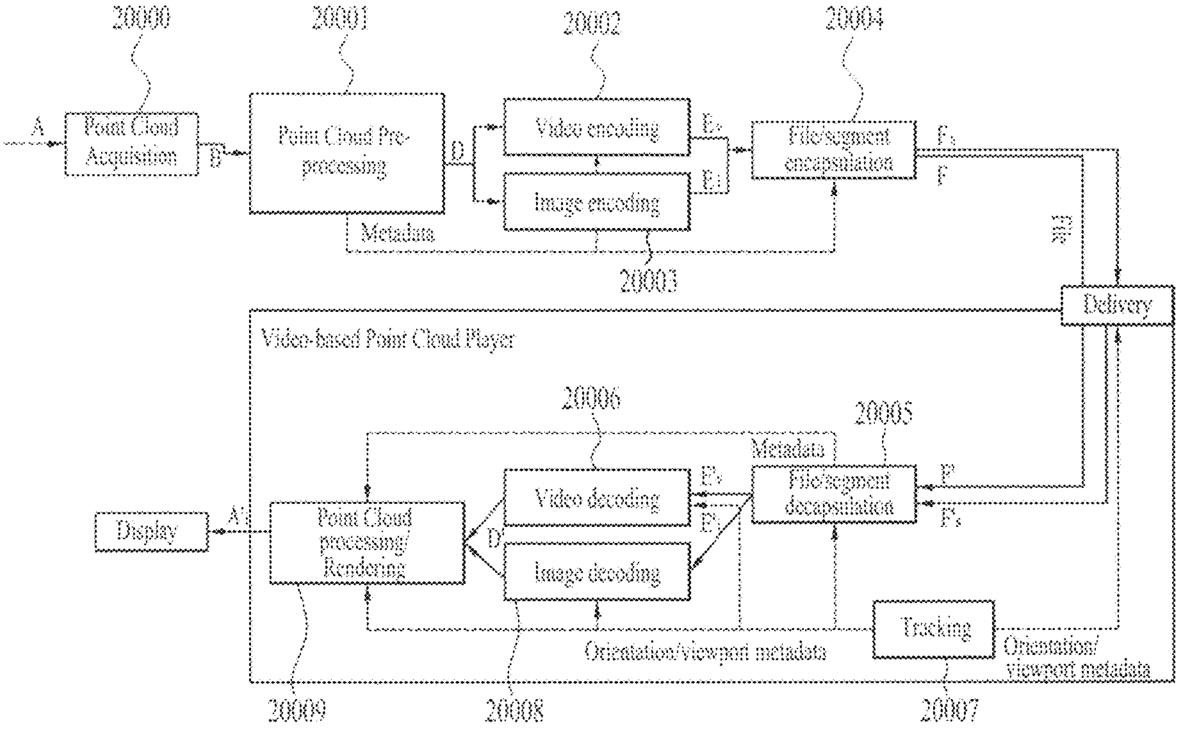
FIG. 15 is a diagram illustrating an example point cloud processing system for processing and streaming V-PCC-based point cloud data according to embodiments.

Each element of FIG. 15 may be performed by software, hardware, processor and/or a combination thereof.

The demultiplexer 16000 demultiplexes the compressed bitstream to output a compressed texture image, a compressed geometry image, a compressed occupancy map, and compressed auxiliary patch information, respectively.

The video decompression or video decompressors 16001 and 16002 decompress the compressed texture image and the compressed geometry image, respectively. That is, the video decompression is a reverse process to the video compression described above. It is a process of decoding the bitstream of a geometry image, the bitstream of a compressed texture image, and/or the bitstream of a compressed occupancy map image generated in the above-described process, using a 2D video codec such as HEVC and VVC.

The occupancy map decompression (or occupancy map decompressor) 16003 decompresses the compressed occupancy map image. In other words, the occupancy map decompression is the reverse process to the occupancy map compression on the transmitting side. It is the process of decoding the compressed occupancy map bitstream to reconstruct the occupancy map.

The auxiliary patch information decompression (or auxiliary patch information decompressor) 16004 decompresses the compressed auxiliary patch information. In other words, the auxiliary patch information decompression is the reverse process to the auxiliary patch information compression on the transmitting side. It is the process of decoding the compressed auxiliary patch information bitstream to restore the auxiliary patch information.

The geometry reconstruction or geometry reconstructor 16005 restores (reconstructs) the geometry information based on the decompressed geometry image, the decompressed occupancy map, and/or the decompressed auxiliary patch information. For example, the geometry changed in the encoding process may be reconstructed. In other words, the geometry reconstruction is a reverse process to the geometry image generation on the transmitting side described above. Initially, a patch is extracted from the geometry image using the reconstructed occupancy map, the 2D position/size information about the patch included in the auxiliary patch information, and the information about mapping between a block and the patch. Then, a point cloud is reconstructed in a 3D space based on the geometry image of the extracted patch and the 3D position information about the patch included in the auxiliary patch information.

The smoothing (or smoother) 16006 may apply smoothing to the reconstructed geometry. For example, smoothing filtering may be applied. In other words, the smoothing is the same as the smoothing in the encoding process on the transmitting side, and is intended to remove discontinuities that may occur on the patch boundaries due to the degradation in image quality occurring in the compression process.

The texture reconstruction or texture reconstructor 16007 reconstructs the texture from the decompressed texture image and/or the smoothed geometry. The texture reconstruction is a process of reconstructing a color point cloud by assigning color values to each point constituting a smoothed point cloud. That is, it may be performed by assigning color values corresponding to a texture image pixel at the same position as in the geometry image in the 2D space to points of a point of a point cloud corresponding to the same position in the 3D space, based on the geometry image reconstructed in the geometry reconstruction process and the mapping information of the point cloud described above.

The color smoothing or color smoother 16008 smoothes color values from the reconstructed texture. For example, smoothing filtering may be applied. According to embodiments, the color smoothing is similar to the process of geometry smoothing described above, and is intended to remove discontinuities that may occur on the patch boundaries due to degradation in image quality occurring in the compression process.

As a result, reconstructed point cloud data may be generated.

Figure 13:
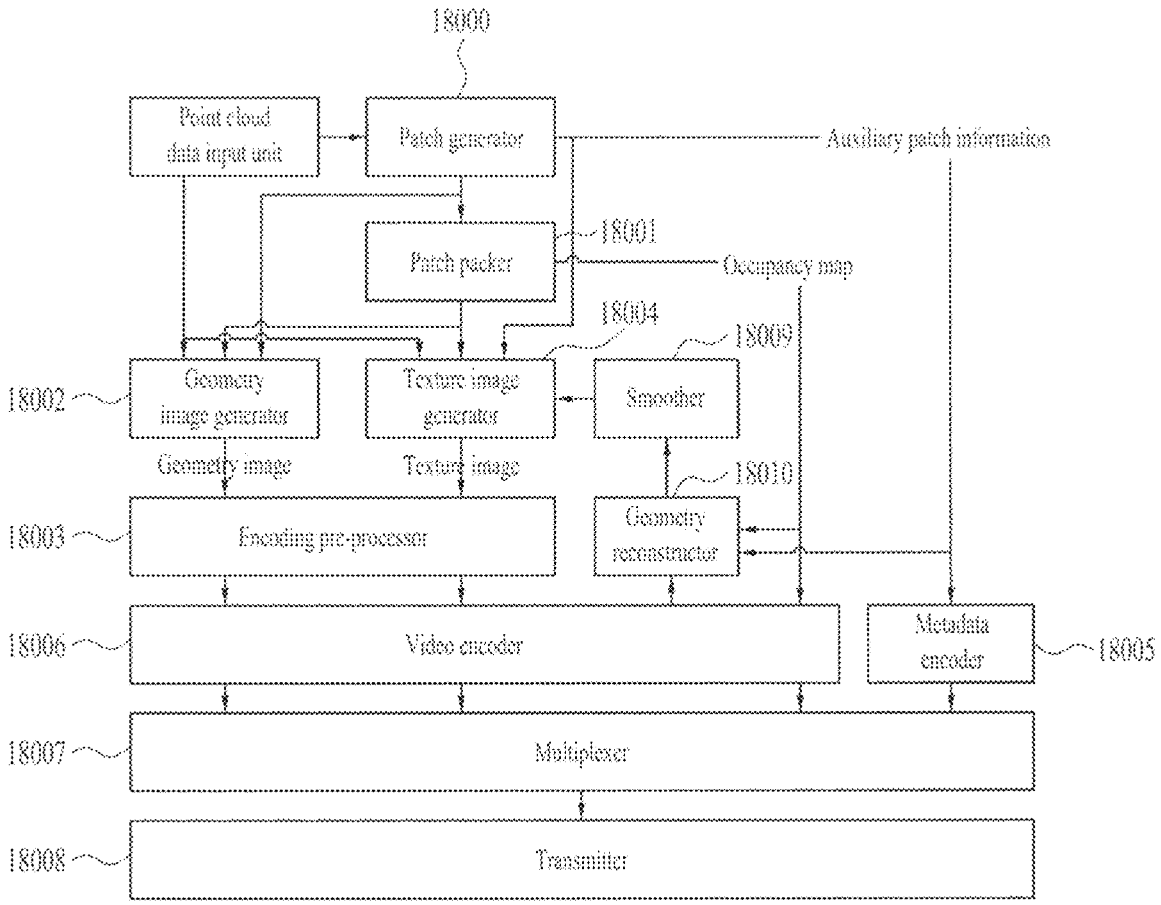
FIG. 13 is an example flowchart of operations of a transmission device for compressing and transmitting V-PCC-based point cloud data according to embodiments.

FIG. 13 is an example flowchart of operations of a transmission device for compressing and transmitting V-PCC-based point cloud data according to embodiments.

The transmission device according to the embodiments may correspond to the transmission device of FIG. 8 and the encoding process of FIG. 10, or perform some/all of the operations thereof. Each component of the transmission device may correspond to software, hardware, a processor and/or a combination thereof.

The transmission device according to the embodiments may be included in or correspond to a UE described in FIGS. 1 to 7 (e.g., the processor 911 or processor 921 described in FIG. 2, or the sink described in FIG. 6, or the XR media processing block included in the sink) or a BS.

An operation process on the transmitting side for compression and transmission of point cloud data using V-PCC may be performed as illustrated in the figure.

The point cloud data transmission device according to the embodiments may be referred to as a transmission device or a transmission system.

A patch generator 18000 generates one or more patches for 2D image mapping of a point cloud based on input point cloud data. Auxiliary patch information is generated as a result of the patch generation. The generated auxiliary patch information may be used in performing geometry image generation, texture image generation, smoothing, and geometry reconstruction for smoothing. That is, the patch generator 18000 projects the input point cloud into 2D space to generate one or more patches. The auxiliary patch information may include auxiliary patch information such as projection plane information and patch size related to each patch, which are necessary for encoding.

The patch packer 18001 performs a patch packing process of mapping the patches generated by the patch generator 18000 into a 2D image. For example, one or more patches may be packed into a 2D plane (or 2D frame). An occupancy map may be generated as a result of the patch packing. The occupancy map may be used in performing geometry image generation, geometry image padding, texture image padding, and/or geometry reconstruction for smoothing. In other words, while packing the one or more patches into a 2D plane, the geometry image generator 18002 and the texture image generator 18004 may generate a geometry image that stores the geometry information of the point cloud and a texture image that stores the color (texture) information for a pixel where a point is present, respectively. Here, the occupancy map indicates, for each pixel, the presence or absence of a point as 0 or 1.

The geometry image generator 18002 generates a geometry image based on the point cloud data, the patch information (or auxiliary patch information), and/or the occupancy map. The generated geometry image is pre-processed by the encoding pre-processor 18003 and then encoded into one bitstream by the video encoder 18006.

The encoding pre-processor 18003 may include an image padding procedure. In other words, the generated geometry image and some spaces in the generated texture image may be padded with meaningless data. The encoding pre-processor 18003 may further include a group dilation procedure for the generated texture image or the texture image on which image padding has been performed.

The geometry reconstructor 18010 reconstructs a 3D geometry image based on the geometry bitstream, auxiliary patch information, and/or occupancy map encoded by the video encoder 18006.

The smoother 18009 smoothes the 3D geometry image reconstructed and output by the geometry reconstructor

18010 based on the auxiliary patch information, and outputs the smoothed 3D geometry image to the texture image generator 18004.

The texture image generator 18004 may generate a texture image based on the smoothed 3D geometry, point cloud data, patch (or packed patch), patch information (or auxiliary patch information), and/or occupancy map. The generated texture image may be pre-processed by the encoding pre-processor 18003 and then encoded into one video bitstream by the video encoder 18006.

The metadata encoder 18005 may encode the auxiliary patch information into one metadata bitstream.

The video encoder 18006 may encode the geometry image and the texture image output from the encoding pre-processor 18003 into respective video bitstreams, and may encode the occupancy map into one video bitstream. According to an embodiment, the video encoder 18006 encodes each input image by applying the 2D video/image encoder.

According to embodiments, the geometry image and texture image may be encoded using a 2D video codec, and the auxiliary patch information and occupancy map may be encoded using entropy coding.

The multiplexer 18007 multiplexes the video bitstream of geometry, the video bitstream of the texture image, the video bitstream of the occupancy map, which are output from the video encoder 18006, and the bitstream of the metadata (including auxiliary patch information), which is output from the metadata encoder 18005, into one bitstream.

The transmitter 18008 transmits the bitstream output from the multiplexer 18007 to the receiving side. Alternatively, a file/segment encapsulator may be further provided between the multiplexer 18007 and the transmitter 18008, and the bitstream output from the multiplexer 18007 may be encapsulated in the form of a file and/or segment and output to the transmitter 18008.

The patch generator 18000, the patch packer 18001, the geometry image generator 18002, the texture image generator 18004, the metadata encoder 18005, and the smoother 18009 of FIG. 13 may correspond to the patch generation 14000, the patch packing 14001, the geometry image generation 14002, the texture image generation 14003, the auxiliary patch information compression 14005, and the smoothing 14004 of FIG. 10, respectively. The encoding pre-processor 18003 of FIG. 13 may include the image padders 14006 and 14007 and the group dilator 14008 of FIG. 10, and the video encoder 18006 of FIG. 13 may include the video compressors 14009, 14010, and 14011 and/or the entropy compressor 14012 of FIG. 10. For parts not described with reference to FIG. 13, refer to the description of FIG. 10. The above-described blocks may be omitted or may be replaced by blocks having similar or identical functions. In addition, each of the blocks shown in FIG. 13 may operate as at least one of a processor, software, or hardware. Alternatively, the generated video bitstreams of the geometry, the texture image, and the occupancy map and the metadata bitstream of the auxiliary patch information may be formed into one or more track data in a file or encapsulated into segments and transmitted to the receiving side through a transmitter.

Figure 14:
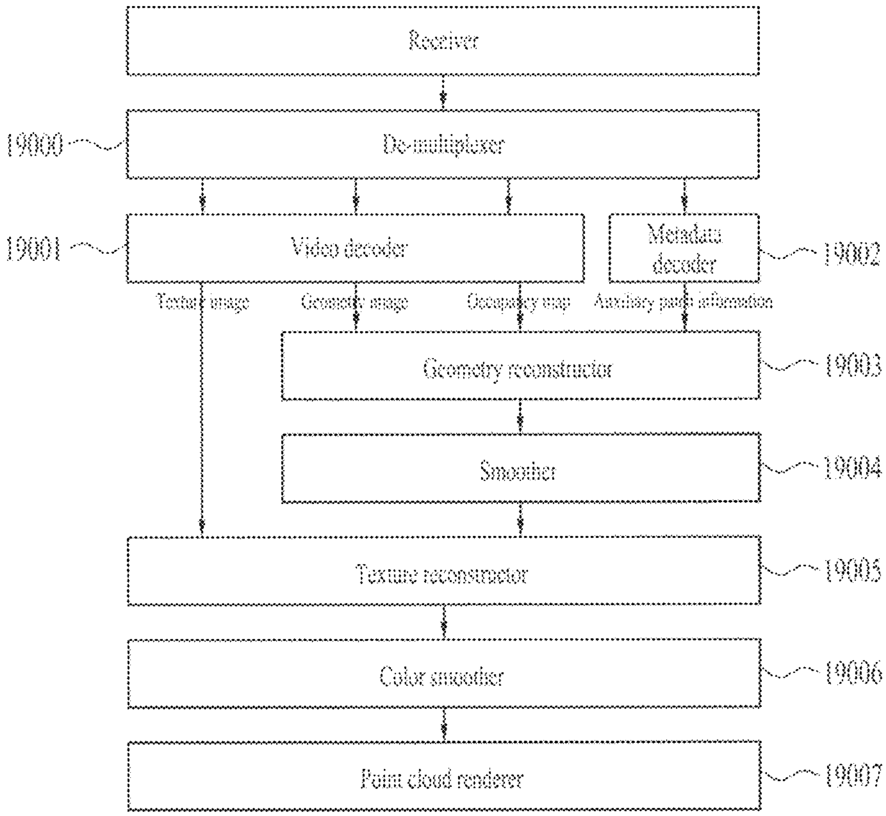
FIG. 14 is a diagram illustrating an example flowchart of operations of a receiving device for receiving and restoring V-PCC-based point cloud data, according to embodiments.

FIG. 14 is a flowchart illustrating operation of a reception device for receiving and restoring V-PCC-based point cloud data according to embodiments.

The reception device according to the embodiments may correspond to the reception device of FIG. 8, and/or the decoding process of FIG. 12, or perform some/all of the operations thereof. Each component of the reception device may correspond to software, hardware, a processor and/or a combination thereof.

The reception device according to the embodiments may correspond to or be included in the UE described with reference to FIGS. 1 to 7 (e.g., the processor 911 or processor 921 described with reference to FIG. 2, a processor that processes higher layer data, a sink described with reference to FIG. 6, or an XR media processing block included in the sink).

The operation of the reception terminal for receiving and reconstructing point cloud data using V-PCC may be performed as illustrated in the figure. The operation of the V-PCC reception terminal may follow the reverse process of the operation of the V-PCC transmission terminal of FIG. 13.

The point cloud data reception device according to the embodiments may be referred to as a reception device, a reception system, or the like.

The receiver receives a bitstream (i.e., compressed bitstream) of a point cloud, and the demultiplexer 19000 demultiplexes a bitstream of a texture image, a bitstream of a geometry image, and a bitstream of an occupancy map image, and a bitstream of metadata (i.e., auxiliary patch information) from the received point cloud bitstream. The demultiplexed bitstreams of the texture image, the geometry image, and the occupancy map image are output to the video decoder 19001, and the bitstream of the metadata is output to the metadata decoder 19002.

According to an embodiment, when the transmission device of FIG. 13 is provided with a file/segment encapsulator, a file/segment decapsulator is provided between the receiver and the demultiplexer 19000 of the reception device of FIG. 14. In this case, according to an embodiment, the transmission device encapsulates and transmits the point cloud bitstream in the form of a file and/or segment, and the reception device receives and decapsulates the file and/or segment containing the point cloud bitstream.

The video decoder 19001 decodes the bitstream of the geometry image, the bitstream of the texture image, and the bitstream of the occupancy map image into the geometry image, the texture image, and the occupancy map image, respectively. According to an embodiment, the video decoder 19001 performs the decoding operation by applying the 2D video/image decoder to each input bitstream. The metadata decoder 19002 decodes the bitstream of metadata into auxiliary patch information, and outputs the information to the geometry reconstructor 19003.

The geometry reconstructor 19003 restores (reconstructs) the 3D geometry based on the geometry image, the occupancy map, and/or auxiliary patch information output from the video decoder 19001 and the metadata decoder 19002.

The smoother 19004 smoothes the 3D geometry reconstructed by the geometry reconstructor 19003.

The texture reconstructor 19005 reconstruct the texture using the texture image output from the video decoder 19001 and/or the smoothed 3D geometry. That is, the texture reconstructor 19005 reconstructs the color point cloud image/picture by assigning color values to the smoothed 3D geometry using the texture image. Thereafter, in order to improve objective/subjective visual quality, a color smoothing process may be additionally performed on the color point cloud image/picture by the color smoother 19006. The modified point cloud image/picture derived through the operation above is displayed to the user after the rendering process in the point cloud renderer 19007. In some cases, the color smoothing process may be omitted.

The above-described blocks may be omitted or may be replaced by blocks having similar or identical functions. In addition, each of the blocks shown in FIG. 14 may operate as at least one of a processor, software, or hardware.

FIG. 15 illustrates an example architecture for V-PCC-based point cloud data storage and streaming according to embodiments.

A part/the entirety of the system of FIG. 15 may include some or all of the transmission device and reception device of FIG. 8, the encoding process of FIG. 10, the decoding process of FIG. 12, the transmission device of FIG. 13, and/or the reception device of FIG. 14. Each component in the figure may correspond to software, hardware, a processor, and a combination thereof.

FIG. 15 shows the overall architecture for storing or streaming point cloud data compressed based on video-based point cloud compression (V-PCC). The process of storing and streaming the point cloud data may include an acquisition process, an encoding process, a transmission process, a decoding process, a rendering process, and/or a feedback process.

Embodiments propose a method of effectively providing point cloud media/content/data.

In order to effectively provide point cloud media/content/data, a point cloud acquisition unit 20000 may acquire a point cloud video. For example, one or more cameras may acquire point cloud data through capture, composition or generation of a point cloud. Through this acquisition process, a point cloud video including a 3D position (hereinafter, referred to as geometry) (which may be represented by x, y, and z position values, etc.) of each point and attributes (color, reflectance, transparency, etc.) of each point may be acquired. For example, a Polygon File format (PLY) (or Stanford Triangle format) file or the like containing the acquired point cloud video may be generated. For point cloud data having multiple frames, one or more files may be acquired. In this process, point cloud related metadata (e.g., metadata related to capture, etc.) may be generated.

Post-processing for improving the quality of the content may be needed for the captured point cloud video. In the video capture process, the maximum/minimum depth may be adjusted within the range provided by the camera equipment. Even after the adjustment, point data of an unwanted area may still be present. Accordingly, post-processing of removing the unwanted area (e.g., the background) or recognizing a connected space and filling the spatial holes may be performed. In addition, point clouds extracted from the cameras sharing a spatial coordinate system may be integrated into one piece of content through the process of transforming each point into a global coordinate system based on the coordinates of the location of each camera acquired through a calibration process. Thereby, a point cloud video with a high density of points may be acquired.

A point cloud pre-processing unit 20001 may generate one or more pictures/frames of the point cloud video. Here, a picture/frame may generally represent a unit representing one image in a specific time interval. When dividing points constituting the point cloud video into one or more patches and mapping the patches onto a 2D plane, the point cloud pre-processing unit 20001 may generate an occupancy map picture/frame of a binary map, which indicates presence or absence of data at the corresponding position in the 2D plane with a value of 0 or 1. Here, a patch is a set of points that constitute the point cloud video, wherein the points belonging to the same patch are adjacent to each other in the 3D space and are mapped in the same direction among the planar faces of a 6-face bounding box when mapped to a 2D image. In addition, the point cloud pre-processing unit 20001 may generate a geometry picture/frame, which is in the form of a depth map that represents the information about the position (geometry) of each point constituting the point cloud video on a patch-by-patch basis. Further, the point cloud pre-processing unit 20001 may generate a texture picture/frame, which represents the color information about each point constituting the point cloud video on a patch-by-patch basis. In this process, metadata needed to reconstruct the point cloud from the individual patches may be generated. The metadata may include information about the patches (referred to as auxiliary information or auxiliary patch information), such as the position and size of each patch in the 2D/3D space. These pictures/frames may be generated continuously in temporal order to construct a video stream or metadata stream.

A point cloud video encoder 20002 may encode one or more video streams related to a point cloud video. One video may include multiple frames, and one frame may correspond to a still image/picture. In the present disclosure, the point cloud video may include a point cloud image/frame/picture, and the term "point cloud video" may be used interchangeably with the point cloud video/frame/picture. The point cloud video encoder 20002 may perform a video-based point cloud compression (V-PCC) procedure. The point cloud video encoder 20002 may perform a series of procedures such as prediction, transform, quantization, and entropy coding for compression and coding efficiency. The encoded data (encoded video/image information) may be output in the form of a bitstream. Based on the V-PCC procedure, the point cloud video encoder 20002 may encode point cloud video by dividing the same into a geometry video, an attribute video, an occupancy map video, and metadata, for example, information about patches, as described below. The geometry video may include a geometry image, the attribute video may include an attribute image, and the occupancy map video may include an occupancy map image. The patch data, which is auxiliary information, may include patch related information. The attribute video/image may include a texture video/image.

A point cloud image encoder 20003 may encode one or more images related to a point cloud video. The point cloud image encoder 20003 may perform a video-based point cloud compression (V-PCC) procedure. The point cloud image encoder 20003 may perform a series of operations such as prediction, transform, quantization, and entropy coding for compression and coding efficiency. The encoded image may be output in the form of a bitstream. Based on the V-PCC procedure, the point cloud image encoder may encode the point cloud image by dividing the same into a geometry image, an attribute image, an occupancy map image, and metadata such as, for example, information about patches, as described below.

According to embodiments, the operations of the point cloud video encoder 20002, point cloud image encoder 20003, point cloud video decoder 20006, and point cloud image decoder 20008 may be performed by one encoder/decoder as described above, and may be performed along separate paths as shown in the figure.

The file/segment encapsulation unit 20004 may encapsulate the encoded point cloud data and/or point cloud-related metadata into a file or a segment for streaming. Here, the point cloud-related metadata may be received from a metadata processor (not shown) or the like. The metadata processor may be included in the point cloud video/image encoder 20002, 20003 or may be configured as a separate component/module. The encapsulation unit 20004 may encapsulate a single bitstream or individual bitstreams containing the video/image/metadata in a file format such as ISOBMFF or process the same into DASH segments or the like. According to an embodiment, the encapsulation unit 20004 may include the point cloud metadata in the file format. The point cloud-related metadata may be included in, for example, boxes at various levels on the ISOBMFF file format or as data in a separate track within the file. According to an embodiment, the encapsulation unit 20004 may encapsulate the point cloud-related metadata into a file.

The encapsulation unit 20004 according to the embodiments may divide a single bitstream or individual bitstreams and store the same in one or multiple tracks, and may also encapsulate signaling information for this operation. In addition, the patch (or atlas) stream included on the bitstream may be stored in a track in the file, and related signaling information may be stored. Further, an SEI message present in the bitstream may be stored in a track in the file and related signaling information may be stored.

A transmission processor (not shown) may perform processing on the encapsulated point cloud data for transmission according to the file format. The transmission processor (not shown) may be included in the transmitter or may be configured as a separate component/module. The transmission processor may process the point cloud data according to a transmission protocol. The processing for transmission may include processing for delivery over a broadcast network and processing for delivery through a broadband. According to an embodiment, the transmission processor may receive point cloud-related metadata from the metadata processor, as well as the point cloud data, and process the same for transmission.

The transmitter may transmit a point cloud bitstream or a file/segment including the bitstream to the receiver (not shown) of the reception device over a digital storage medium or a network. For transmission, processing according to any transmission protocol may be performed. The data processed for transmission may be delivered over a broadcast network and/or through a broadband. The data may be delivered to the receiving side in an on-demand manner. The digital storage medium may include various storage media such as USB, SD, CD, DVD, Blu-ray, HDD, and SSD. The transmitter may include an element for generating a media file in a predetermined file format, and may include an element for transmission over a broadcast/communication network. The receiver may extract the bitstream and transmit the extracted bitstream to the decoder.

The receiver may receive point cloud data transmitted by the point cloud data transmission device according to the present disclosure. Depending on the transmission channel, the receiver may receive the point cloud data over a broadcast network or through a broadband. Alternatively, the point cloud data may be received through the digital storage medium. The receiver may include a process of decoding the received data and rendering the data according to the viewport of the user.

The reception processor (not shown) may perform processing on the received point cloud video data according to the transmission protocol. The reception processor may be included in the receiver or may be configured as a separate component/module. The reception processor may reversely perform the process of the transmission processor above described so as to correspond to the processing for transmission performed at the transmission side. The reception processor may deliver the acquired point cloud video to a decapsulation unit 20005, and the acquired point cloud-related metadata to a metadata processor (not shown).

The file/segment decapsulation unit 20005 may decapsulate the point cloud data received in the form of a file from the reception processor. The decapsulation unit 20005 may decapsulate files according to ISOBMFF or the like, and may acquire a point cloud bitstream or point cloud-related metadata (or a separate metadata bitstream). The acquired point cloud bitstream may be delivered to the point cloud video decoder 20006 and the point cloud image decoder 20008, and the acquired point cloud-related metadata (or metadata bitstream) may be delivered to the metadata processor (not shown). The point cloud bitstream may include the metadata (metadata bitstream). The metadata processor may be included in the point cloud video decoder 20006 or may be configured as a separate component/module. The point cloud video-related metadata acquired by the decapsulation unit 20005 may be in the form of a box or track in the file format. The decapsulation unit 20005 may receive metadata necessary for decapsulation from the metadata processor, when necessary. The point cloud-related metadata may be delivered to the point cloud video decoder 20006 and/or the point cloud image decoder 20008 and used in a point cloud decoding procedure, or may be delivered to the renderer and used in a point cloud rendering procedure.

The point cloud video decoder 20006 may receive the bitstream and decode the video/image by performing a reverse operation corresponding to the operation of the point cloud video encoder 20002. In this case, the point cloud video decoder 20006 may decode the point cloud video by dividing the same into a geometry video, an attribute video, an occupancy map video, and auxiliary patch information as described below. The geometry video may include a geometry image, the attribute video may include an attribute image, and the occupancy map video may include an occupancy map image. The auxiliary information may include auxiliary patch information. The attribute video/image may include a texture video/image.

The point cloud image decoder 20008 may receive a bitstream as input and perform a reverse operation corresponding to the operation of the point cloud image encoder 20003. In this case, the point cloud image decoder 20008 may decode the point cloud image by dividing the point cloud image into a geometry image, an attribute image, an occupancy map image, and metadata, such as auxiliary patch information.

The 3D geometry may be reconstructed based on the decoded geometry video/image, occupancy map, and auxiliary patch information, and then may be subjected to a smoothing process. The color point cloud image/picture may be reconstructed by assigning a color value to the smoothed 3D geometry based on the texture video/image. The renderer 20009 may render the reconstructed geometry and the color point cloud image/picture. The rendered video/image may be displayed through the display. All or part of the rendered result may be shown to the user through a VR/AR display or a typical display.

A sensor/tracker (sensing/tracking) 20007 acquires orientation information and/or user viewport information from the user or the reception side and delivers the orientation information and/or the user viewport information to the receiver and/or the transmitter. The orientation information may represent information about the position, angle, movement, etc. of the user's head, or represent information about the position, angle, movement, etc. of a device through which the user is viewing a video/image. Based on this information, information about the area currently viewed by the user in a 3D space, that is, viewport information may be calculated.

The viewport information may be information about an area in a 3D space currently viewed by the user through a device or an HMD. A device such as a display may extract a viewport area based on the orientation information, a vertical or horizontal FOV supported by the device, and the like. The orientation or viewport information may be extracted or calculated at the reception side. The orientation or viewport information analyzed at the reception side may be transmitted to the transmission side on a feedback channel.

Based on the orientation information acquired by the sensor/tracker 20007 and/or the viewport information indicating the area currently viewed by the user, the receiver may efficiently extract or decode only media data of a specific area, i.e., the area indicated by the orientation information and/or the viewport information from the file. In addition, based on the orientation information and/or viewport information acquired by the sensor/tracker 20007, the transmitter may efficiently encode only the media data of the specific area, that is, the area indicated by the orientation information and/or the viewport information, or generate and transmit a file therefor.

The renderer 20009 may render the decoded point cloud data in a 3D space. The rendered video/image may be displayed through the display. The user may view all or part of the rendered result through a VR/AR display or a typical display.

The feedback process may include transferring various feedback information that may be acquired in the rendering/displaying process to the transmitting side or the decoder of the receiving side. Through the feedback process, interactivity may be provided in consumption of point cloud data. According to an embodiment, head orientation information, viewport information indicating an area currently viewed by a user, and the like may be delivered to the transmitting side in the feedback process. According to an embodiment, the user may interact with what is implemented in the VR/AR/MR/autonomous driving environment. In this case, information related to the interaction may be delivered to the transmitting side or a service provider in the feedback process. According to an embodiment, the feedback process may be skipped.

According to an embodiment, the above-described feedback information may not only be transmitted to the transmitting side, but also be consumed at the receiving side. That is, the decapsulation processing, decoding, and rendering processes at the receiving side may be performed based on the above-described feedback information. For example, the point cloud data about the area currently viewed by the user may be preferentially decapsulated, decoded, and rendered based on the orientation information and/or the viewport information.

Figure 16:
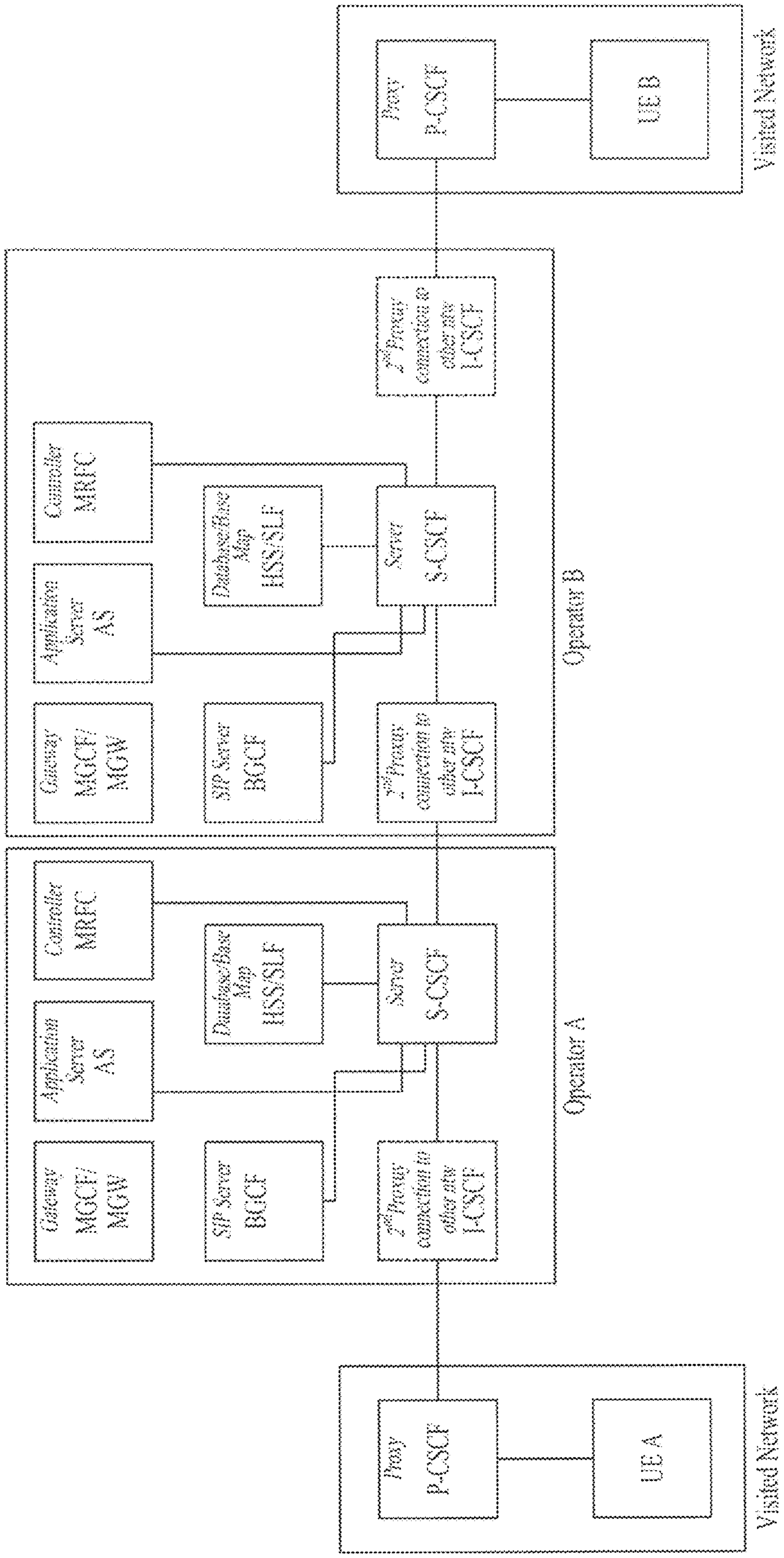
FIG. 16 is a diagram illustrating a transmission structure for a UE on an arbitrary Visited Network, according to embodiments.

FIG. 16 illustrates a transmission structure for a UE on a random visited network according to embodiments.

In the 3rd Generation Partnership Project (3GPP), the Multimedia Division establishes and distributes standards for transmitting and receiving media by defining protocols related to media codecs. The definition of media and transmission scenarios cover a wide range. The scenarios include cases where personal computers or portable receivers provide mobile/fixed reception along with radio access and Internet-based technologies. This extensive standardization carried out by 3GPP has enabled ubiquitous multimedia services to cover a variety of users and use cases, allowing users to quickly experience high-quality media anytime, anywhere. In particular, in 3GPP, media services are classified according to their unique characteristics and divided into conversational, streaming, and other services according to the target application. The conversational service extends from the session initiation protocol (SIP)-based phone service network. The multimedia telephony service for the IP multimedia subsystem (MTSI) aims to provide a low-latency real-time conversational service. The streaming service delivers real-time or re-acquired content in a unicast manner based on the packet switched service (PSS). In 3GPP, broadcast services within the PSS system may be available on mobile TVs through the multimedia broadcast/multicast service (MBMS). In addition, the 3GPP provides messaging or reality services. The three base services described above are constantly revising or updating their standards to ensure the high quality user experience, and provides scalability to ensure that they are compatible with available network resources or existing standards. Media includes video codecs, voice, audio, images, graphics, and even text corresponding to each service.

In 3GPP, a standardized platform for mobile multimedia reception was designed to facilitate network extension or mobile reception. The IP multimedia subsystem (IMS) is designed to meet these requirements and enables access to various technologies or roaming services. The IMS is based on the Internet engineering task force (IETF) standard. The IETF standard operates on the Internet platform, and accordingly it may simply extend the Setup, Establishment, and Management functions of the existing Internet protocol. The IMS uses the SIP protocol as its basic protocol and manages multimedia sessions efficiently through this protocol.

In 3GPP standard technology, the service is based on a mobile platform. Accordingly, when a user is connected to a mobile network or platform of a third party or another region, the user must roam to the other network. In this scenario, a method for the client to maintain a session across multiple mobile networks is required. Additionally, as IP-based media service requirements increase, the requirements for high-capacity IP-based data transmission, conversation, and multimedia transmission have increased. Therefore, IP packets have been required to be transmitted in an interchangeable form across 3G, 4G, and 5G networks, rather than using the general IP routing. In order to maintain QoS in a mixed network environment, flexible data information exchange and platforms are needed in the process of exchanging services. In order to integrate the Internet network and wireless mobile network over the past 10 years, the 3GPP standard established the IP-based IP multimedia subsystem (IMS) standard and enabled transmission of IP voice, video, audio, and text in the PS domain. The multimedia telephony service for IMS (MTSI), which is a standard for transmitting conversational speech, video, and text through RTP/RTCP based on the IMS, was established to provide services having efficiency higher than or equal to that of the existing Circuit Switched (CS)-based conversational service for the user through flexible data channel handling. The MTSI includes signaling, transport, jitter buffer, management, packet-loss handling, adaptation, as well as adding/dropping media during call, and is formed to create, transmit, and receive predictable media. Since the MTSI uses the 3GPP network, NR, LTE, HSPA, and the like are connected to the IMS and are also extended and connected to Wi-Fi, Bluetooth, and the like. The MTSI transmits and receives data negotiation messages to and from the existing IMS network. Once the transmission and reception are completed, data is transferred between users. Therefore, the IMS network may be used equally, and the MTSI additionally defines only audio encoder/decoder, video encoder/decoder, text, session setup and control, and data channel. The data channel capable MTSI (DCMTSC) represents a capable channel to support media transmission, and uses the Stream Control Transmission Protocol (SCTP) over Datagram Transport Layer Security (DTLS) and Web Real-Time Communication (WebRTC). The SCTP is used to provide security services between network layers/transport layers of the TCP. Because it is extended from an existing platform, it defines media control and media codec as well as media control data for managing media, and general control is processed through media streaming setup through the SIP/SDP. Since setup/control is delivered between clients, adding/dropping of media is also included. The MTSI also includes IMS messaging, which is a non-conversational service. To transport media through 3GPP layer 2, the packet data convergence protocol (PDCP) is used. The PDCP delivers IP packets from a client to the base station, and generally performs user plane data, control plane data, header compression, and ciphering/protection.

FIG. 16 shows a transmission structure for transmission between two UEs having a call session in any visited network when there are UE A/UE B. UE A/UE B may be present in operator A or B or the same network. To describe the entire MTSI system, it is assumed that there are four other networks. To perform a call, UEs A and B perform session establishment for transmission of media within the IMS system. Once a session is established, UEs A and B transmit media through the IP network. The main function of the IMS is the call state control function (CSCF), which manages multimedia sessions using the SIP. Each CSCF serves as a server or proxy and performs a different type of function depending on its purpose. The proxy CSCF (P-CSCF) serves as a SIP proxy server. It is the first to access the IMS network and is the first block to connect UEs A and B. The P-CSCF serves to internally analyze and deliver SIP messages in order to receive all SIP messages and deliver them to a target UE. The P-CSCF may perform resource management and is closely connected to the network gateway. The gateway is connected to the general packet radio service (GPRS), which is an IP access bearer. Although the GPRS is a second-generation wireless system, it is connected to basic functions configured to support PS services. The P-CSCF and the GPRS should be in the same network. In this figure, UE A is present in a random visited network. UE A and the P-CSCF are present within the network. The serving CSCF (S-CSCF), which is a SIP server, is present in the home network of a subscriber and provides a session control service for the subscriber. If a proxy or visited network is not present, UE A or B may be present in operator A or B, and a UE may be present in the home network. In the IMS system, the S-CSCF serves as a major function in signaling and serves as a SIP register. Thus, it may create a user's SIP IP address or create the current IP address. The S-CSCF may also authenticate users through the home subscriber server (HSS) or acquire profiles of various users present in the HSS. All incoming SIP messages should pass through the S-CSCF. The S-CSCF may receive messages and connect with other nearby CSCFs or the application server (AS) to deliver SIP messages to other ASs. The interrogating CSCF (I-CSCF) performs the same proxy server function as the P-CSCF, but is connected to an external network. It may perform the process of encrypting SIP messages by observing network availability, network configuration, and the like. The HSS is a central data server that contains information related to users. The subscriber location function (SLF) represents an information map linking a user's address to the corresponding HSS. The multimedia resource function (MRF) contains multimedia resources in the home network. The MRF consists of a multimedia resource function controller (MRFC) and a multimedia resource function processor (MRFP). The MRFC is the control plane of MRC and performs a control function in managing stream resources within the MRFP. The breakout gateway control function (BGCF) is a SIP server. It represents a gateway connected to the public-switched telephone network (PSTN) or the communication server (CS) to deliver SIP messages. The media gateway control function (MGWF) and the media gateway (MGW) serve as an interface to deliver media to the CS network and deliver signaling.

Figure 17:
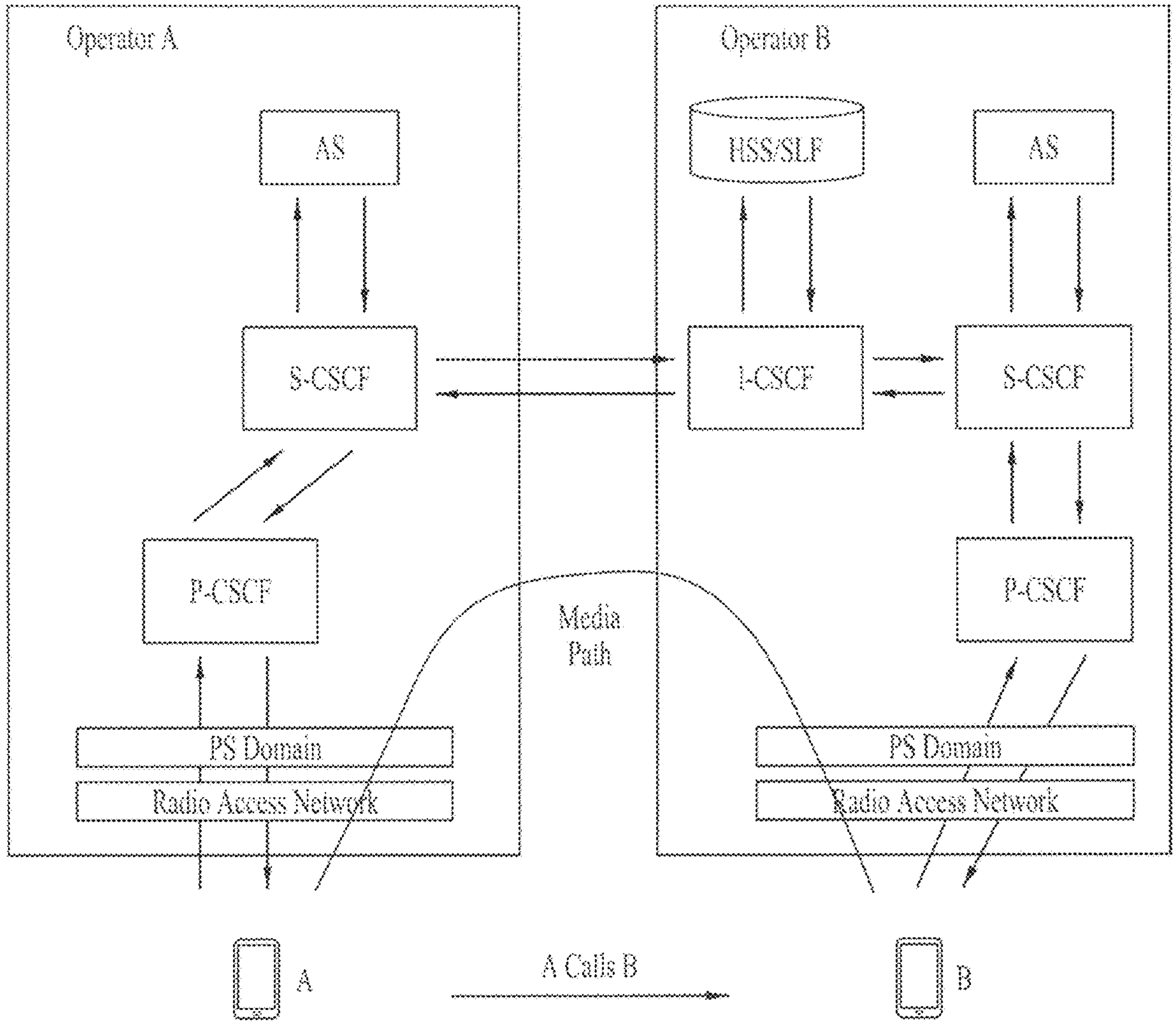
FIG. 17 is a diagram illustrating a call connection between UEs according to embodiments.

FIG. 17 illustrates a call connection between UEs according to embodiments.

In an IMS-based network, an environment enabling IP connection is required. The IP connection is performed in the home network or visited network. When the IP connection is established, a conversational environment, which is a detailed element of XR, is configured, and information in which virtual reality data such as 360 video/geometry-based point cloud compression (G-PCC)/video-based point cloud compression (V-PCC) is compressed is exchanged or data is delivered. XR data to be delivered may be subdivided into two areas. When it is transmitted based on the MTSI standard, the AS delivers the call/hold/resume method through route control plane signaling using the CSCF mechanism and performs a third-party call connection. When the call connection is performed, the media is simply delivered between UE A/B. When there are two UEs, the MTSI operates within the IMS network as shown in FIG. 17.

Figure 18:
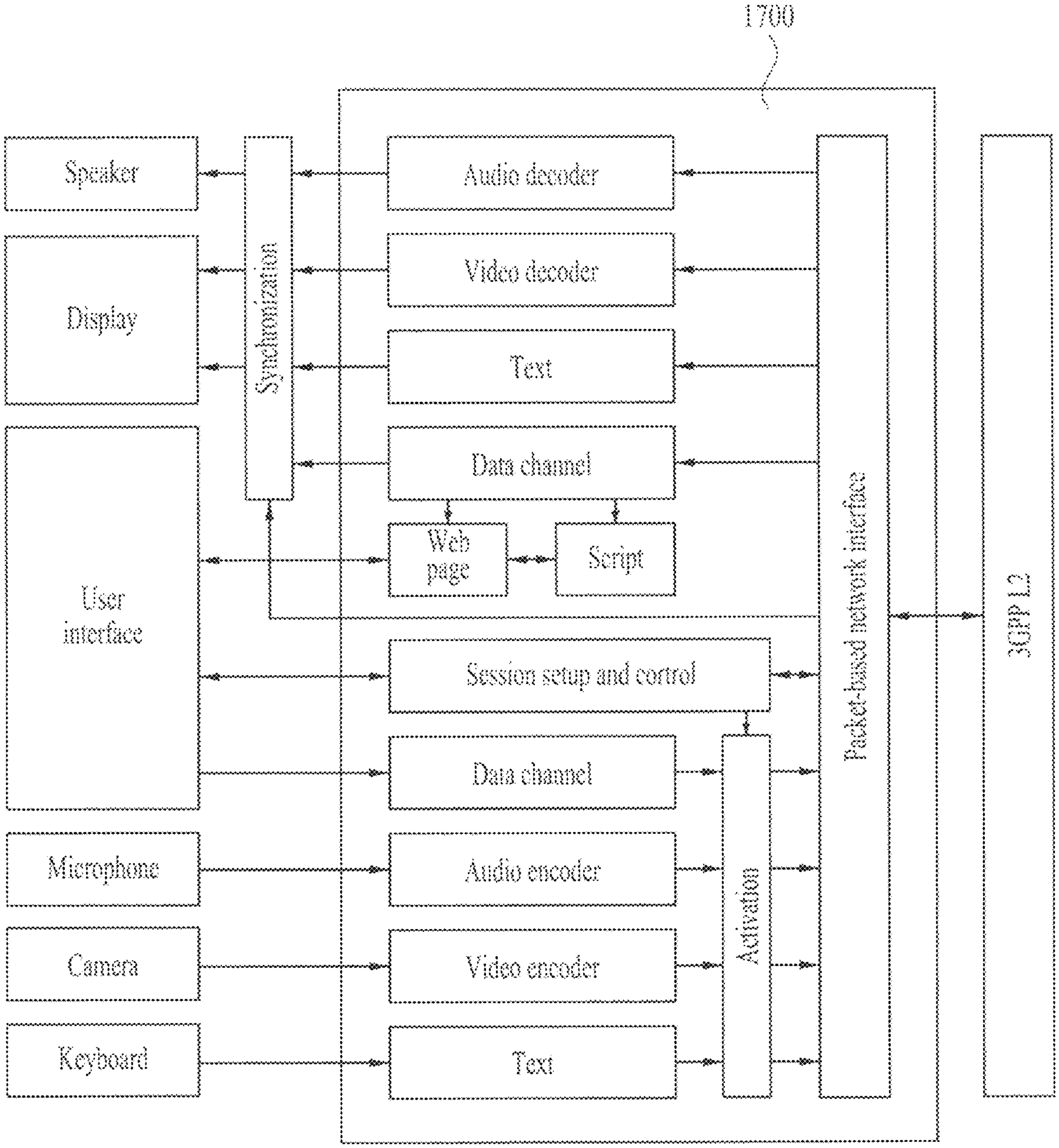
FIG. 18 is a diagram illustrating a point cloud data transmission device and reception device according to embodiments.

FIG. 18 illustrates devices for transmitting and receiving point cloud data according to embodiments.

The video encoder and audio encoder may correspond to the XR device 100*c*, the point cloud video encoder 10002 of FIG. 8, the point cloud encoder of FIGS. 10, 13 and 15, and the like.

The video decoder and audio decoder may correspond to the XR device 100*c*, the point cloud video decoder 10008 of FIG. 8, the point cloud decoder FIGS. 12, 14, and 15, and the like.

The MTSI limits the relevant elements and connection points of the client terminal within the IMS network, and thus the scope of the configuration thereof is defined as shown in FIG. 18.

In FIG. 18, decisions about the physical interaction of synchronization related to the speaker, display, user interface, microphone, camera, and keyboard are not discussed in the MTSI. The parts in the box 1700 determine the scope of the method to control the media or control related media. In general, the delivery of the SIP falls under the IMS, and thus the control of a specific SIP is not included in the MTSI. Therefore, the structure and delivery of the data and the definition of the service may determine the scope of the MTSI and IMS. If they are defined as in the MTSI, they may be defined as a standard in the following scope.

To support conversational XR services, SDP and SDP capability negotiation based on RFC 4566 and a related streaming setup should be used.

For the setup and control, independent interaction of UE A/B is needed, and media components perform an adding or dropping operation.

The transmission medium for transmitting the media should comply with the packet-based network interface as well as the coded media (applying a transport protocol). transferred between To transmit data, the RTP stream of RFC 3550 may be used, and the SCTP (RFC 4960) or WebRTC data channel may be employed as a data channel.

A device for transmitting and receiving point cloud data according to embodiments may include any device, such as a cell phone, desktop, and AR glass. When it is assumed that the device is a cell phone, it may have a speaker, a display, a user interface, a microphone, a camera, and a keyboard, and the input signal may be transferred to the encoding/decoding block.

The method/operation according to embodiments may be processed by the video encoder of FIG. 16. It may be operatively connected to software.

In the method/operation according to the embodiments, the G-PCC structure call flow may be included in the session setup & control part.

Each component of FIG. 18 may correspond to hardware, software, processors, and/or a combination thereof.

IP Connectivity

The point cloud data transmission/reception device according to embodiments may support IP connectivity.

In the scope of the multimedia subsystem, the XR range is assumed to be present in a radio access network (RAN) such as a universal mobile telecommunications system (UMTS) and a visited network such as a serving GPRS support node (SGSN) or gateway GPRS support note (GGSN), and scenarios for roaming services and IP connectivity should be considered. When IP connectivity needs to be considered, IP services should be provided even in places that are not present in the IMS network, and the general packet radio service (GPRS) roaming should also be connected to the home network. If an IMS-based network is provided, end-to-end quality of service (QOS) should be provided to maintain the IP connectivity. QoS requirements may generally use the session initiation protocol (SIP) to define a session, change a session, or terminate a session, and may convey the following information: type of media, direction of traffic (up or down), bitrate of media, packet size, packet transport frequency, RTP payload, and bandwidth adaptation.

IP Policy Control/Secure Communication

The point cloud data transmission/reception device according to embodiments may perform IP policy control/secure communication.

Negotiation may be performed at the application level. If QoS between UEs is established, the UE or an entity that is to provide XR service compresses and packetize the data and delivers the same over the IP network using a transport protocol such as TCP or UDP using an appropriate transport protocol (such as RTP). In addition, when the IP network is used, the bearer traffic should be controlled and managed, and the following tasks may be performed between the access network and the IMS within the IMS session.

The policy control element may activate the appropriate bearer for the media traffic through a SIP message and prevent the operator from misusing bearer resources. The IP address and bandwidth for transmission and reception may be adjusted at the same bearer level.

The policy control element may be used to set start or stop points for media traffic and to resolve synchronization related issues.

The policy control element may be used to deliver acknowledgment messages over the IP network and to modify, suspend, or terminate the services of the bearer.

The privacy may be requested for the security of the UE.

Internetworking with Other Networks (Service Control)

The point cloud data transmission/reception device according to embodiments may be operatively connected to other networks.

Because the IMS services provided by 3GPP are not maintained in the same time, connections and terminations of network subscriptions between terminals cannot be communicated quickly. Therefore, for any type of terminals, an IMS network is required to connect as many different users and networks as possible. This may include not only PSTN or ISDN, but also mobile and Internet users. In the case of 2G networks, which are rarely used currently, if roaming is used, the entity visiting the visited network provides services and control information for the user to perform registration/session establishment within the Internet network. When roaming is present in the visited network as in this case, there may be service control constraints, and there are points to consider according to various roaming model scenarios. In addition, when a service is provided, the quality thereof may be degraded due to the service speed on the visited network. If roles such as security or charging are added in the middle, the areas of service control and execution method for the home network/visited network should be considered.

Plane Separation

The 3GPP standard defines a layered architecture within the IMS network. Therefore, the transport/bearer is defined separately. In particular, the application plane may be generally divided into the scope of application servers, the control plane into HSS, CSCF, BGCF, MRFC, MRFP, SGW, SEG, etc., and the user plane into SGSN, GGSN, IM-MGW, etc.

Figure 19:
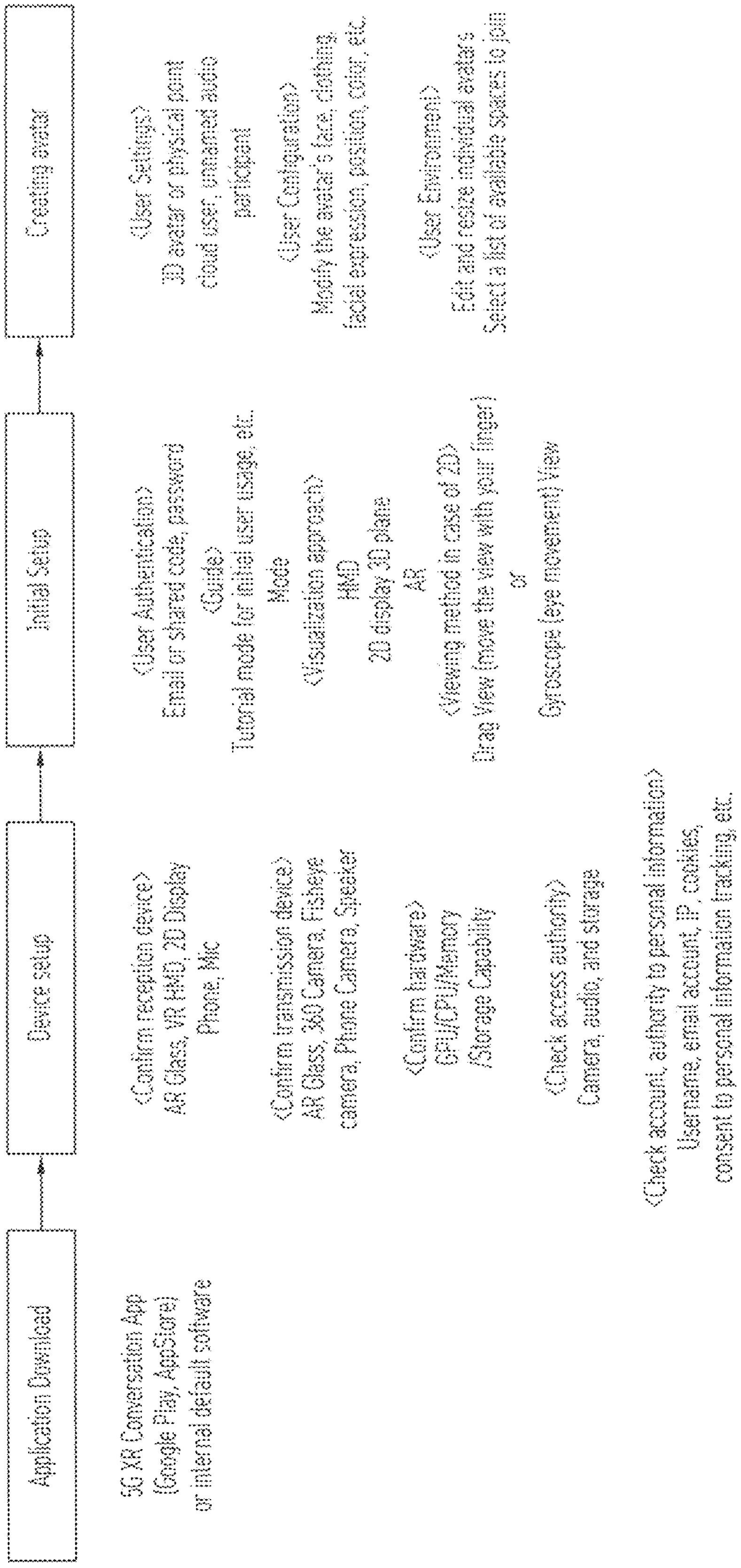
FIG. 19 illustrates a structure for XR communications over a 5G network according to embodiments.

FIG. 19 illustrates a structure for XR communication on a 5G network according to embodiments.

The point cloud data transmission/reception device according to embodiments may efficiently perform XR communication based on a communication network, as shown in FIG. 19.

Real-time point cloud two-way communication using a 5G network may be achieved using three methods: 1) exchange of point cloud data using an IMS telephone network, 2) streaming of point cloud data using a 5GMS media network, and 3) web-based media transmission using WebRTC. Therefore, a definition of an XR conversational service scenario is required to transfer the data. Scenarios may be delivered in various forms and may be divided into processes and scenarios for all end-to-end services using a 5G network, starting from the process of acquiring data.

In order to proceed with XR teleconference, application download should be performed in advance. TO exchange data using a 5G network, an embedded or downloadable application program is required. This program selects the transmission type of data transmitted by 5G from among 1) a telephone network 2) a media network 3) A web network. When the program is installed, the basic environment for sending and receiving data may be checked by checking the general access of the device and permissions to account and personal information. Point cloud equipment, including a reception device and transmission device for receiving data from a counterpart, includes capture equipment, a converter capable of converting dimensional data into three dimensions, or any video input device capable of transmitting or converting data into three dimensions in 360 degrees. For voice data, a built-in microphone or speaker is provided, and hardware capabilities to minimize the processing of point cloud data are also checked. Hardware includes the function of the GPU/CPU capable of performing pre-rendering or post-rendering and may also include the capacity of the hardware to perform the processing, and the size of the memory. The personal information includes account information for accessing the application, IP, cookies, and other things that may additionally carry real-time information about the user, and consent is obtained in advance to transfer the personal information.

Figure 20:
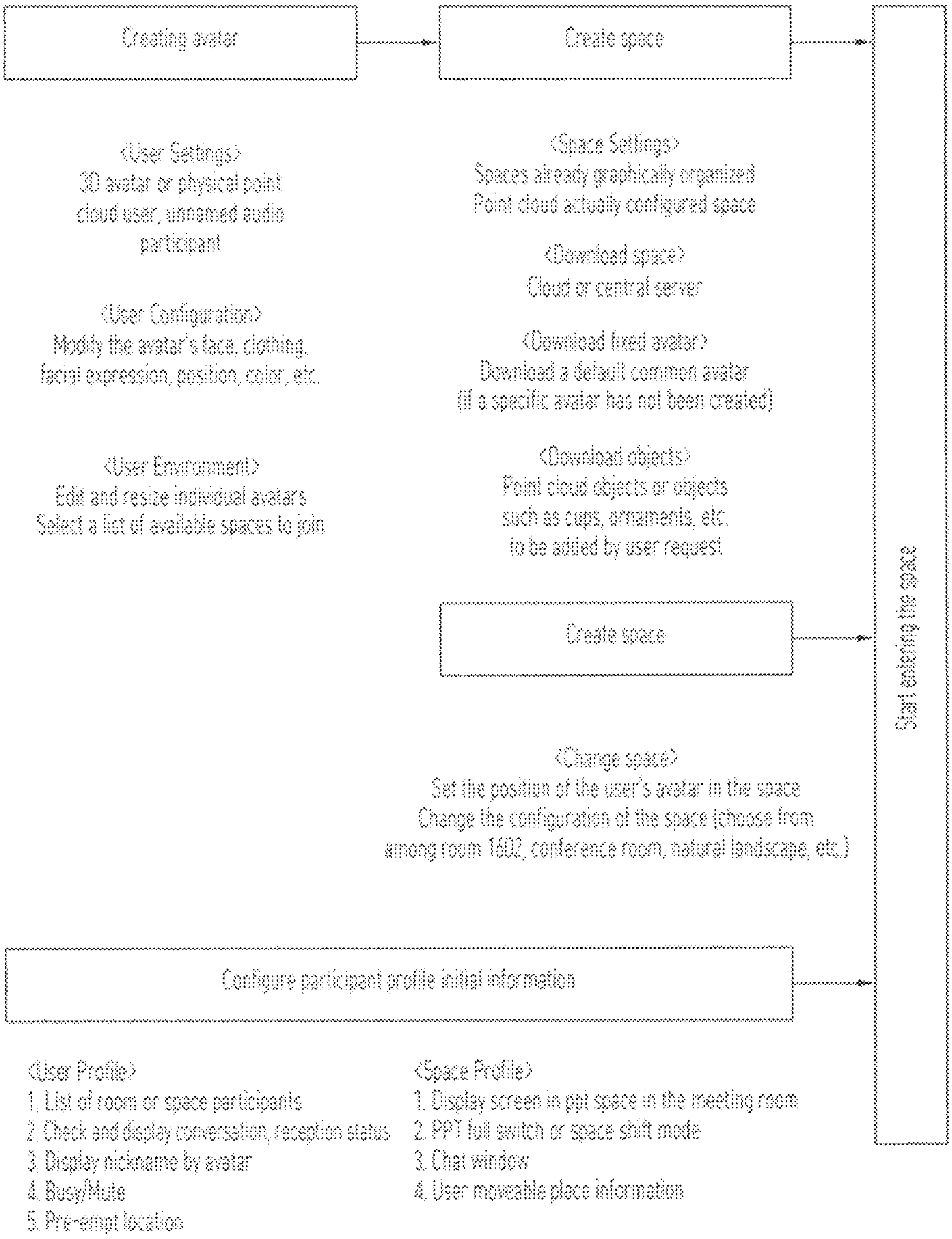
FIG. 20 illustrates a structure for XR communications according to embodiments.

FIG. 20 illustrates a structure for XR communication according to embodiments.

After verifying the permissions to obtain the initial data and the state of the device, the user is authenticated and a distinguisher is created to differentiate between users. Generally, an email or a username and password is used to identify the user, and the tag of the authenticated user is formed automatically. In addition, a guide mode may be provided for the initial user to effectively exchange point cloud data or use the system. The state of the user device may determine a method for accessing the field of view. If the device is capable of directly capturing or receiving the point cloud, it may transmit and receive the data as it is. If the point cloud is received using an HMD, it should be scaled or transformed to fit the 360 environment. If the receiving display is not a device that receives three-dimensional data, but a 2D display based on a commonly used cell phone or monitor, it should be able to faithfully represent the data three-dimensionally within the two-dimensional screen. For example, the three-dimensional view may be realized or checked within the two-dimensional display by rotating or zooming the image on the screen with a finger. Alternatively, a gyroscope may be used to check a three-dimensional space on the two-dimensional screen. To represent a user in a three-dimensional space, an avatar should be created. The avatar may be virtual data from a graphic, a three-dimensional transformed form of a person or object directly acquired as a point cloud, or may be audio without any data. If audio data is input, the user does not exist and the data may be organized in the same form as a voice conference. The three-dimensional representation of the avatar may be modified by a user definition or choice. For example, in the case of a human, the avatar may change the shape of its face, wear clothes, hats, accessories, etc. that may express the personality of the human, and may be transformed into various forms to express the personality. In addition, emotions may be expressed through conversations between humans. The emotions may be controlled by changes in the text or the shape of the face in graphics.

The created avatar participates in a virtual space. In the case of a 1:1 conversation, each data is transmitted to the counterpart, but the space in which the counterpart receives the data should be simple. If there are multiple participants, spaces that may be shared by multiple participants should be created. The spaces may be any graphically configured spaces or data spaces acquired directly as point clouds. Depending on the size and context of the data being shared, the data may be stored on individual devices for quick processing, or may be stored and shared in the cloud or on a central server if the data is large. The user's avatar may be pre-generated using a library. A default, common avatar may thus be used, eliminating the need to create a new avatar or capture and send data for the users. Similarly, various objects used in the space may be added at the request from a user, and the data may be graphical or acquired as a point cloud. Assuming a typical meeting room, objects may be easily accessible or familiar objects in the meeting room, such as documents, cups, and laser pointers. When a space is created, it may be populated by users, each with their own avatar, and users may join the meeting by moving their avatar into the created space. The space is determined by the host organizing the meeting and may be changed by the host by selecting the space. Acquiring a familiar meeting place in advance may give the effect of joining a company meeting room at home, while traveling abroad or acquiring a famous historical site abroad may give the effect of meeting at that site from home. Spaces generated from virtual, random graphics rather than point clouds are also subject to the ideas and implementation of the space organizer who creates the space for the user. When a user joins a space, they may enter the space by forming a user profile. The user profile is used to distinguish the list of participants in the room or space. If there are multiple users, it may be checked whether conversations are possible and that the user's reception is working correctly. Also, when an avatar is present, the user's name or nickname should be displayed and it should be indicated whether the user is currently busy or mute. Space constraints may vary depending on the utilization of the applications that make up the host or server. In environments where free movement is restricted, users should be allowed to move where they want to be. In addition to the user's profile, the profile of the space also needs to be determined. To share a large number of files in a meeting room, there should be a space to display the PPT in the room. Thus, the effect of viewing the presentation in a virtual room may be obtained, and the screen image may be replaced with a screen image for sharing documents, just like in a normal audio conference. A place for chatting also needs to be provided. If users move around, a definition of how far and where they can move is required.

Real-time two-way video conversations based on point clouds according to embodiments may be categorized into two types: 1:1 conversational transmission, such as a single phone call, and participation in multiple video conferences. However, both scenarios require a processor that processes media rather than directly delivering data and should be provided in an environment that allows for virtual meetings.

FIG. 21 illustrates a point-to-point XR Teleconference according to embodiments.

The basic call request for a conversation is driven by network functions. When using an MTSI network, a media source function (MRF) or media control unit (MCU) may be used to transmit and receive media. The MRF/MCU receives the point cloud compressed data. In the case where the sender intends to send auxiliary information (view of the field of view, camera information, direction of the field of view, etc.) in addition to the compressed data. After acquiring different point cloud data from multiple senders using the MRF, a single video is created through internal processes. The video includes a main video and multiple thumbnails. The processed video is then delivered back to the respective receivers, where processing such as transcoding and resizing may occur. If the MRF requires processes such as transcoding, it may increase the maximum latency by as much as the processing time. In addition, thumbnail data may be sent to each transmitter and receiver in advance to perform pre-processing. In addition to processing media, the MRF performs functions of audio and media analysis, operative connection of the application server and billing server, and resource management. The application server (AS), which is connected to the MRF, provides MRF connection and additional functions, including HSS interworking function for inquiring the status of subscribers in the telephone network. Additional functions include password call service, lettering service, call connecting tone service, and call prohibition service, on the actual phone.

The one-to-one point cloud conversation service requires each user to have a three-dimensional point cloud capture camera. The camera should contain color information, position information, and depth information related to the user. If depth is not represented, a converter may be used to convert a two-dimensional image into a three-dimensional image. The captured information used may include Geometry-based Point Cloud Compression (G-PCC) or Video-based Point Cloud Compression (V-PCC) data. The transmitter should have equipment capable of receiving the other party's data. The reception equipment generally refers to any equipment capable of representing the data of the acquired point cloud. Accordingly, it may be a 2D-based display and may include any equipment capable of visually representing the graphics of the point cloud, such as an HMD or hologram. To represent data, the receiver should receive data from the MRF/MCU, where the data from the transmitter and receiver is processed, and process the received data. The captured point cloud data is delivered to the MRF/MCU and the received data is generated by an internal process to deliver the data to each user. The basic information about the conversation, the virtual space of the conversation where the conversation is required, or the view information from the perspective desired by the other party may be delivered, or compressed data may be delivered.

1. Bonnie (B) and Clyde (C) use a conference call to make an access. Through the access, each other's face may be presented in a plane or a simple virtual space, and the virtual space A allows B and C to see each other's faces from where they arrive.

In a one-on-one conversation, the virtual space is simply used as a space in which the point cloud is projected and simplified. If the projection space is not used, all data captured by the camera is simply sent to the other party.

2. B and C require an application to operate the video conference. The application checks the following basic service operations.

Checking the reception device: AR glass, VR HMD, 2D display, phone speaker, etc.

Checking the transmission device: AR glass, 360 camera, fisheye camera, phone camera, Mic, Kinnect, LiDAR, etc.

Checking hardware performance: GPU, CPU, memory, storage capability

Checking access authority: camera, audio, storage, etc.

Checking permissions to account and personal information: username, email account, IP, cookies, and consent to personal information tracking 3. Before engaging in a conversation, B and C use a point cloud capture camera to acquire point data to be transmitted to the other party. The point data is typically acquired data about the faces or body shapes of B and C, and data acquired using their own equipment may be output.

In the above scenario, a transmission delivery may be implemented based on a simple telephone network in an environment where no media is known. Prior to the creation of the telephone network, the preliminary data needs to be received through the MRF/MCU, which receives all the incoming data from B and C.

The scenario of a video conversation between two people for a point cloud is divided into two scenarios as follows.

In scenario (a), all data is transmitted in a one-to-one conversation. All of B's point cloud information may be delivered directly to C, and C may process all the B's data or partially process the same based on auxiliary information delivered from B. Similarly, B should receive all the point cloud data transmitted by C and process some of the data based on auxiliary information transmitted from C. In scenario (b), the MRF/MCU are located between telephone networks, and B and C deliver point cloud data to the MRF/MCU located therebetween. The MRF/MCU processes the received data and delivers the data to B and C according to the specific conditions required by B and C. Therefore, B and C may not receive all the point cloud that they transmit to each other. In scenario (b), the multiparty video conference function may also be extended to include an additional virtual space A, which may be delivered to B or C. For example, instead of receiving a direct point cloud, B and C may be placed in a virtual meeting space and the entire virtual space may be delivered to B and C in the form of third person or first person. David (D) may also join in, and thus B, C, and D may freely converse with each other in space A.

Figure 22:
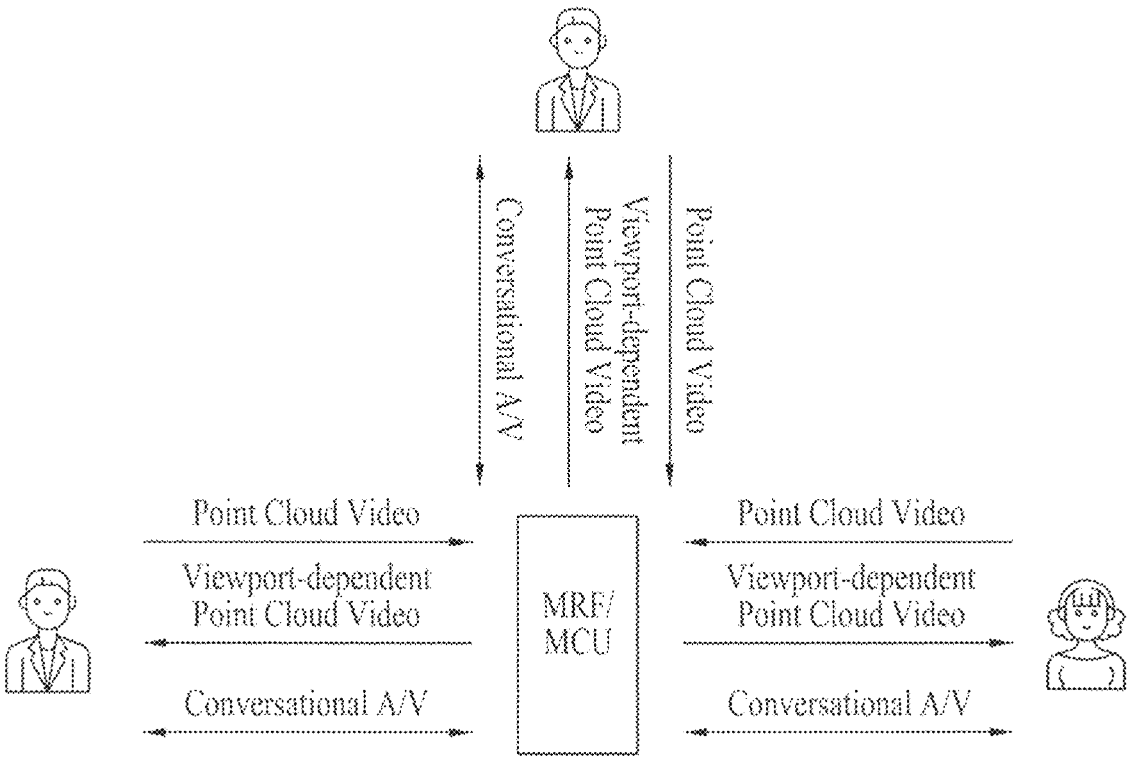
FIG. 22 illustrates an extended XR teleconference according to embodiments.

FIG. 22 illustrates an extension of an XR videoconference according to embodiments.

As opposed to a conversation between two persons, a virtual conferencing system involving three or more persons may not allow for direct data transmission. Instead, the MRF/MCU may receive each piece of data and process a single piece of data, which is schematically shown in FIG. 22.

B, C, and D deliver the acquired point cloud data to the MRF/MCU. Each piece of the received data is transcoded to form a unit frame and generate a scene that may organize the data of the aggregated points. The configuration of the scene is given to the person who requests hosting among B, C, and D. In general, various scenes may be formed to create a point space. Depending on the user's location or the location they wish to observe, not all data needs to be delivered, and the MRF/MCU may deliver all or part of the point cloud data based on the received data information and the camera viewpoints and viewports requested by B, C, and D.

Figure 23:
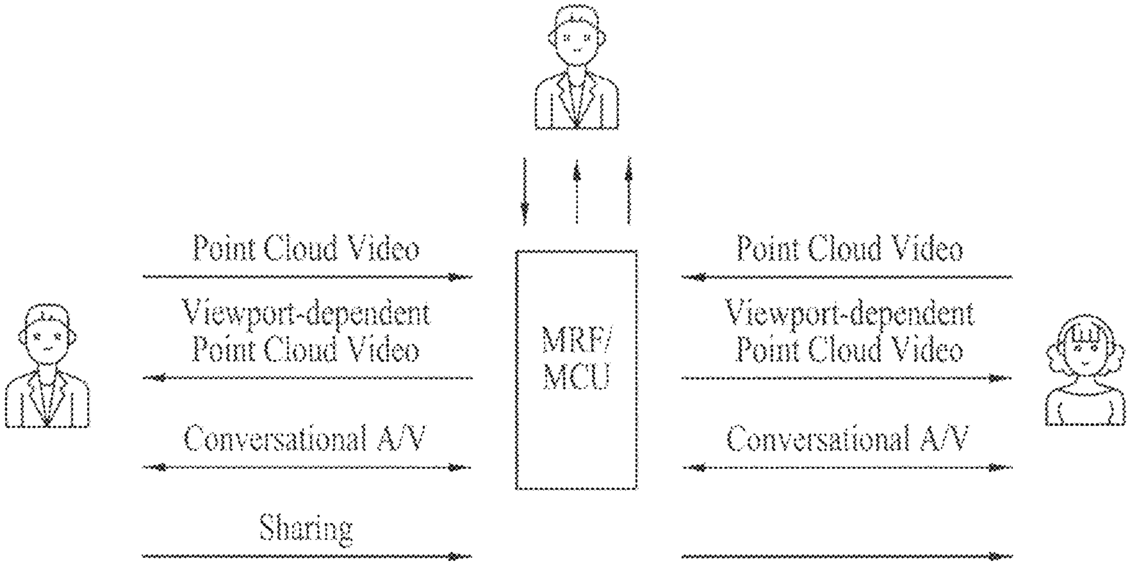
FIG. 23 illustrates an extended XR Teleconference according to embodiments.

FIG. 23 illustrates an extension of an XR videoconference according to embodiments.

Second, B having the authority of the host may share its own data or screen with the conference participants. The data that may be shared includes media that may be delivered to a third party in addition to the video conversation, such as an overlay, an independent screen, or data. If the sharing function is used, B may transmit data to be shared to the MRF/MCU, and C and D may receive data shared by a request thereof. In order to share the data, the number of overlays or layings may be determined using the SDP. Capability should be measured regarding the ability to receive all the data and the ability to receive all the data to be delivered in the Offer/Answer process. This process may be determined at multiple conference participation initiations. The data processing capability for each user may be checked when a telephone network is created when the data sharing function should be basically provided. The shared data is generally generated to share some or a partial or entire screen of an application operating in the host in a conversation through a presentation file, an excel file, a screen of a desktop, or the like. The generated data is transmitted to a user who desires to receive the data by converting the compression or resolution.

The present disclosure proposes an apparatus and method for efficiently providing an immersive conversation and multiparty conferencing system capable of real-time interaction based on an acquired 3D image (e.g., a user), while maximizing the quality of experience (QoE) perceived by the user and minimizing the cost of the service (e.g., data size, data processing time, etc.).

Beyond high quality video, immersive video, which is presented in 3D to provide users with a more realistic experience, is one of the important technology elements in streaming services, interactive services, or virtual reality services.

In the present disclosure, interactive services may include video calls, video conferencing, etc. For example, an interactive service may be a one-to-one video call or a many-to-many video conference.

These interactive services use a combination of a color camera and a camera capable of acquiring depth information to acquire a 3D image of a user's face or shape. The data acquired in this form may consist of a collection of many points, and this data set is called a point cloud (or point cloud data). Each point in a point cloud may include geometry information (i.e., geometric position information) and various kinds of attribute information, such as color information and reflectance. These points may be acquired using sensor equipment with 3D scanning technology, such as Light Detection and Ranging (LiDAR) sensors, and camera equipment capable of acquiring color information.

An acquired point cloud that is capable of providing deep immersion and high realism consists of tens to millions, or even billions, of points per frame. The larger the number of points acquired, the higher the quality of the final 3D video footage. However, as the number of points containing various kinds of information increases, the amount of data increases dramatically and the time required for the service increases accordingly.

In other words, as a point contains multiple pieces of information, the amount of data growth becomes more significant with the increase in the number of points, and the cost of each element of the media service pipeline—from compression to transmission, reception, and rendering—may become more significant. The first step in the pipeline for an immersive interactive service is described below. After capturing the image of the user and acquiring the 3D point cloud data, encoding and encapsulation are performed, which includes the selection of a resolution, transmission bitrate, compression codec, and encapsulation standard, and the processing speed thereof may vary depending on the compression method.

For interactive services, the requirement for end-to-end latency is defined as ultra-low latency (around 20 ms or less), as it is important to ensure real-time processing compared to other services in terms of immersion. However, acquiring a point cloud with a large data size in real time and providing the service in ultra-low latency is one of the factors that make immersive interactive services difficult.

Therefore, for the actual implementation of an immersive interactive system, it is necessary to be able to process a very high amount of information, and not only optimized technology according to the increase in information volume, but also technology enabling near real-time response to changes in user movement or viewpoint that occur in the form of interaction is needed. In other words, immersive interactive services based on a large amount of point cloud data require highly efficient compression technology. In other words, for high efficiency, a technology capable of compressing data and providing services in consideration of network conditions and the user's viewing environment may be needed.

According to embodiments, the interactive services in the present disclosure may be performed on a 3GPP basis.

According to embodiments, the 3D images acquired for the interactive service may be encoded (i.e., compressed) and decoded (i.e., reconstructed) based on the V-PCC described above.

In particular, according to the present disclosure, 3D images acquired for a 3GPP-based interactive service may be encoded (i.e., compressed) and decoded (i.e., reconstructed) based on the V-PCC described above.

As described above, V-PCC is characterized by projecting the input 3D point cloud data into 2D space and compressing the data using an existing 2D video codec. Since the V-PCC method is based on the existing 2D video codec, it may provide a service with differentiated quality depending on the bandwidth and the user's terminal by using a quantization parameter (QP) or the like. However, simple use of QP degrades the quality of the video, and therefore it is necessary to use the QP strategically. The V-PCC method also provides a parameter (Level of Detail (LoD)) that allows tiles to be configured and represented at different levels of amount of information. This allows for more adaptive service according to network conditions and regions of interest of users. However, if the LoD is controlled in a uniform way without considering the characteristics of the content as in traditional methods, the quality perceived by the user may be degraded, similar to QP adjustment. To avoid this issue, in adaptive media streaming services that provide adaptive control to the user, the user receiving the media service should make a request by gradually adjusting the LoD for the desired region. This requires the server to prepare tiles or segments of different qualities prior to providing the service, and it is difficult to gain any benefit for the time spent on compression. For this reason, it may not be suitable for immersive interactive services that need to be applied to the user's point cloud data acquired in real time in the field.

Accordingly, the present disclosure proposes an apparatus and method that are capable of effectively reducing a high amount of information while minimizing a decrease in the quality perceived by a user by controlling the density of point cloud data based on the user's interest in order to achieve ultra-low latency in implementing an immersive interactive system based on point cloud technology.

The present disclosure proposes an apparatus and method that are capable of effectively reducing a high amount of information while minimizing a decrease in the quality perceived by a user by controlling the density of point cloud data based on recognized objects.

The present disclosure proposes an apparatus and method that are capable of effectively reducing a high amount of information while minimizing a decrease in the quality perceived by a user by controlling the density of point cloud data based on the user's interest in recognized objects.

The present disclosure proposes an apparatus and method that are capable of effectively reducing a high amount of information while minimizing a decrease in the quality perceived by a user by controlling the density of point cloud data based on the priority of recognized objects.

The present disclosure proposes an apparatus and method that are capable of effectively reducing a high amount of information while minimizing a decrease in the quality perceived by a user by controlling the density of point cloud data based on the priorities of recognized objects.

The present disclosure includes both virtual reality (VR) in MTSI in 3GPP TS 26.114 and extended reality (XR) in TR26.928, as well as the 3GPP TS26.223 standard, which discusses IMS-based telepresence. These standards will enable mobile or detached receivers to attend virtual meetings and participate in immersive conferences. In the case where interactive data can be carried in media formats, present disclosure includes the 5G Media Architecture in 3GPP TS26.501, TS26.512, and TS26.511. Furthermore, for the concrete implementation of services, relevant standards may include TS26.238, TS26.939, TS24.229, TS26.295, TS26.929, TS26.247. In addition, technologies related to data processing include ISO/IEC JTC 1/SC 29/WG3 NBMP.

The following describes an apparatus and method for recognizing objects in a real-time immersive interactive service, classifying regions of interest suitable for the interactive service, dividing the regions into different levels of point data density, and finally constructing an optimal point cloud set while minimizing the quality degradation perceived by the user receiving the service. As a result, the present disclosure may achieve ultra-low latency and efficiently provide interactive services.

3D point cloud data obtained from a device with 3D scanning technology (e.g., LiDAR) according to embodiments has information about the 3D surface geometry of a target object. Devices capable of acquiring depth information about an object, such as a 3D scanning device, may acquire information about all objects in a normal range. However, depending on the type of service, the user's interest in the objects acquired may vary. For example, in an immersive interactive system, an object of most interest may be limited to the counterpart, while the interest in the counterpart's face as a more detailed region may be higher. Taking these characteristics into account, objects can be divided may into regions and the quality of the 3D image may be adjusted by adjusting the number of points to use based on their priorities.

In an immersive interactive system, objects are things that move dynamically over time, and accordingly the present disclosure uses the V-PCC method to compress a dynamic point cloud (i.e., point cloud data).

According to embodiments, for compression of a point cloud (i.e., point cloud data) acquired for an interactive service, the point cloud video encoder 10002 of FIG. 8, the point cloud encoder of FIGS. 10, 13, and/or 15, and/or the like may be used.

According to embodiments, for reconstruction of the compressed and received point cloud (i.e., point cloud data), the point cloud video decoder 10008 of FIG. 8, the point cloud decoder of FIGS. 12, 14, and/or FIG. 15, or the like may be used.

According to embodiments, the techniques of the present disclosure may also be applied to other projection-based systems that encode 3D data by projecting the 3D data into two dimensions, as in the case of V-PCC.

As described above, the encoding with the V-PCC codec includes reproducing the 3D point cloud data into one or more 2D patches (patch generation), and encoding an occupancy map, geometry information, and attribute information using a conventional 2D video codec for each 2D frame generated by packing the one or more 2D patches into a 2D plane.

In some embodiments, the patch generation includes determining a bounding box configured as a hexahedron of point cloud data for each frame, and projecting points in the form of an orthographic projection onto each surface of the hexahedron of the bounding box. In this case, the information (atlas) that the patches share in common, such as the attribute information about the projection plane, the size of the patch, and the relative position information between patches, is classified as metadata (i.e., auxiliary patch information), and the respective patches projected onto the six surfaces are generated in the form of three types of information: 3D geometry information (i.e., geometry map) related to each point, color and other information (i.e., attribute map), and occupancy region information (i.e., occupancy map) that distinguishes a region corresponding to the patch from a region not corresponding to the patch in each plane. Each of these three patch data generated per frame is then encoded by a video codec. Here, reference is made to the detailed description of the point cloud encoder of FIGS. 10 and 13 for any parts not described or omitted.

Based on the above-described encoding process, the 2D patch data generated based on the initially acquired point cloud data may be the most important factor in determining the quality and data size of the 3D image that is finally generated.

Therefore, the present disclosure proposes a method of controlling the projected data by distinguishing a specific region in generating 2D patch data, and intends to enable quality control by applying the method to an immersive interactive system.

To this end, in the present disclosure, the transmission device may further include a density controller. The density controller may be implemented in hardware, software, a processor, and/or a combination thereof.

According to embodiments, the density controller may be included in the patch generator 14000 of FIG. 10 or may be configured as a separate component/module. In the latter case, the density controller may be provided at the front end of the patch generator 14000.

According to embodiments, the density controller may be included in the patch generator 18000 of FIG. 13 or may be configured as a separate component/module. In the latter case, the density controller may be provided at the front end of the patch generator 18000.

According to embodiments, the density controller may include recognizing and classifying objects and applying priority levels. The process of recognizing and classifying objects and applying priority levels may include extracting coordinate regions of the recognized objects and applying the priority levels.

The density controller according to embodiments may include generating and applying a filter map to be applied to the patch data to be generated on each face of the bounding box.

The input data needed to generate the filter map may include patch data, recognized coordinate regions, and/or priority level information.

In order to apply a priority per region (e.g., object) to control the density in the generation of patches of point cloud data according to embodiments, objects should first be recognized and appropriately classified.

Figure 24:
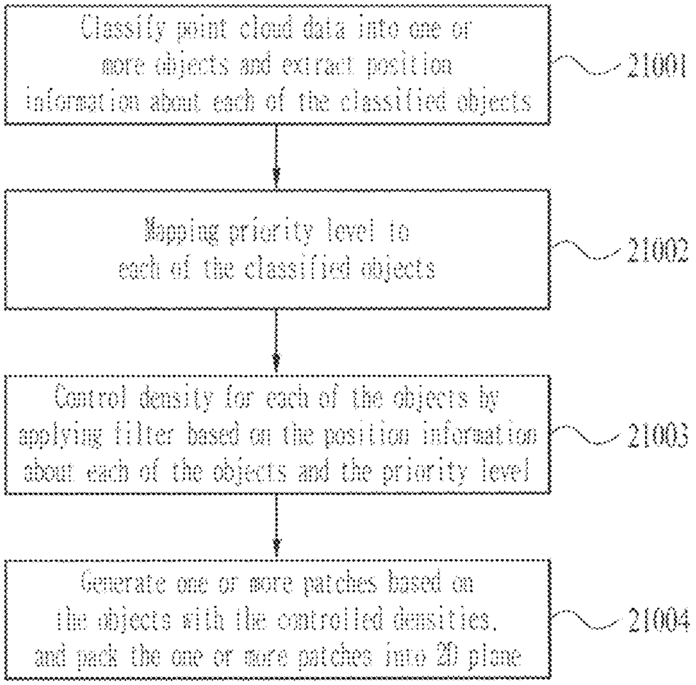
FIG. 24 is a diagram illustrating an example of controlling the density of point cloud data according to embodiments.

FIG. 24 is a diagram illustrating an example of controlling the density of point cloud data according to embodiments.

In other words, the method may include classifying captured point cloud data into one or more objects and extracting position information about each of the classified objects (21001), mapping a priority level to each of the classified objects (21002), controlling a density for each of the objects by applying a filter based on the position information about each of the objects and the priority level (21003), and generating one or more patches based on the objects with the controlled density, and packing the generated one or more patches into a 2D plane (21004).

Operation 21001 may include recognizing the objects to classify the objects from the point cloud data. The object recognition techniques used in the present disclosure may employ a general purpose 2D image-based recognition technique. If real-time feedback information is received, the object recognition operation may be omitted.

In operation 21001, the classification of the objects may be performed based on a 3D frame containing the point cloud data, or may be performed based on a bounding box within the 3D frame.

According to embodiments, the bounding box is a hexahedron capable of containing the points of the point cloud. Thus, the difference between the minimum and maximum values of the points in the point cloud is the length of the edges of the bounding box.

In other words, when an object is positioned in 3D space, it may be represented by a bounding box. There may be one or multiple bounding boxes in a 3D frame. In other words, a bounding box may be applied to the entire point cloud, or to a part of the point cloud. In the former case, the bounding box may contain all points in the entire point cloud. In the latter case, it may contain points in a portion of the entire point cloud. For example, in an interactive service, when two users are positioned in a frame, there may be two bounding boxes in the frame.

According to embodiments, a bounding box may contain a single object, or may contain multiple objects. In other words, multiple objects may be grouped together to create a single bounding box, or a bounding box may be created for each object. Also, an object may be further classified into multiple objects. For example, when the object is a human face, the object may be further divided into objects (or sub-objects) such as a forehead, nose, eyes, and mouth.

According to embodiments, operation 21001 may include projecting the point cloud data onto a face of the bounding box in two dimensions, and recognizing and classifying the object based on the projected 2D image data.

Operation 21002 may include acquiring and signaling respective position information (e.g., coordinate region) and size information about the classified objects, and mapping priority levels to the classified objects. According to embodiments, the priority levels or priority levels for the objects may be pre-stored in a form of a table, and the priority levels may be mapped to the objects based on the table.

Operation 21003 may include applying a filter based on the position information and priority level of each object to control the density of each object differently. Here, the filter may change on a frame-by-frame or bounding box-by-bounding box basis. For example, the density (i.e., the number of points) may not be controlled for an object with the highest priority level, but the density may be controlled differently for the other objects based on their priority levels. If the classified objects are a face, body, eye, and mouth, and the mouth has the highest priority level, the number of points in the mouth may remain unchanged, while the number of points in the face, body, and eye may decrease according to the priority level. In other words, adjusting the number of points in an object changes the density of the object. For example, reducing the number of points in an object makes the object less dense.

Operation 21004 includes calculating normal vector values, performing segmentation, and patching based on points included in the objects with the controlled density and generating one or more patches, and packing the generated one or more patches into a 2D plane. According to embodiments, by packing the one or more patches into a 2D plane (i.e., a 2D frame) in such a way that they do not overlap each other, three 2D frames may be generated based on the packing: a 2D frame containing an occupancy map, a 2D frame containing geometry information, and a 2D frame containing attribute information.

The following are definitions of terms used in the present disclosure.

Occupancy map: A binary map that indicates the presence or absence of data at a given position in a 2D plane with a value of 0 or 1 when the points in a point cloud are divided into patches and mapped to the 2D plane.

Patch: A set of points that make up a point cloud, indicating that points in the same patch are adjacent to each other in 3D space and are mapped in the same direction of any of the planes of the six-sided bounding box in the process of mapping to a 2D image.

Geometry image: An image in the form of a depth map that represents the geometry of each point in a point cloud. Geometry refers to the set of coordinates associated with a point cloud frame.

Texture image: An image that represents the color information about each point in a point cloud. A texture image may be composed of pixel values from multiple channels (e.g., three channels R, G, and B). The texture is included in the attribute. In some embodiments, the texture and/or the attribute may be interpreted as the same target and/or inclusive relationship.

Auxiliary patch info: Represents metadata needed to reconstruct a point cloud from individual patches. The auxiliary patch info may include information about the position, size, etc. of the patch in 2D/3D space.

Figure 25:
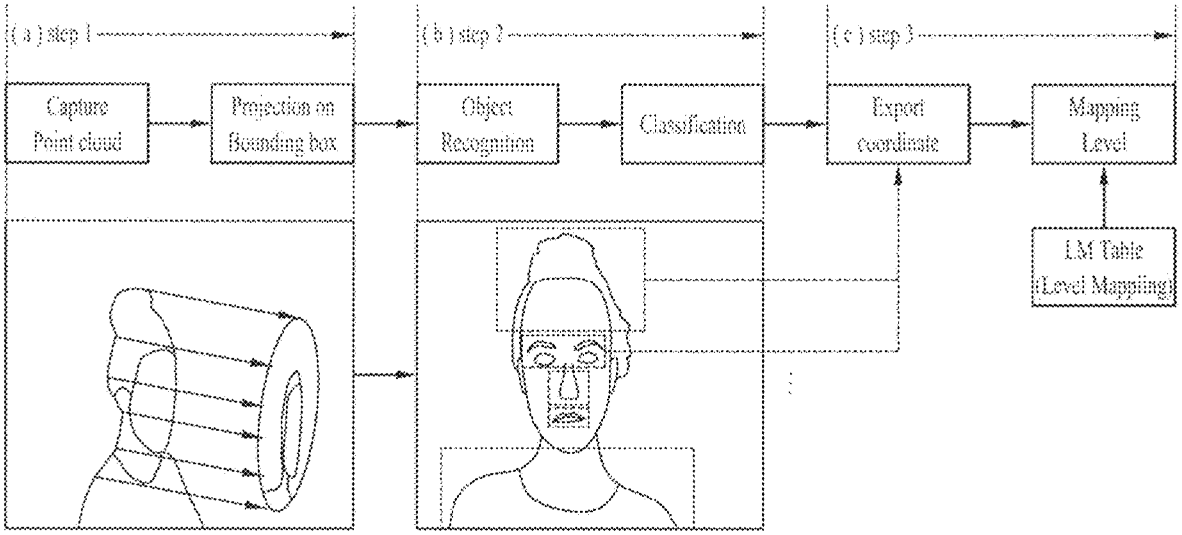
FIG. 25 is a diagram illustrating recognizing and classifying objects and then extracting coordinate information about each object and mapping priority levels according to embodiments.

FIG. 25 is a diagram illustrating the process of recognizing and classifying objects and then extracting coordinate information and mapping priority levels for each object, according to embodiments.

FIG. 25 is a diagram illustrating recognizing and classifying objects and then extracting coordinate information of the classified objects and mapping priority levels to the classified objects according to embodiments.

In FIG. 25, step 1 includes projecting point cloud data acquired using a camera or the like onto a bounding box face in two dimensions for patch generation.

Step 2 includes recognizing and classifying one or more objects based on the 2D image data projected onto the bounding box face. The object recognition technique used in the present disclosure may be any general purpose 2D image-based recognition technique. FIG. 25 shows an example where five objects (e.g., forehead, eyes, nose, mouth, and body) are recognized and classified from the bounding box of step 1.

Once the objects are recognized, step 3 is performed, which includes extracting coordinate regions (i.e., position information) of the recognized objects and mapping a predefined priority level to each classified object based on the type of object. To this end, a Level Mapping table (LM Table) may be referenced, which is predefined according to the types of objects.

Table 2 below shows an example of the LM table.

TABLE 2

| Object classification | Priority level |
|---|---|
| face | 2 |
| body | 3 |
| eye | 1 |
| mouth | 1 |
| others | 5 |
| . . . | . . . |

Assuming that the five objects classified as above are the forehead, eyes, nose, mouth, and body, the highest priority level is mapped to the eyes and mouth based on Table 2. In embodiments, a single priority level may be mapped to a single object, or multiple objects may be mapped to the same priority level according to the present disclosure. According to embodiments, the LM table may be continuously updated, and machine learning techniques may be applied to recognize and classify objects and generate the LM table. If real-time feedback information is received about a region of interest (i.e., an object) of the other user, the LM table may be updated by classifying the region into a high level. If real-time feedback information is received, the object recognition step may be omitted.

According to embodiments, the priority level may vary depending on the user's interest, the type of service, the number of points, and the like. For example, when the type of service is an interactive service, the priority level of the user's eyes or mouth may be set to a high priority level. As another example, the priority level of the object that contains the most points might be set to a high level. Here, the priority of each object may be preset and stored in the LM table, or may be adaptively set during the service based on the user's interest, the type of service, the number of points, and the like.

In step 2, the recognized and selected objects are processed into coordinate information (i.e., position information) and priority information to be used as input data for the next filtering process. The data format for this is shown in FIG. 26, which may be used as binary data in an implementation.

FIG. 26 shows an example syntax and semantics of signaling information showing a relationship between a bounding box and an object according to embodiments. According to embodiments, the signaling information of FIG. 26 may be included in auxiliary patch information and transmitted to a reception device.

FIG. 26 illustrates an example where there are two bounding boxes, and two objects are recognized and classified in each bounding box.

In FIG. 26, BBWidth indicates a width of the bounding box.

BBHeight indicates the height of the bounding box. In other words, BBWidth and BBHeight may be used to determine the size of the bounding box.

Here, BBWidth and BBHeight may be signaled per bounding box, or they may be common and signaled once for all the bounding boxes.

BBId indicates the bounding box identifier (ID) to identify the bounding boxes.

Obj indicates the recognized object in the bounding box identified by BBId.

Cor indicates the coordinate information (or position information) about each object. The coordinate information may include the x and y coordinate values of the object and the values of the width and height of the object. In other words, the coordinate information representing the region of the recognized object may be defined as the point ($x_0$, $y_0$) that is the reference and (w, h) that indicates the size of the region. It may be varied depending on the coordinate system used. According to embodiments, each object within the bounding box may be identified by the value of Cor. As another example, the signaling information may further include an object identifier for each object to identify each object in the bounding box.

Level indicates the value of the priority level mapped to each object.

FIG. 26 shows an example where two objects are recognized and classified in each bounding box, but this is an exemplary embodiment for the benefit of those skilled in the art. The number of objects recognized and classified in each bounding box may be the same or different between bounding boxes. FIG. 25 shows an example where five objects are recognized and classified in a bounding box.

In some embodiments, when creating a 3D image using point cloud data, the points should ultimately be connected to create a mesh-like surface. In general, the clarity of the edges of each face is the factor that most affects the quality of the image as perceived by the user, which results in a perception of greater clarity.

Figure 27:
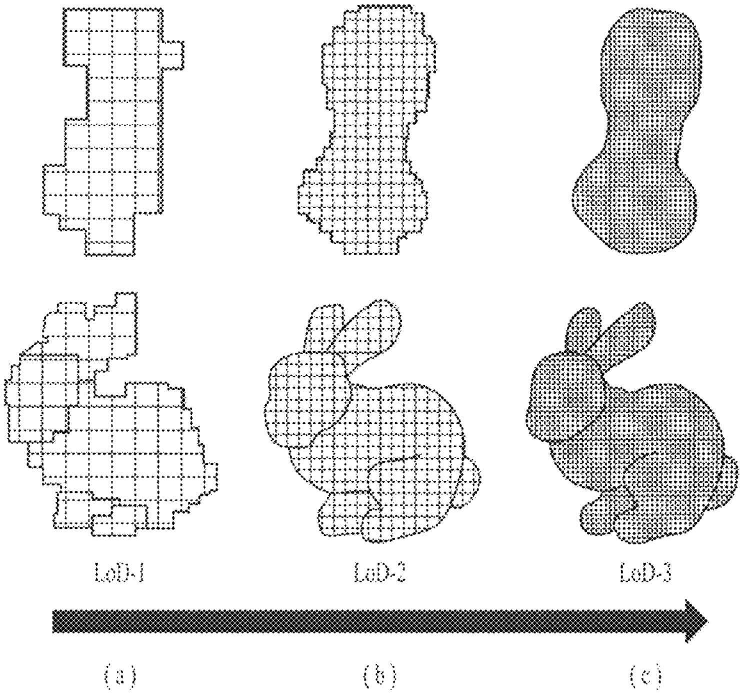
FIG. 27 illustrates an example point configuration per LOD according to embodiments.

FIG. 27 illustrates an example point configuration per LOD according to embodiments. That is, FIGS. 27-(*a*) to 27-(*c*) compare mesh restructuring sharpness according to the number of points.

As shown in FIG. 27, the higher the number of points, the finer and sharper the faces of the mesh structure that will be generated later. LoD-1 (FIG. 27-(*a*)) shows a case where the points are least dense, and LoD-3 (FIG. 27-(*c*)) shows a case where the points are denser.

The points at the lowest LOD are sparsely distributed (meaning that the density is low), while the points at the highest LOD are densely distributed (meaning that the density is high). In other words, the spacing (or distance) between points becomes shorter as the LOD rises along the direction pointed by the arrow shown at the bottom of FIG. 27.

Accordingly, by adjusting the number of points constituting a particular object, the density of the points in the object will vary, and thus the sharpness of the object will vary when the object is reconstructed by the receiver.

Figure 28:
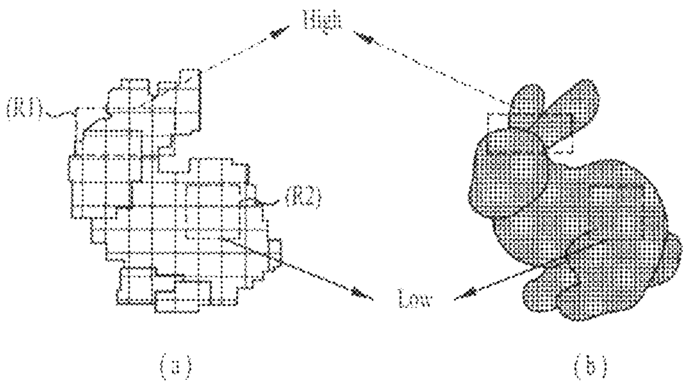
FIGS. 28-(*a*) and 28-(*b*) illustrate an example of a difference in sharpness caused by a difference in density between regions of an object according to embodiments.

FIGS. 28-(*a*) and 28-(*b*) illustrate an example of a difference in sharpness caused by a difference in density between regions of an object according to embodiments.

Upon further analysis of the partial characteristics of a particular object, as shown in FIGS. 28-(*a*) and 28-(*b*), some points may be used to distinguish contours while others are not. In FIGS. 28-(*a*) and 28-(*b*), region R1 has more places that represent the contour of the object than region R2, and therefore needs to be denser to provide a sharper quality. However, region R2 has relatively few places that represent the contour of the object, and therefore it will have a lower impact on the user's perceived quality even though its density is somewhat lower.

Taking advantage of these characteristics, the present disclosure includes generating and applying a filter to control the density based on the patch data acquired in two dimensions and the position and priority information about each region of the 2D patches generated by the above process. Here, the regions of the 2D patches may be an object or a specific region within the object.

Figure 29:
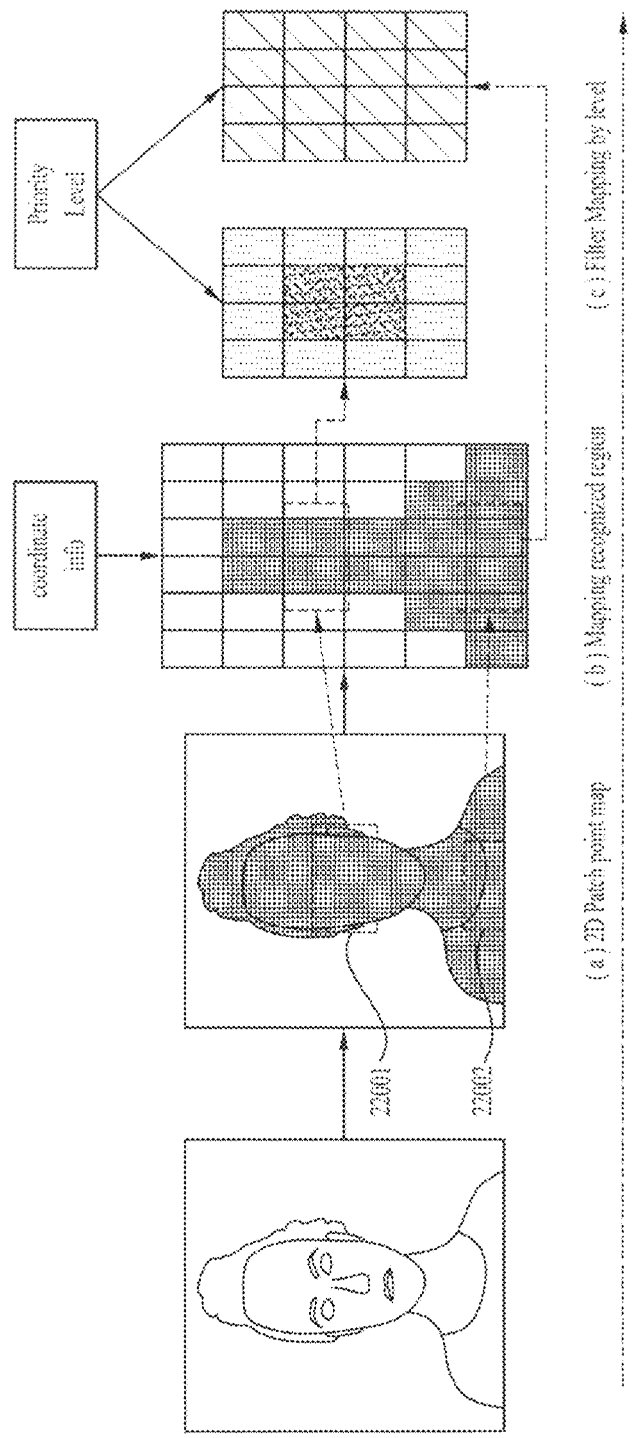
FIG. 29 is a diagram illustrating an example of applying a filter map on a pixel-by-pixel basis in a specific region (e.g., object) of a bounding box according to embodiments.

FIG. 29 is a diagram illustrating an example of applying a filter map on a pixel-by-pixel basis in a specific region (e.g., object) of a bounding box according to embodiments.

FIGS. 29-(*a*) and 29-(*b*) illustrate an example process of applying recognized region-specific position information to patch data. As shown in (b) of FIG. 29, a recognized coordinate region may be extracted from the patch data composed of pixel-by-pixel binary data, and the presence of the pixel data in the region may be controlled by a specific filter. FIG. 29-(*c*) is a diagram illustrating an example of filter mapping according to a priority level. In the case where a service utilizing point cloud data is a 3GPP-based interactive service, the face may be of the highest interest to the user. In particular, the eyes 22001 or the mouth may be the most important part of the face. The portion 22002 below the face may be relatively less important. In this case, the highest priority level may be mapped to the region (or object) containing the eyes 22001, and a lower priority level than the eyes 22001 may be mapped to the region (or object) containing the portion 22002 below the face.

Figure 30:
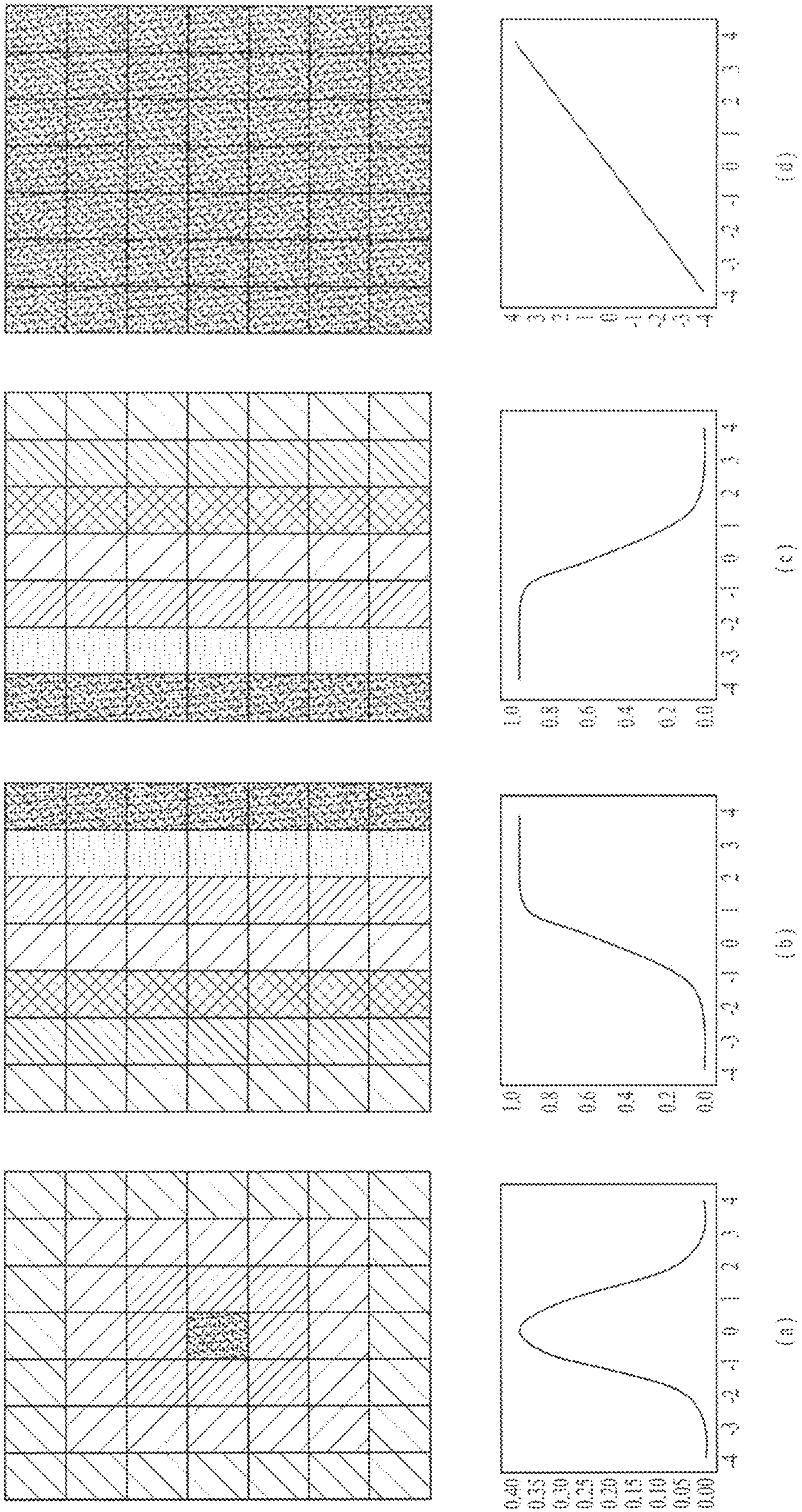
FIGS. 30-(*a*) to 30-(*d*) illustrate example function filters capable of adjusting the entropy of a specific region according to embodiments.

FIGS. 30-(*a*) to 30-(*d*) illustrate example function filters capable of adjusting the entropy of a specific region according to embodiments. Various function filters may be used in the present disclosure, and the function filter used may vary depending on the geometry and priority level of the region. Here, the region may be an object, or a specific region within the object.

FIG. 30-(*a*) shows an example of a Gaussian-based function filter, which may be used to maintain the highest density of the centroid in a region due to the high priority of the centroid in that region.

FIG. 30-(*b*) shows an example of a Sigmoid-based function filter, which may be used to maintain the highest density on the left side of the region due to the high priority of the left side of the region. In other words, FIG. 30-(*b*) is Sigmoid-based function filter that sets the entropy of the rightmost region to a high level.

FIG. 30-(*c*) shows an example of an inverse sigmoid-based function filter, which may be used to maintain the highest density on the right side of the region due to the high priority of the right side of the region. FIG. 30-(*c*) may be set as the inverse of FIG. 30-(*b*).

FIG. 30-(*d*) shows an example of a bijection-based function filter, which may be used when the priorities of the regions are similar. If all regions have the same density or if all point data is to be preserved, a bijection-based filter like the one shown in FIG. 30-(*d*) may be used.

In other words, the positions and number of points that survive in a region (bounding box or object) may vary depending on the type of function filter applied to the region.

FIG. 30-(*a*) is an example case where the centroid of a region has the highest priority, in which case a Gaussian-based function filter may be used to control the density of the region by setting the entropy of the center region to be the highest and decreasing the entropy towards the sides. For the Gaussian-based function filter in FIG. 30-(*a*), the density of the center region may be set to be the highest.

According to embodiments, in FIG. 30-(*a*), 23001 may be a frame or bounding box, and 23002 may be an object (or region) having the highest priority level.

In this case, when the Gaussian-based function filter is applied, the density of the object (or region) corresponding to 23002 remains unchanged, and the density of the other regions except 23002 varies according to the Gaussian-based function. In other words, all the points in the object (or region) corresponding to 23002 will survive, and only some of the points in the other regions except 23002 will survive. The number of surviving points may vary from region to region.

In other words, in the present disclosure, objects are classified based on the bounding box, a priority level is mapped to each classified object, and the overall density of the points contained in the bounding box is adjusted by reducing the density of the objects except for the object with the highest priority level.

In this case, the applied function filter may vary from frame to frame or from bounding box to bounding box. In other words, the function filters used in the present disclosure may be selected and applied on a frame-by-frame basis or on a bounding box-by-bounding box basis. For example, when a frame includes two bounding boxes, the same function filter may be applied to the two bounding boxes, or different function filters may be applied to the two bounding boxes, depending on the position of the object mapped to the highest priority level in each bounding box.

As described above, by controlling the density differently for each object according to the priority of the object, a sharper image quality may be obtained in high priority areas compared to controlling the density uniformly regardless of the priority of the object.

As described above, controlling the density per object changes the number of points included in the patches generated from the bounding box containing those objects. This is because as the density of an object changes, the number of points projected onto a face of the bounding box changes.

The patches with the changed number of points are then packed in the 2D plane by the patch packer in such a way that they do not overlap each other. The patch packer may be the patch packer 14001 of FIG. 10 or the patch packer 18001 of FIG. 13.

The patch packer performs a patch packing operation that maps the generated patches with a controlled density onto a 2D plane. The result of patch packing is an occupancy map, which can be used for geometry image generation, geometry image padding, texture image padding, and/or geometry reconstruction for smoothing. In other words, by packing one or more patches into a 2D plane, a geometry image that stores the geometry information about a point cloud and a texture image that stores the color information about the point cloud may be generated for pixels where a points are present. Here, the occupancy map indicates the presence or absence of a point in a pixel as 0 or 1

The patch packing operation and subsequent operations have been described in detail with reference to FIGS. 8 to 11, 13, and 15, and therefore will not be described herein to avoid redundancy.

According to embodiments, the auxiliary patch information may include, for each object contained in the bounding box, position information and priority level information about each object.

In FIGS. 8 to 11, 13, and 15, the geometry information, attribute information, occupancy map information, and auxiliary patch information compressed by the encoding process are transmitted to the reception device.

The reception device according to the embodiments may correspond to the reception device of FIG. 8, the point cloud video decoder of FIG. 12 or 14, and/or the reception device of FIG. 15 or may perform some/all of the operations thereof. Each component of the reception device may correspond to software, hardware, a processor, and/or a combination thereof.

The process of reconstructing the point cloud data has been described in detail with reference to FIGS. 8, 12, 14, and 15, and will not be described herein to avoid redundancy.

The bounding box and object-related information contained in the auxiliary patch information may also be used for partial decoding at the reception device, reconstruction of 3D data from 2D data, and the like.

Although embodiments have been described with reference to each of the accompanying drawings for simplicity, it is possible to design new embodiments by merging the embodiments illustrated in the accompanying drawings. If a recording medium readable by a computer, in which programs for executing the embodiments mentioned in the foregoing description are recorded, is designed by those skilled in the art, it may also fall within the scope of the appended claims and their equivalents. The devices and methods may not be limited by the configurations and methods of the embodiments described above. The embodiments described above may be configured by being selectively combined with one another entirely or in part to enable various modifications.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same. Executable instructions for performing the method/operations of the device according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this document, the term "/" and "," should be interpreted as indicating "and/or." For instance, the expression "A/B" may mean "A and/or B." Further, "A, B" may mean "A and/or B." Further, "A/B/C" may mean "at least one of A, B and/or C." "A, B, C" may also mean "at least one of A, B and/or C." Further, in the document, the term "or" should be interpreted as "and/or." For instance, the expression "A or B" may mean 1) only "A," 2) only "B," and/or 3) both "A and B." In other words, the term "or" in this document should be interpreted as "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signal unless context clearly dictates otherwise.

The terminology used to describe the embodiments is used for the purpose of describing particular embodiments only and is not intended to be limiting of the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

Operations according to the embodiments described in this specification may be performed by a transmission/reception device including a memory and/or a processor according to embodiments. The memory may store programs for processing/controlling the operations according to the embodiments, and the processor may control various operations described in this specification. The processor may be referred to as a controller or the like. In embodiments, operations may be performed by firmware, software, and/or combinations thereof. The firmware, software, and/or combinations thereof may be stored in the processor or the memory.

The operations according to the above-described embodiments may be performed by the transmission device and/or the reception device according to the embodiments. The transmission/reception device may include a transmitter/receiver configured to transmit and receive media data, a memory configured to store instructions (program code, algorithms, flowcharts and/or data) for the processes according to the embodiments, and a processor configured to control the operations of the transmission/reception device.

The processor may be referred to as a controller or the like, and may correspond to, for example, hardware, software, and/or a combination thereof. The operations according to the above-described embodiments may be performed by the processor. In addition, the processor may be implemented as an encoder/decoder for the operations of the above-described embodiments.

MODE FOR DISCLOSURE

As described above, related details have been described in the best mode for carrying out the embodiments.

INDUSTRIAL APPLICABILITY

As described above, the embodiments are fully or partially applicable to a point cloud data transmission/reception device and system.

Those skilled in the art may change or modify the embodiments in various ways within the scope of the embodiments.

Embodiments may include variations/modifications within the scope of the claims and their equivalents.

The invention claimed is:

1. A method of transmitting point cloud data, the method comprising:

pre-processing the point cloud data containing points;

encoding the pre-processed point cloud data; and transmitting the encoded point cloud data and signaling data, wherein the pre-processing comprises:

projecting the point cloud data onto a surface of a bounding box in two dimensions to generate two-dimensional image data;

classifying objects based on the two-dimensional image data;

mapping a priority level to each of the classified objects based on a predefined table, wherein the table defines priority levels for respective object classifications; and controlling a density of at least one of the objects by applying a filter to the bounding box containing the objects based on position information and the mapped priority level about each of the classified objects, and wherein the signaling data includes position information of each of the classified objects and priority level information related to the classified objects.

2. The method of claim 1, wherein the pre-processing comprises:

generating one or more patches based on points in the bounding box containing the at least one object with the controlled density;

packing the one or more patches into a 2D plane; and generating an occupancy map, geometry information, and attribute information based on the one or more patches packed into the 2D plane and the signaling data.

3. The method of claim 1, wherein the pre-processing further comprises:

recognizing the objects based on the two-dimensional image data.

4. A device for transmitting point cloud data, comprising:

a pre-processor configured to pre-process the point cloud data containing points;

an encoder configured to encode the pre-processed point cloud data; and a transmitter configured to transmit the encoded point cloud data and signaling data, wherein the pre-processor is configured to:

project the point cloud data onto a surface of a bounding box in two dimensions to generate two-dimensional image data;

classify objects based on the two-dimensional image data;

map a priority level to each of the classified objects based on a predefined table, wherein the table defines priority levels for respective object classifications; and control a density of at least one of the objects by applying a filter to the bounding box containing the objects based on position information and the priority level about each of the classified objects, and wherein the signaling data includes position information of each of the classified objects and priority level information related to the classified objects.

5. The device of claim 4, wherein the pre-processor comprises:

a patch generator configured to generate one or more patches based on points in the bounding box containing the at least one object with the controlled density;

a patch packer configured to pack the one or more patches into a 2D plane; and a generator configured to generate an occupancy map, geometry information, and attribute information based on the one or more patches packed into the 2D plane and the signaling data.

* * * * *